US012779581B2

(12) United States Patent
Suzaki et al.

(10) Patent No.: US 12,779,581 B2
(45) Date of Patent: Nov. 3, 2026

(54) LASER PROCESSING APPARATUS

(71) Applicant: Keyence Corporation, Osaka (JP)

(72) Inventors: Ryohei Suzaki, Osaka (JP); Monika Imanishi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 1035 days.

(21) Appl. No.: 17/980,574

(22) Filed: Nov. 4, 2022

(65) Prior Publication Data

US 2023/0150059 A1 May 18, 2023

(30) Foreign Application Priority Data

Nov. 17, 2021 (JP) ................................ 2021-186967

(51) Int. Cl.
*B23K 26/28* (2014.01)
*B23K 26/064* (2014.01)
*B23K 26/38* (2014.01)

(52) U.S. Cl.
CPC ............ *B23K 26/064* (2015.10); *B23K 26/38* (2013.01)

(58) Field of Classification Search
CPC .............................. B23K 26/38; B23K 26/064
USPC ..................................................... 219/121.67
See application file for complete search history.

(56) References Cited

U.S. PATENT DOCUMENTS 5,323,269 A * 6/1994 Walker ................ B23K 26/702 219/121.62
6,605,796 B2 * 8/2003 Brandinger .......... B23K 26/702 219/121.74
6,827,816 B1 * 12/2004 Uziel .................... B08B 7/0035 156/345.39
7,139,294 B2 * 11/2006 Sun ......................... H01S 3/109 219/121.76
8,030,593 B2 * 10/2011 Yoshikawa .......... B23K 26/082 385/74
10,213,974 B2 * 2/2019 Yajima .................. B29C 66/028
11,005,228 B2 5/2021 Sato et al.
(Continued)

FOREIGN PATENT DOCUMENTS

CN 108971751 A 12/2018
CN 213827521 U 7/2021
(Continued)

OTHER PUBLICATIONS

Office Action issued in corresponding Japanese Patent Application No. 2021-186969 mailed Apr. 22, 2025 (9 pages).
(Continued)

*Primary Examiner* — Jimmy Chou
(74) *Attorney, Agent, or Firm* — Kilyk & Bowersox, P.L.L.C.

(57) ABSTRACT

To suppress interference between a member for supporting a housing and a workpiece while bringing the housing and the workpiece close to each other. A laser processing apparatus includes: a laser light scanning section that deflects laser light to be emitted toward an irradiation area in accordance with a predetermined processing setting; and a housing that accommodates the laser light scanning section. In the housing, an exit window transmitting the laser light emitted toward the irradiation area via the laser light scanning section, and a top surface arranged to face the exit window and attached to the attachment target position are formed.

17 Claims, 25 Drawing Sheets

(56) References Cited

U.S. PATENT DOCUMENTS

| | | | | |
|---|---|---|---|---|
| 2003/0047541 | A1* | 3/2003 | Sun | B23K 26/0622 219/121.61 |
| 2003/0160029 | A1* | 8/2003 | Yasoda | B23K 26/18 219/121.7 |
| 2004/0155019 | A1* | 8/2004 | Tanaka | B23K 26/0604 219/121.75 |
| 2008/0067251 | A1 | 3/2008 | Yoshimoto et al. | |
| 2013/0334183 | A1* | 12/2013 | Paganelli | B23K 26/21 219/121.75 |
| 2014/0312009 | A1* | 10/2014 | Okabe | C22C 38/001 219/121.29 |
| 2015/0001195 | A1* | 1/2015 | Okada | B23K 26/38 219/121.84 |
| 2015/0145241 | A1* | 5/2015 | Asami | B23K 26/282 219/121.64 |
| 2016/0059347 | A1* | 3/2016 | Kogel-Hollacher | B23K 26/082 219/121.73 |
| 2016/0250714 | A1* | 9/2016 | Zhang | B23K 26/36 219/121.61 |
| 2017/0270434 | A1* | 9/2017 | Takigawa | B23K 26/38 |
| 2018/0281109 | A1* | 10/2018 | Onodera | B23K 26/705 |
| 2018/0290255 | A1* | 10/2018 | Yada | B23Q 17/0952 |
| 2018/0299260 | A1* | 10/2018 | Nakamura | B23K 26/032 |
| 2018/0345406 | A1 | 12/2018 | Nakamura et al. | |
| 2018/0350622 | A1* | 12/2018 | Ikenoue | B23K 26/0738 |
| 2019/0030641 | A1* | 1/2019 | Nagayasu | G02B 6/4214 |
| 2019/0039174 | A1* | 2/2019 | Okuma | B23K 26/064 |
| 2019/0047084 | A1* | 2/2019 | Okuma | B23K 26/0648 |
| 2019/0076960 | A1* | 3/2019 | Yamaguchi | B23K 26/21 |
| 2019/0084089 | A1* | 3/2019 | Igasaki | B23K 26/0884 |
| 2019/0184491 | A1* | 6/2019 | Idaka | B23K 26/355 |
| 2019/0190227 | A1* | 6/2019 | Sato | H01S 3/109 |
| 2019/0262938 | A1* | 8/2019 | Nagayasu | B23K 26/38 |
| 2020/0023461 | A1* | 1/2020 | Galbraith | B23K 26/032 |
| 2020/0055142 | A1* | 2/2020 | Schürmann | B23K 26/21 |
| 2020/0061740 | A1* | 2/2020 | Okuma | B23K 26/032 |
| 2020/0122274 | A1* | 4/2020 | Yamanashi | B23K 37/0461 |
| 2020/0198053 | A1* | 6/2020 | Eizumi | B23K 26/03 |
| 2020/0209522 | A1* | 7/2020 | Yamakawa | B23K 26/0643 |
| 2020/0209523 | A1* | 7/2020 | Nehashi | G01B 11/026 |
| 2021/0135423 | A1* | 5/2021 | Macomber | B23K 26/40 |
| 2021/0170524 | A1* | 6/2021 | Obata | B23K 26/0665 |
| 2021/0260703 | A1* | 8/2021 | Yamanashi | B23K 26/082 |
| 2021/0316395 | A1* | 10/2021 | Nakazawa | G02B 26/101 |
| 2021/0323088 | A1* | 10/2021 | Yokoyama | B23K 26/082 |
| 2023/0191818 | A1* | 6/2023 | Lester | B41M 5/24 347/224 |

FOREIGN PATENT DOCUMENTS

| | | | | |
|---|---|---|---|---|
| CN | 113579485 | A | 11/2021 | |
| JP | 7-33477 | U | 6/1995 | |
| JP | 2003340578 | A | 12/2003 | |
| JP | 2004136351 | A | 5/2004 | |
| JP | 2005186078 | A | 7/2005 | |
| JP | 2008006466 | A | 1/2008 | |
| JP | 2009130143 | A | 6/2009 | |
| JP | 4349220 | B2 | 10/2009 | |
| JP | 2010052033 | A | 3/2010 | |
| JP | 2010105035 | A | 5/2010 | |
| JP | 2012033818 | A | 2/2012 | |
| JP | 2012148313 | A | 8/2012 | |
| JP | 2015044212 | A | 3/2015 | |
| JP | 2015122416 | A | 7/2015 | |
| JP | 2015122450 | A | 7/2015 | |
| JP | 2017113783 | A | 6/2017 | |
| JP | 2018103212 | A | 7/2018 | |
| JP | 2018187878 | A | 11/2018 | |
| JP | 2019104047 | A | 6/2019 | |
| JP | 2020037444 | A | 3/2020 | |
| JP | 2020063075 | A | 4/2020 | |
| JP | 2021010945 | A | 2/2021 | |
| WO | WO-2012140797 | A1 * | 10/2012 | B23K 26/082 |

OTHER PUBLICATIONS

Office Action issued in corresponding Japanese Patent Application No. 2024-003055 mailed Jan. 7, 2025 (6 pages).
Office Action issued in corresponding Japanese Patent Application No. 2024-003055 mailed Feb. 18, 2025 (6 pages).
Hiromi Nozaki, "Man-Machine Interface in Copiers," Journal of Electrophotography, 1984, vol. 23, No. 1 (11 pages).
Portions of Webpage from Sun-Tec Co, Ltd entitled: Label Printer • Winding integration machine, Printer integration labeler, Printing inspection winding machine, and Robot integration Label printer Labeler Sealing Leser marking (2012)—(pp. 1 to 3 in English).
Office Action issued in corresponding Japanese Patent Application No. 2021-186967 mailed Nov. 25, 2025 (10 pages).
Office Action issued in corresponding Chinese Patent Application No. 202510973599.5 issued Dec. 24, 2025 (12 pages).
Office Action issued in corresponding Chinese Patent Application No. 202510981914.9 issued Nov. 30, 2025 (10 pages).
U.S. Appl. No. 17/980,576, filed Nov. 4, 2022 (79 pages).
U.S. Appl. No. 17/980,578, filed Nov. 4, 2022 (75 pages).
U.S. Appl. No. 17/981,501, filed Nov. 7, 2022 (105 pages).

* cited by examiner

LASER PROCESSING APPARATUS

CROSS-REFERENCE TO RELATED APPLICATIONS

The present application claims foreign priority based on Japanese Patent Application No. 2021-186967, filed Nov. 17, 2021, the contents of which are incorporated herein by reference.

BACKGROUND OF THE INVENTION

1. Field of the Invention

The technology disclosed herein relates to a laser processing apparatus.

2. Description of Related Art

JP 2019-104047 A discloses an example of a laser processing apparatus.

Specifically, a laser machining device according to JP 2019-104047 A includes: a laser light deflection section (laser light scanning section) that deflects laser light; a housing that accommodates the laser light deflection section; and an exit window section that is formed on a lower surface of the housing and transmits the laser light deflected by the laser light deflection section.

Incidentally, in the laser machining device as disclosed in JP 2019-104047 A, there is a case where a distance (workpiece distance) from the exit window section to a workpiece is set as an index indicating an installation situation in which a preferable machining result is obtained.

Further, in a case where the exit window section is formed on the lower surface of the housing as in the laser machining device according to JP 2019-104047 A, it has been conventionally known to adjust a height position of the exit window section so as to achieve the workpiece distance by supporting the lower surface of the housing from below by a predetermined member (hereinafter, referred to as a “support member”) for supporting the housing and adjusting a height of the support member.

On the other hand, it is conceivable to set a position of a workpiece corresponding to a workpiece distance set in a laser processing apparatus close to a lower surface of a housing in a height direction in order to reduce an installation space of the laser processing apparatus. However, when the position of the workpiece is brought close to the lower surface of the housing, there is a concern about interference between the support member and the workpiece.

SUMMARY OF THE INVENTION

The technology disclosed herein has been made in view of such a point, and an object thereof is to suppress interference between a member for supporting a housing and a workpiece while bringing the housing and the workpiece close to each other.

According to one embodiment of the disclosure, provided is a laser processing apparatus that is attached to an attachment target position and irradiates an irradiation area with laser light to process a workpiece. The laser processing apparatus includes: a laser light deflection section that deflects the laser light to be emitted toward the irradiation area in accordance with a predetermined processing setting; and a housing that accommodates the laser light deflection section.

Further, according to the one embodiment of the disclosure, in the housing, an exit window transmitting the laser light emitted toward the irradiation area via the laser light deflection section, and an attachment surface arranged to face the exit window and attached to the attachment target position are formed.

According to the one embodiment, in the housing according to the one embodiment, the attachment surface is formed on an opposite side of the exit window. Since the housing is configured such that not one outer surface on which the exit window is formed, but the attachment surface facing the opposite side thereof is attached to the attachment target position, the housing can be supported to be suspended from the attachment target position. This eliminates the need for interposing the support member between the housing and the workpiece, and thus, the housing and the workpiece can be brought close to each other.

At this time, a member (the support member) for supporting the housing is located on the opposite side of the exit window similarly to the attachment target position, and thus, can be sufficiently separated from the workpiece. This makes it possible to suppress the interference between the support member and the workpiece while bringing the housing and the workpiece close to each other.

In addition, according to another embodiment of the disclosure, the housing may accommodate: a solid-state laser crystal generating the laser light based on excitation light; and a support plate extending along a direction from the attachment surface toward the exit window and supporting the solid-state laser crystal, and the support plate may be attached to the housing in a state of not being integrated with the attachment surface.

According to the another embodiment, it is possible to suppress an influence of distortion, vibration, and the like, generated on the attachment surface at the attachment target position, on the solid-state laser crystal. As a result, the laser light can be favorably generated even in a case where the housing is configured to be supported at the attachment target position.

In addition, according to still another embodiment of the disclosure, the attachment surface may be provided with an attachment capable of attaching the attachment surface to the attachment target position.

According to the still another embodiment, since the support member provided at the attachment target position and the attachment surface of the housing are connected to each other via the attachment instead of being directly connected, the housing can be attached to the support member that can take various forms without devising a structure of the housing itself. This is advantageous in terms of facilitating replacement of various processing apparatuses with the laser processing apparatus according to the disclosure in a manufacturing line in which use of the various processing apparatuses is assumed.

In addition, according to still another embodiment of the disclosure, the housing may include: an exit surface on which the exit window is formed; and an open surface which surrounds the laser light deflection section together with the attachment surface and the exit surface and is at least partially open to communicate with the exit window, and the open surface may be provided with a cover member capable of opening and closing the open surface.

According to the still another embodiment, the open surface is configured to be openable and closable, instead of the exit surface facing the workpiece and the attachment surface attached to the attachment target position, so that the exit window can be accessed without causing interference with the workpiece, the support member, and the like. Accordingly, maintainability of the laser processing apparatus can be improved.

In addition, according to still another embodiment of the disclosure, the housing may include a connection surface which faces an opposite side of the open surface and surrounds the laser light deflection section together with the open surface, the attachment surface, and the exit surface, and an electric cable for supplying electric power into the housing may be connected to the connection surface.

According to the still another embodiment, the open surface provided with the cover member and the connection surface to which the electric cable is connected are located on the opposite side. Interference between the cover member and the electric cable is suppressed when the cover member is opened, closed, attached, or detached. Accordingly, maintainability of the laser processing apparatus can be improved.

In addition, according to still another embodiment of the disclosure, the workpiece may be conveyed in a predetermined conveyance direction, the irradiation area may have a constant dimension in the conveyance direction, and a spot diameter of the laser light on the workpiece may be set such that a depth of focus of the laser light corresponds to a portion of the irradiation area where an optical path length of the laser light is longest and a portion of the irradiation area where the optical path length is shortest.

In addition, according to still another embodiment of the disclosure, a path corresponding to the irradiation area out of a movement path of the workpiece may include a site having a different distance from the exit window.

In addition, according to still another embodiment of the disclosure, the workpiece may be conveyed in a predetermined conveyance direction, a dimension of the irradiation area in the conveyance direction may be 120 $mm^2$ or more, the laser light deflection section may include a first mirror which deflects the laser light to irradiate the irradiation area, the first mirror may be arranged to face the workpiece across the exit window, a relative position of the workpiece with respect to the housing may be set such that a distance from the first mirror to the workpiece is 150 mm or less, and a spot diameter of the laser light on the workpiece at the relative position may be 60 μm or more.

In general, an optical path length difference between a central portion and an end of the irradiation area increases as the dimension of the irradiation area increases. In this case, laser light having a predetermined depth of focus or more is required in order to adopt a configuration in which the optical path length difference is allowed without separately providing a mechanism for adjusting the focus of the laser light.

According to findings obtained as results of intensive studies by the inventors of this application, a sufficient depth of focus can be secured by setting the spot diameter of the laser light on the workpiece to 60 μm or more in the layout set as in the still another embodiment.

In addition, according still another embodiment of the disclosure, provided is a laser processing apparatus that is supported by a support member connectable to a connection surface in a substantially rectangular parallelepiped printing apparatus including a printing surface on which a printing section that comes into contact with a printing area on a workpiece is exposed and the connection surface different from the printing surface, and emits laser light toward an irradiation area set in accordance with the printing area to process the workpiece. The laser processing apparatus includes: a laser light deflection section that deflects the laser light to be emitted toward the irradiation area in accordance with a predetermined processing setting; and a housing that accommodates the laser light deflection section.

Further, according to the still another embodiment of the disclosure, in the housing, an exit window transmitting the laser light emitted toward the irradiation area via the laser light deflection section, and an attachment surface connected to the support member are formed.

According to the still another embodiment, in the housing according to the still another embodiment, the exit window corresponding to the printing section in the substantially rectangular parallelepiped printing apparatus and the attachment surface corresponding to the connection surface in the printing apparatus are formed. Here, the support member is configured to be connected to the attachment surface, so that the housing can be supported by the support member from the side or above. As a result, the housing and the workpiece can be brought close to each other as compared with a configuration in which the housing is supported from below.

At this time, the support member is located on the side or above the housing in order to support the housing, and thus, can be sufficiently separated from the workpiece. This makes it possible to suppress the interference between the support member and the workpiece while bringing the housing and the workpiece close.

In addition, according to still another embodiment of the disclosure, the workpiece may be a workpiece that is conveyed in a state of being placed around a conveyance roller, and the conveyance roller may be arranged to overlap the irradiation area.

In addition, according to still another embodiment of the disclosure, the workpiece may be conveyed in a predetermined conveyance direction, a dimension of the irradiation area in the conveyance direction may be 120 $mm^2$ or more, an output of the laser light transmitted through the exit window may be set to 2 W or less, and a spot diameter of the laser light on the irradiation area may be set to 60 μm or more.

According to findings obtained as results of intensive studies by the inventors of this application, it is possible to achieve downsizing of the housing while securing a sufficient depth of focus by adopting the configuration of the still another embodiment.

As described above, it is possible to suppress the interference between the member for supporting the housing and the workpiece while bringing the housing and the workpiece close to each other according to the disclosure.

DETAILED DESCRIPTION OF PREFERRED EMBODIMENTS

Hereinafter, an embodiment of the disclosure will be described with reference to the drawings. Note that the following description is given as an example.

That is, a laser marker is described as an example of a laser processing apparatus in this specification, but the technology disclosed herein can be applied to general laser-applied devices regardless of the names of the laser processing apparatus and the laser marker.

In addition, printing will be described as a typical example of processing in this specification, but the technology can be used in various types of processing using laser light such as image marking without being limited to the printing.

<Overall Configuration>

Figure 1:
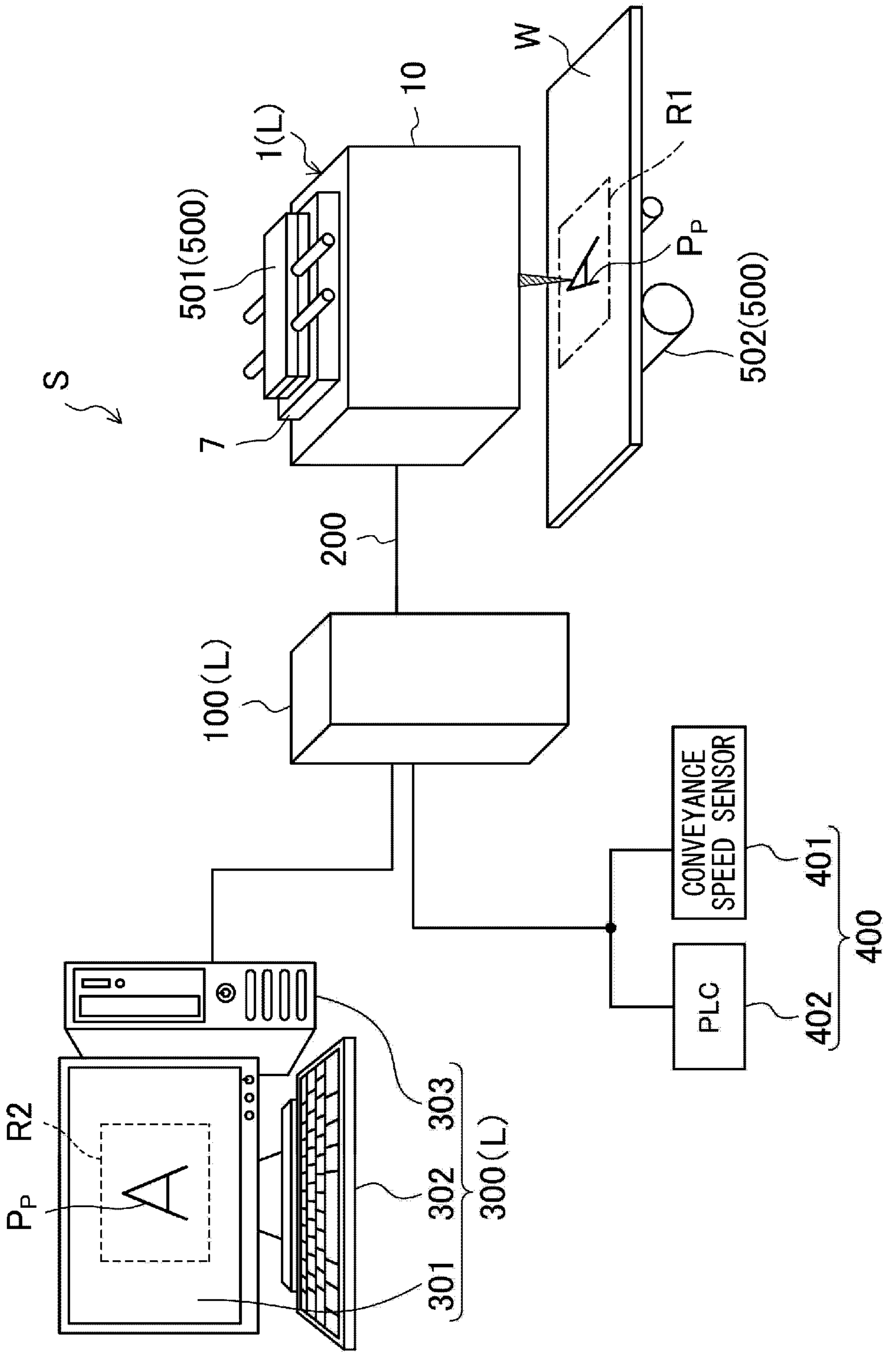
FIG. 1 is a diagram illustrating an overall configuration of a laser processing system.
Figure 2:
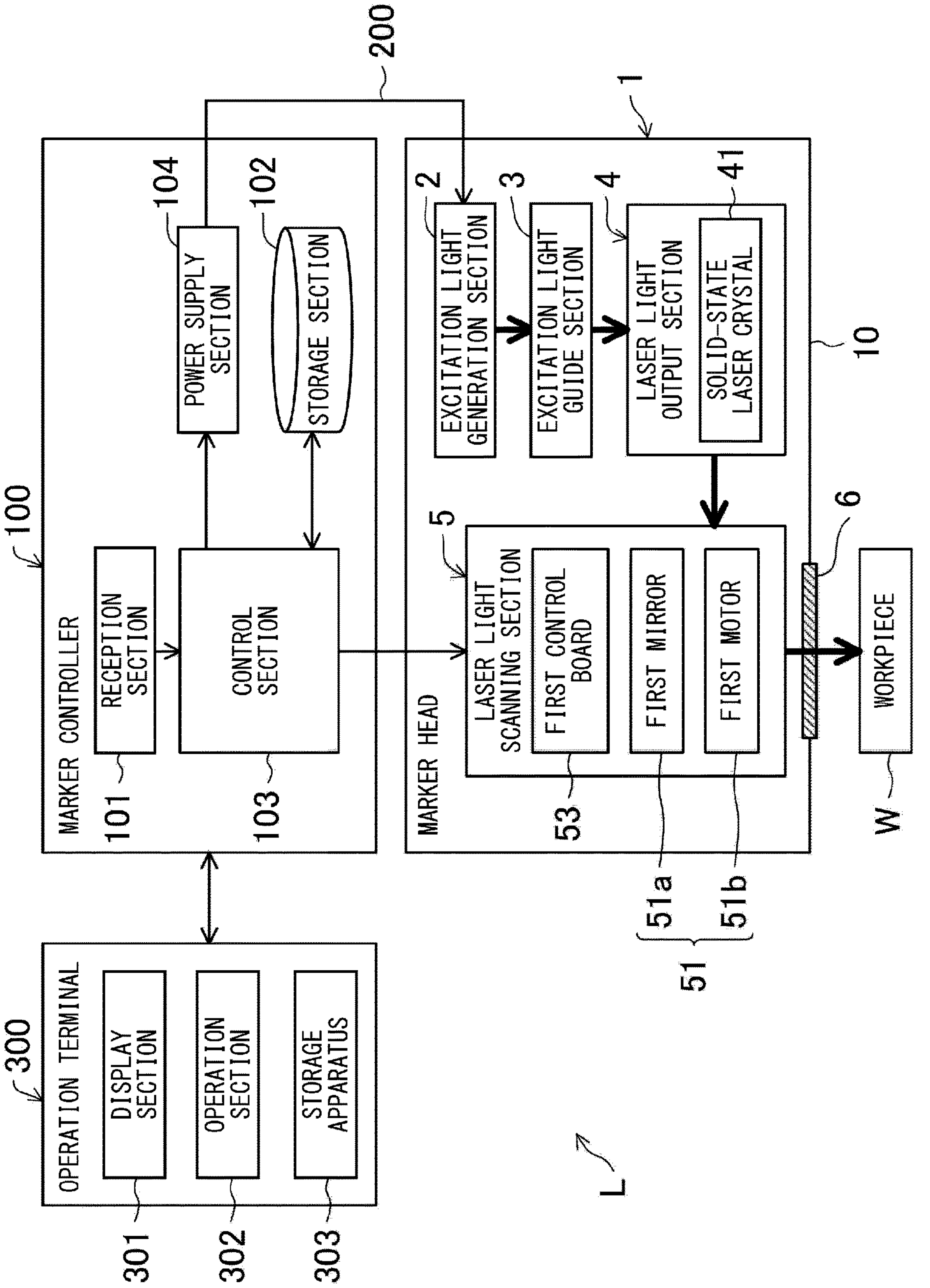
FIG. 2 is a block diagram illustrating a schematic configuration of a laser processing apparatus.
Figure 17A:
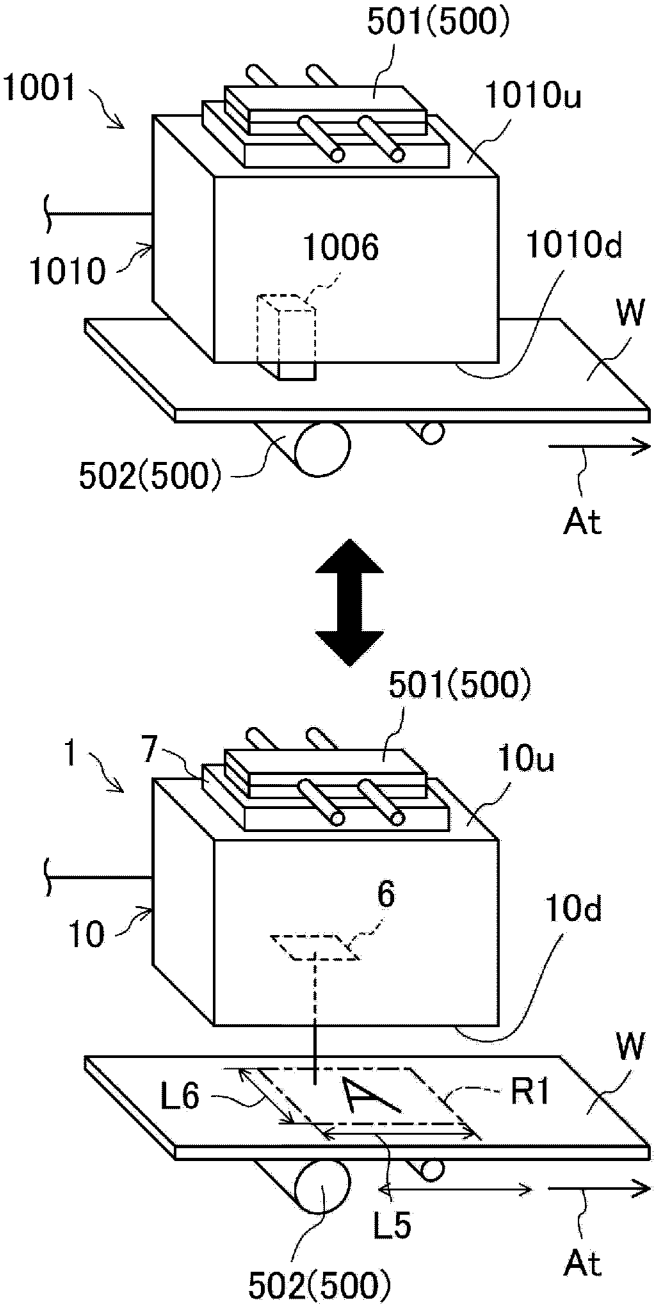
FIG. 17A is a schematic view for describing replacement of a printing apparatus and the marker head.
Figure 17B:
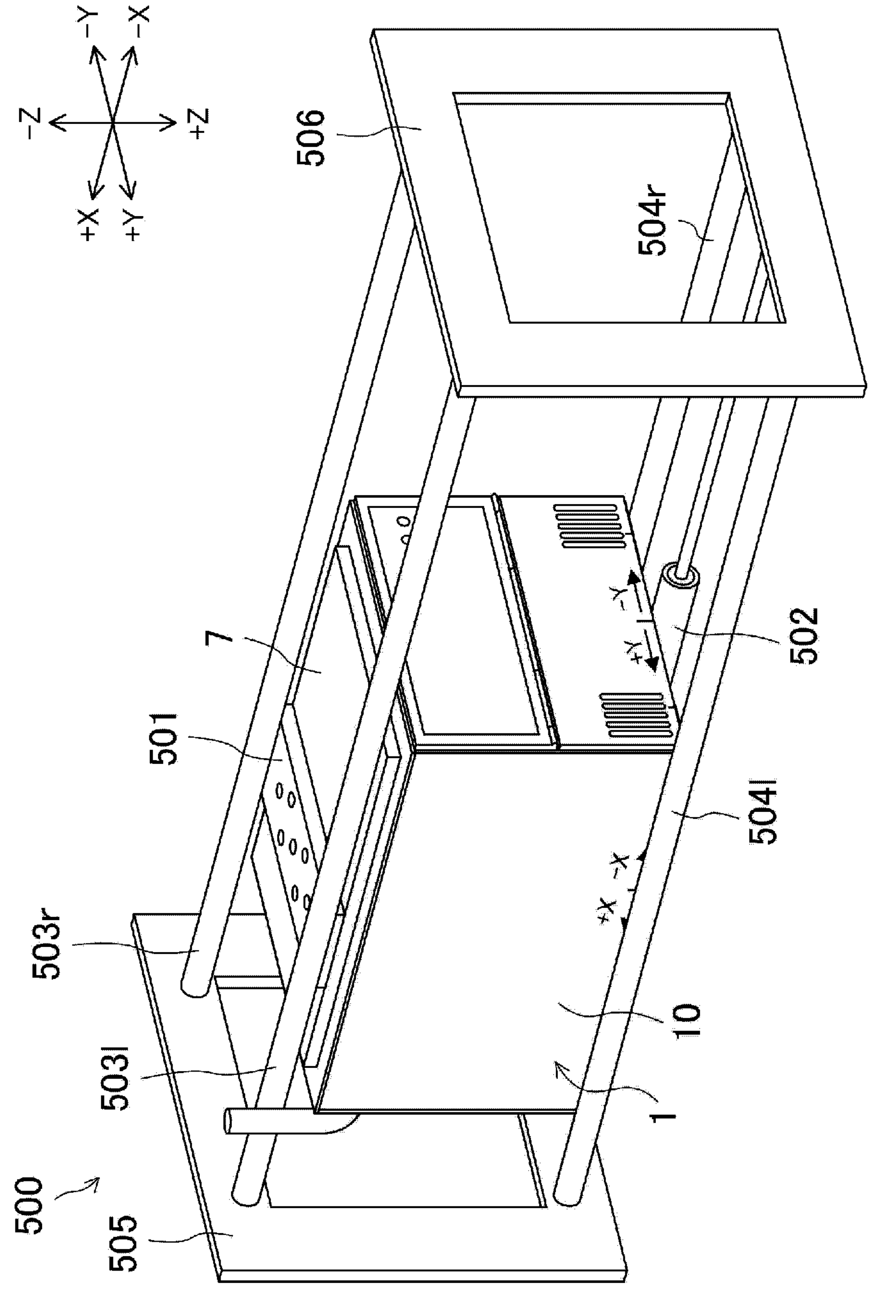
FIG. 17B is a perspective view for describing attachment of the marker head to the support member.

FIG. 1 is a diagram illustrating an overall configuration of a laser processing system S, and FIG. 2 is a diagram illustrating a schematic configuration of a laser processing apparatus L in the laser processing system S. In addition, FIG. 17A is a schematic view for describing replacement of a printing apparatus 1001 and a marker head 1, and FIG. 17B is a perspective view for describing attachment of the marker head 1 to a support member 501.

The laser processing system S illustrated in FIG. 1 includes the laser processing apparatus L and an external device 400 connected thereto. Among these, the laser processing apparatus L illustrated in FIGS. 1 and 2 is configured to perform processing corresponding to a predetermined processing pattern Pp on a workpiece W by irradiating a predetermined irradiation area R1 with laser light.

Note that the irradiation area R1 referred to herein is an area set on the surface of the workpiece W, and can take various forms in accordance with a relative positional relationship between the laser processing apparatus L and the workpiece W, specifications of the laser processing apparatus L, a movement path of the workpiece W, and the like. The irradiation area R1 according to this embodiment is configured as a rectangular area as illustrated in FIG. 1.

In particular, the laser processing apparatus L according to this embodiment can emit laser light having a wavelength near 350 nm as the laser light for processing the workpiece W. This wavelength corresponds to a wavelength range of ultraviolet rays. Therefore, the laser light for processing the workpiece W is sometimes referred to as "UV laser light" to be distinguished from other laser light such as near-infrared rays in the following description. Note that laser light other than the ultraviolet rays such as infrared rays may be used for processing the workpiece W.

Hereinafter, a case will be described in which the workpiece W made of a sheet-like film is set as an object to be processed, and the film contains a UV-reactive layer that chemically reacts with UV laser light.

However, the workpiece W that can be used as the object to be processed is not limited to the film containing the UV-reactive layer in the laser processing apparatus L according to the disclosure. A film that chemically reacts with laser light having a wavelength other than the ultraviolet rays may be used, or the workpiece W made of various materials, such as paper and a synthetic resin, may be used as the object to be processed.

Figure 18:
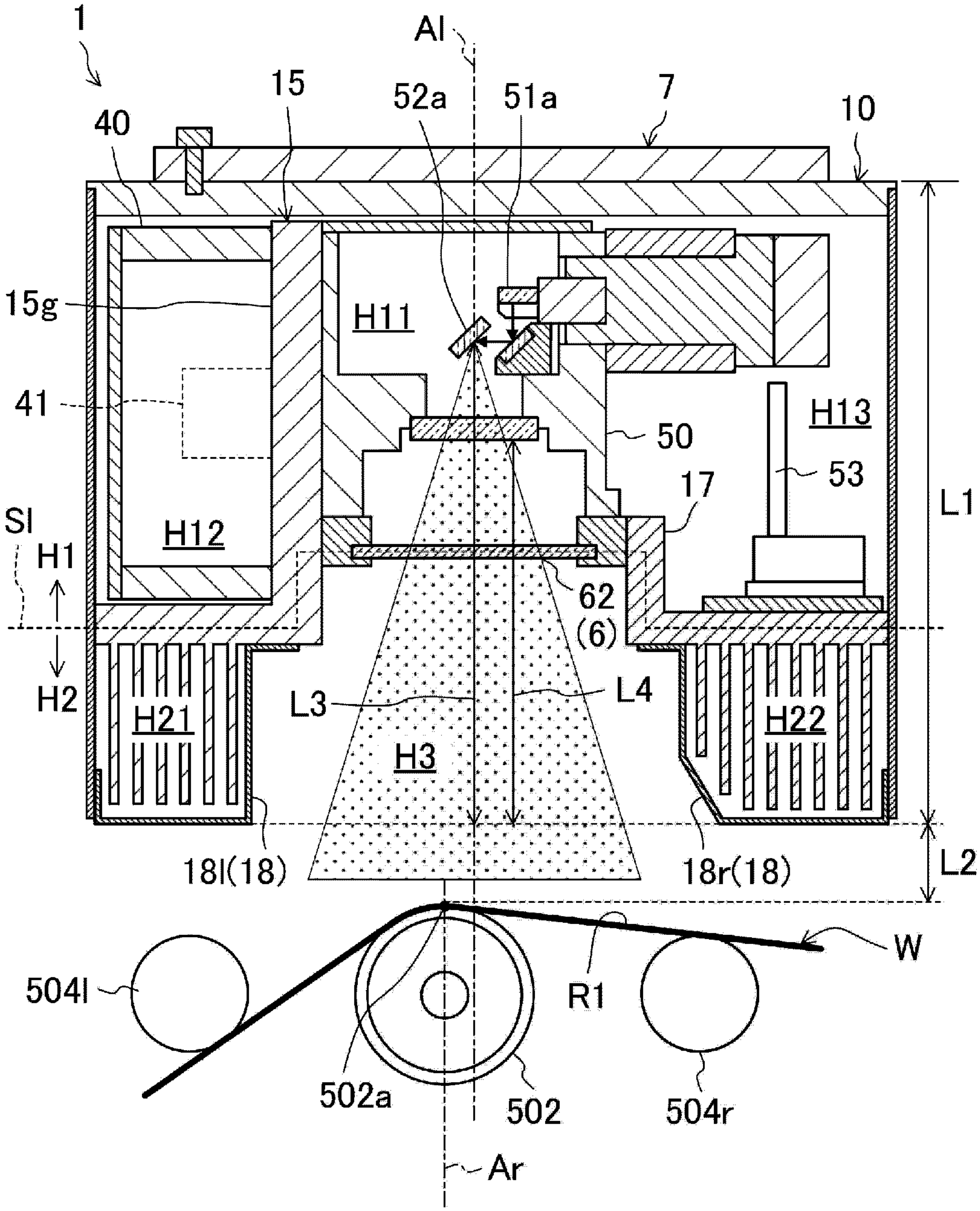
FIG. 18 is a diagram for describing various dimensions of the marker head and the support member.

In addition, the laser processing apparatus L according to this embodiment is configured to perform so-called two-dimensional printing by performing two-dimensional scanning with laser light, but so-called three-dimensional printing can also be performed since the laser processing apparatus L is configured to have a deep depth of focus as will be described later. Therefore, the laser processing apparatus L can process even the workpiece W conveyed along a three-dimensional movement path as illustrated in FIG. 18 to be described later.

As illustrated in FIGS. 1 and 2, the laser processing apparatus L according to this embodiment includes the marker head 1, a marker controller 100, an electric cable 200, and an operation terminal 300.

Among these, the marker controller 100 can receive a setting related to a processing pattern and supply electric power to the outside, and is configured as a controller for controlling the marker head 1.

On the other hand, the marker head 1 can irradiate the irradiation area R1 with laser light by being controlled by the marker controller 100.

The marker head 1 and the marker controller 100 are separated from each other in this embodiment, and are connected by the electric cable 200. The electric cable 200 includes at least an electric wiring that transmits the electric power from the inside (specifically, a power supply section 104 to be described later) of the marker controller 100 to the outside. Specifically, the electric cable 200 according to this embodiment is configured by bundling the electric wiring for transmitting the electric power and a signal wiring for transmitting and receiving an analog signal, a digital signal, and the like.

The marker head 1 according to this embodiment is installed on the processing equipment 500 that processes the workpiece W made of a sheet-like film. As illustrated in FIGS. 17A and 17B, the processing equipment 500 includes the support member 501 that supports the marker head 1 and a conveyance roller 502 around which the workpiece W is placed.

In addition, the processing equipment 500 further includes: two rail members **503*l* and 503*r* that slidably support the marker head 1 via the support member 501; two fixing members 505 and 506 to which ends of the two rail members 503*l* and 503*r* are attached, respectively; and a first driven roller 504*l* and a second driven roller 504*r* that are driven when the workpiece W is conveyed by driving of the conveyance roller 502 as illustrated in FIGS. 17B, 18, and the like. At this time, the workpiece W is preferably placed around the conveyance roller 502 such that a length of contact between the conveyance roller 502 and the workpiece W is longer than a length of contact between the first driven roller 504*l* and the workpiece W and longer than a length of contact between the second driven roller 504*r* and the workpiece W. Then, when the conveyance roller 502 conveys the workpiece W, the workpiece W is less likely to slip on the conveyance roller 502. Note that the "length of contact" used herein refers to the length viewed in a cross section orthogonal to rotation axes of the conveyance roller 502, the first driven roller 504*l*, and the second driven roller 504*r***.

In this manner, the workpiece W according to this embodiment can be a workpiece that is conveyed in a state of being placed around the conveyance roller 502, and the conveyance roller 502 used at that time may be arranged so as to overlap the irradiation area R1 in a vertical direction (Z direction to be described later), for example, as illustrated in FIG. 1, a lower diagram of FIG. 17A, and FIG. 18.

The support member 501 can attach the laser processing apparatus L, particularly a housing 10 of the marker head 1, to a predetermined attachment target position as illustrated in FIG. 17A. Although FIGS. 1, 17A, and 17B illustrate the support member 501 configured to suspend the housing 10 from above, the housing 10 may be supported from another direction, such as a side, as will be described later.

On the other hand, the conveyance roller 502 is formed in a cylindrical shape having a central axis extending in a lateral direction (front-rear direction to be described later) of the workpiece W. In this case, the workpiece W is conveyed in a longitudinal direction (left-right direction to be described later) along a predetermined movement path by the rotation of the conveyance roller 502.

Here, the processing equipment 500 according to this embodiment is shared between the marker head 1 according to this embodiment and the printing apparatus 1001 that performs printing using a scheme other than laser light as illustrated in the upper diagram and the lower diagram of FIG. 17A.

That is, the marker head 1 according to this embodiment can be attached to the support member 501 of the processing equipment 500, configured to attach the printing apparatus 1001, instead of the printing apparatus 1001.

Examples of the printing apparatus 1001 that can be replaced with the marker head 1 include a thermal transfer overprinter (TTO), but can also be replaced with other printing apparatuses 1001.

As the printing apparatus 1001 that can be replaced with the marker head 1, for example, any printing apparatus provided with a housing 1010 that is formed in a substantially rectangular parallelepiped shape and includes a printing surface **1010*d* obtained by exposing a printing section 1006 in contact with a printing area on the workpiece W, and a connection surface 1010*u* different from the printing surface 1010*d* and connectable to the support member 501**.

In this case, the marker head 1 is supported by the support member 501 connectable to the connection surface **1010*u* similarly to the printing apparatus 1001 as illustrated in the upper diagram and the lower diagram of FIG. 17A. The marker head 1 thus supported irradiates the irradiation area R1 set so as to correspond to the printing area (area in contact with the printing section 1006 in the printing apparatus 1001**) with laser light, thereby processing the workpiece W.

On the other hand, the operation terminal 300 includes, for example, a central processing unit (CPU) and a memory, and is connected to the marker controller 100 so as to be capable of transmitting and receiving an electrical signal in a wired or wireless manner.

The operation terminal 300 functions as a terminal configured to set various processing conditions (also referred to as printing conditions) such as printing settings and to display information related to the processing of the workpiece W to a user. The operation terminal 300 includes a display section 301 configured to display information to the user, an operation section 302 that receives an operation input from the user, and a storage apparatus 303 configured to store various types of information.

For example, the display section 301 is configured using, for example, a liquid crystal display or an organic EL panel. The operation section 302 can be configured using a keyboard and a pointing device. Here, the pointing device includes a mouse, a joystick, or the like. Instead of the pointing device, the operation section 302 may be configured using, for example, a touch panel console directly connected to the marker controller 100.

The operation terminal 300 configured as described above can set processing conditions in laser processing based on the operation input from the user. The processing conditions include one or more of contents (the processing pattern Pp) of a character string and a figure that need to be printed on the workpiece W, a target output (laser power) of laser light, and a scanning speed (scan speed) of the laser light on the workpiece W.

The processing conditions set by the operation terminal 300 are output to the marker controller 100 and stored in the storage section 102 of the marker controller 100. A storage apparatus 303 in the operation terminal 300 may store the processing conditions if necessary.

Note that the operation terminal 300 can be integrated into the marker controller 100, for example.

The external device 400 is connected to the marker controller 100 as necessary. In the example illustrated in FIGS. 1 and 2, a conveyance speed sensor 401 and a programmable logic controller (PLC) 402 are provided as the external device 400.

The conveyance speed sensor 401 is configured using, for example, a rotary encoder, and can detect a conveyance speed of the workpiece W. The conveyance speed sensor 401 outputs a signal (detection signal) indicating a detection result to the marker controller 100. The marker controller 100 controls two-dimensional scanning or the like of laser light based on the detection signal input from the conveyance speed sensor 401.

The PLC 402 is configured using, for example, a microprocessor, and can input a control signal to the marker controller 100. The PLC 402 is used to control the laser processing system S according to a predetermined sequence.

In addition to the above-described devices and apparatuses, an apparatus configured to perform operation and control, a computer configured to perform various other processes, a storage apparatus, a peripheral device, and the like can be connected to the laser processing apparatus L in a wired or wireless manner.

Hereinafter, a hardware configuration of each of the marker head 1 and the marker controller 100 will be described in detail, and then, an outline of control of the marker head 1 by the marker controller 100 will be described.

<Marker Controller 100>

As illustrated in FIG. 2, the marker controller 100 includes: a reception section 101 that receives settings (processing settings) related to the processing conditions including the processing pattern; the storage section 102 that stores the processing conditions; a control section 103 that controls the marker head 1 based on the processing conditions; and the power supply section 104 as a power supplier that supplies electric power to the marker head 1.

(Reception Section 101)

The reception section 101 is configured to receive the processing conditions input through the operation terminal 300 and output the received processing conditions to the storage section 102 and/or the control section 103.

Specifically, the reception section 101 according to this embodiment is electrically connected to the operation terminal 300, and can display a setting screen (not illustrated) for setting each processing condition on the display section 301 in the operation terminal 300. The reception section 101 can reflect a content input through the setting screen in each processing condition and output the processing condition after the reflection to the storage section 102 and/or the control section 103.

(Storage Section 102)

The storage section 102 is configured to temporarily or continuously store the processing conditions received by the reception section 101, and output the stored processing conditions to the control section 103, the display section 301, or the like if necessary.

Specifically, the storage section 102 according to this embodiment is configured using, for example, a non-volatile memory such as a hard disk drive (HDD) or a solid state drive (SSD), and can temporarily or continuously store data indicating the processing conditions.

(Control Section 103)

The control section 103 is configured to execute processing corresponding to a processing condition on the workpiece W by controlling the power supply section 104, a laser light output section 4, a laser light scanning section 5, and the like based on the processing condition.

Specifically, the control section 103 according to this embodiment includes a processor, a volatile memory, an input/output bus, and the like. The control section 103 generates a control signal based on the processing condition read from the storage section 102 or directly input from the reception section 101, and outputs the generated control signal to each section of the laser processing apparatus L to control the processing of the workpiece W.

For example, when the processing of the workpiece W is started, the control section 103 reads a target output, which is one of the processing conditions from the storage section 102, and inputs a control signal generated in relation to the target output to the power supply section 104 or the like, thereby controlling generation of laser excitation light.

(Power Supply Section 104)

Figure 20:
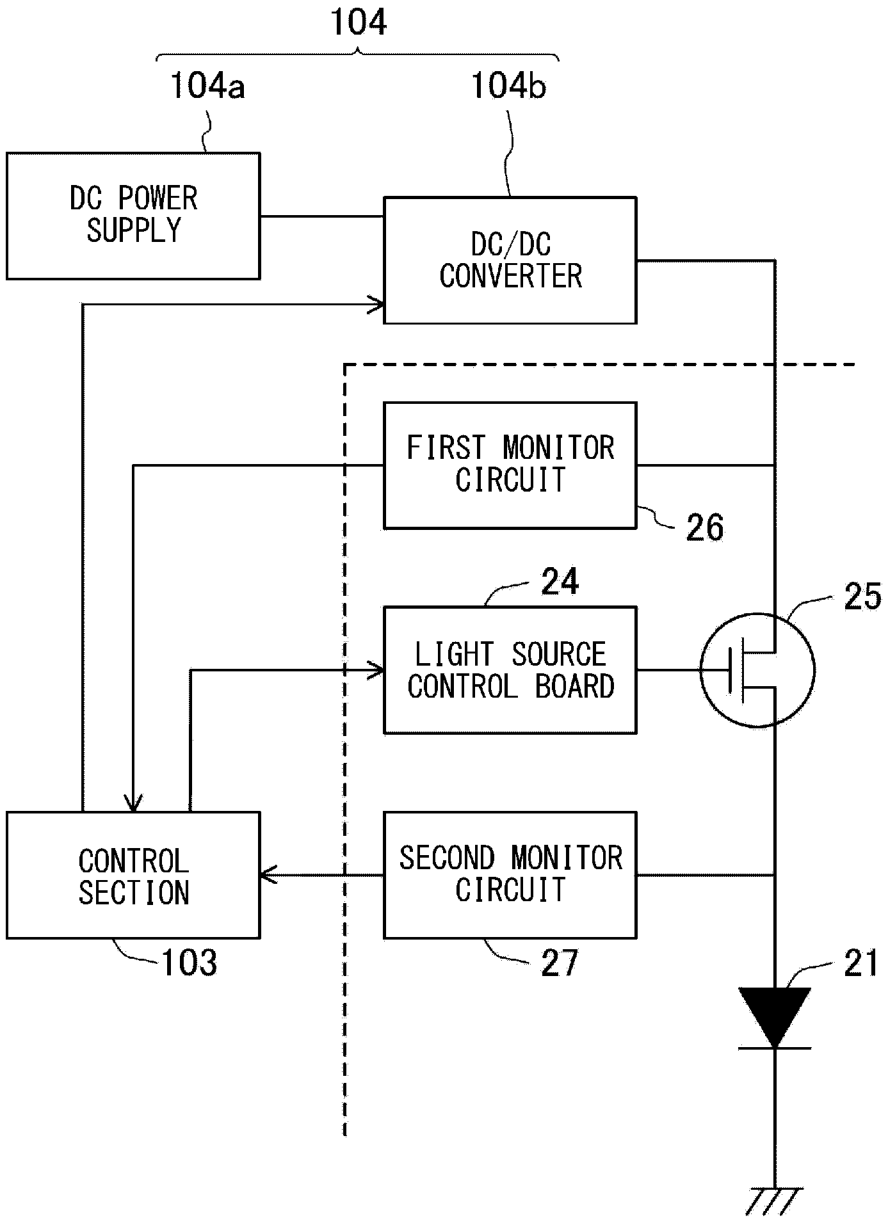
FIG. 20 is a block diagram for describing a circuit structure related to a power supply section.

The power supply section 104 supplies a drive current to an excitation light generation section 2 based on the control signal output from the control section 103. Although not described in detail, the power supply section 104 determines the drive current based on the target output input from the control section 103, and supplies the determined drive current to the excitation light generation section 2. The power supply section 104 supplies the electric power to the excitation light generation section 2, and can be configured using a DC power supply 104*a* or the like as illustrated in FIG. 20 to be described later. Details of the power supply section 104 will be described later.

Note that the excitation light generation section 2 configured using an excitation light source, such as a laser diode, is configured to be built in the marker head 1 instead of the marker controller 100 in this embodiment. The electric power supplied from the power supply section 104 is supplied to the excitation light generation section 2 through the electric cable 200.

<Marker Head 1>

Figure 3A:
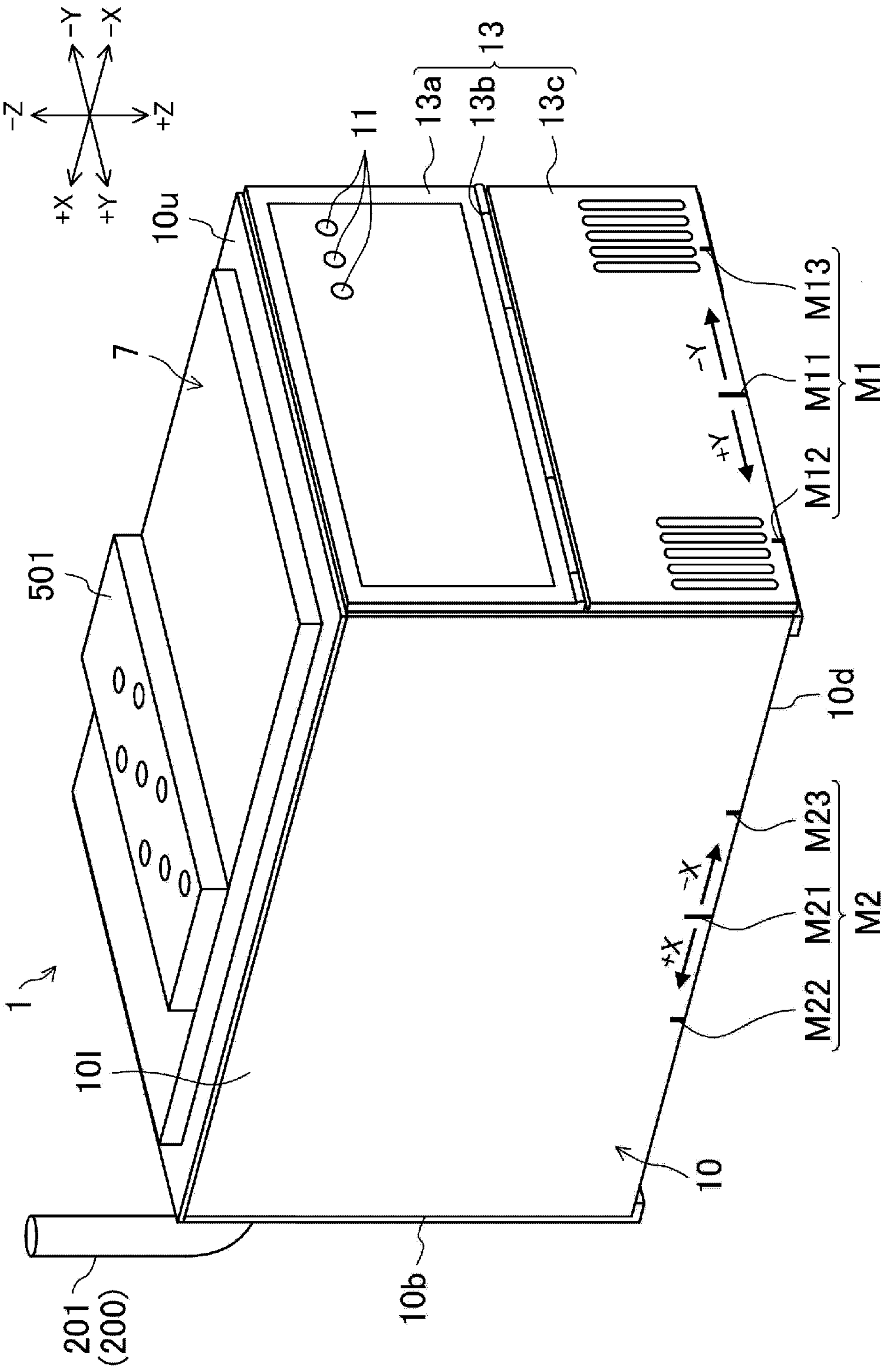
FIG. 3A is a perspective view illustrating an appearance of a marker head.
Figure 3B:
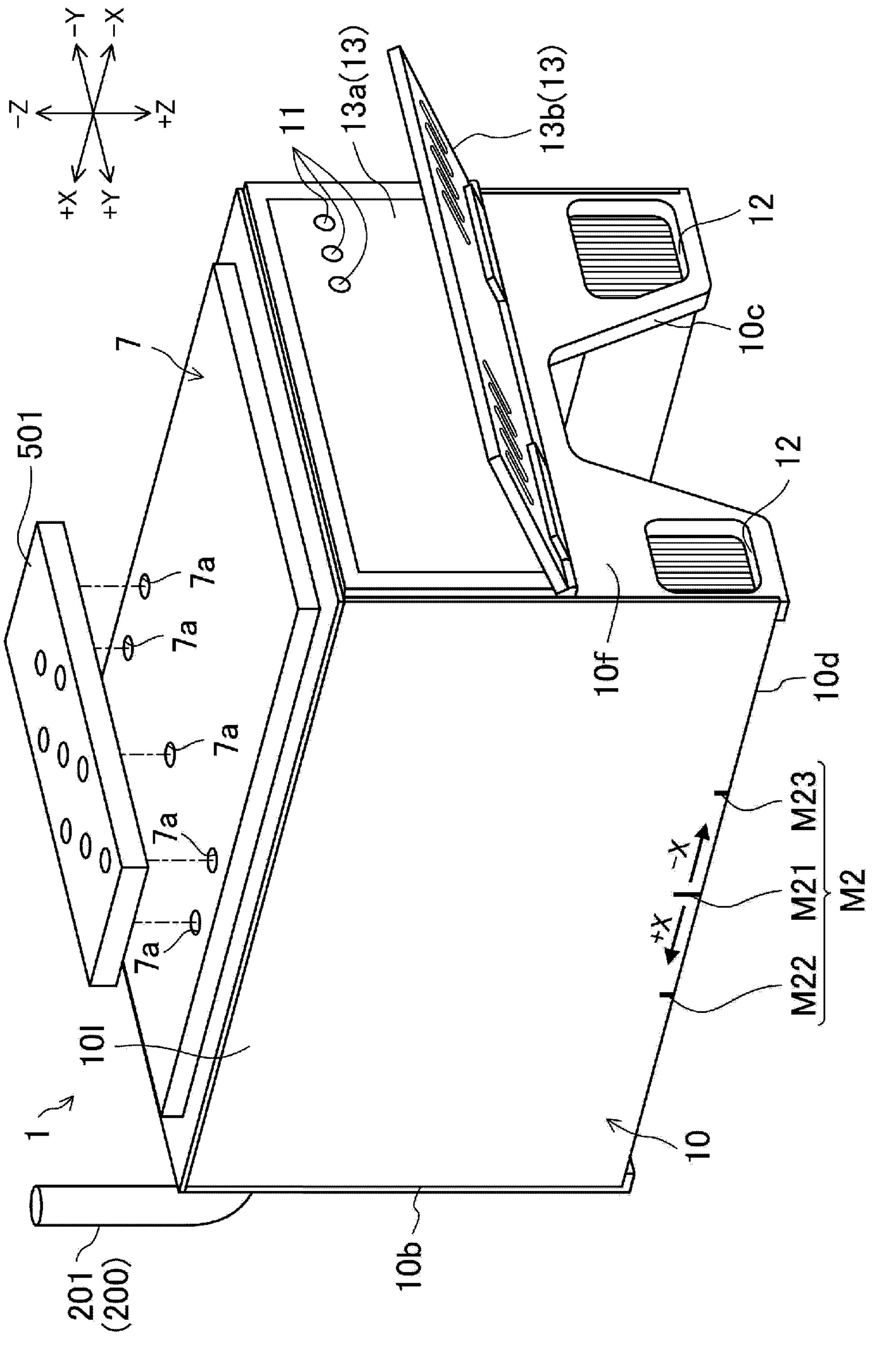
FIG. 3B is a perspective view illustrating the appearance of the marker head.
Figure 4:
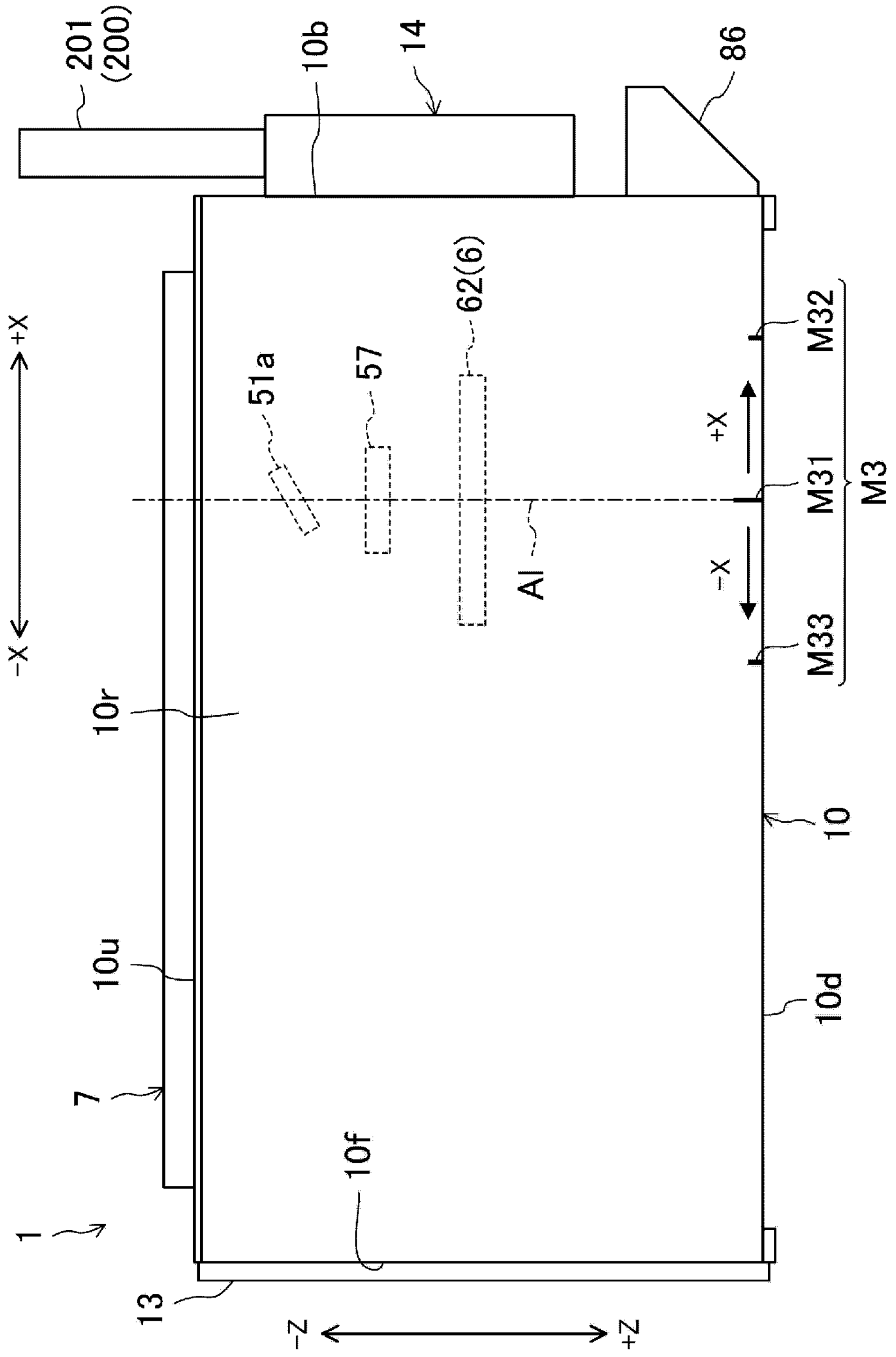
FIG. 4 is a side view of the marker head.
Figure 5:
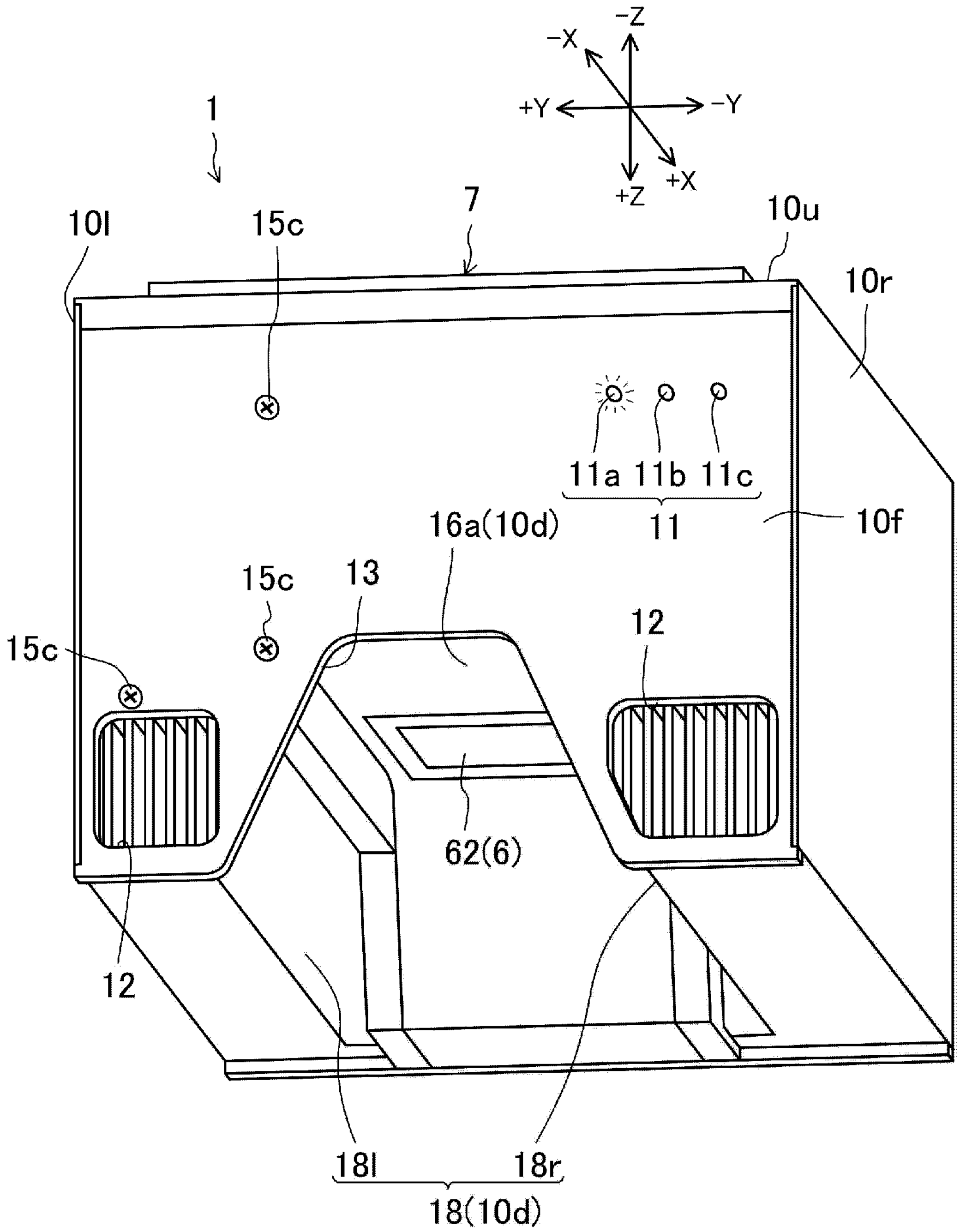
FIG. 5 is a perspective view illustrating a state in which a cover member is removed from the marker head.
Figure 6:
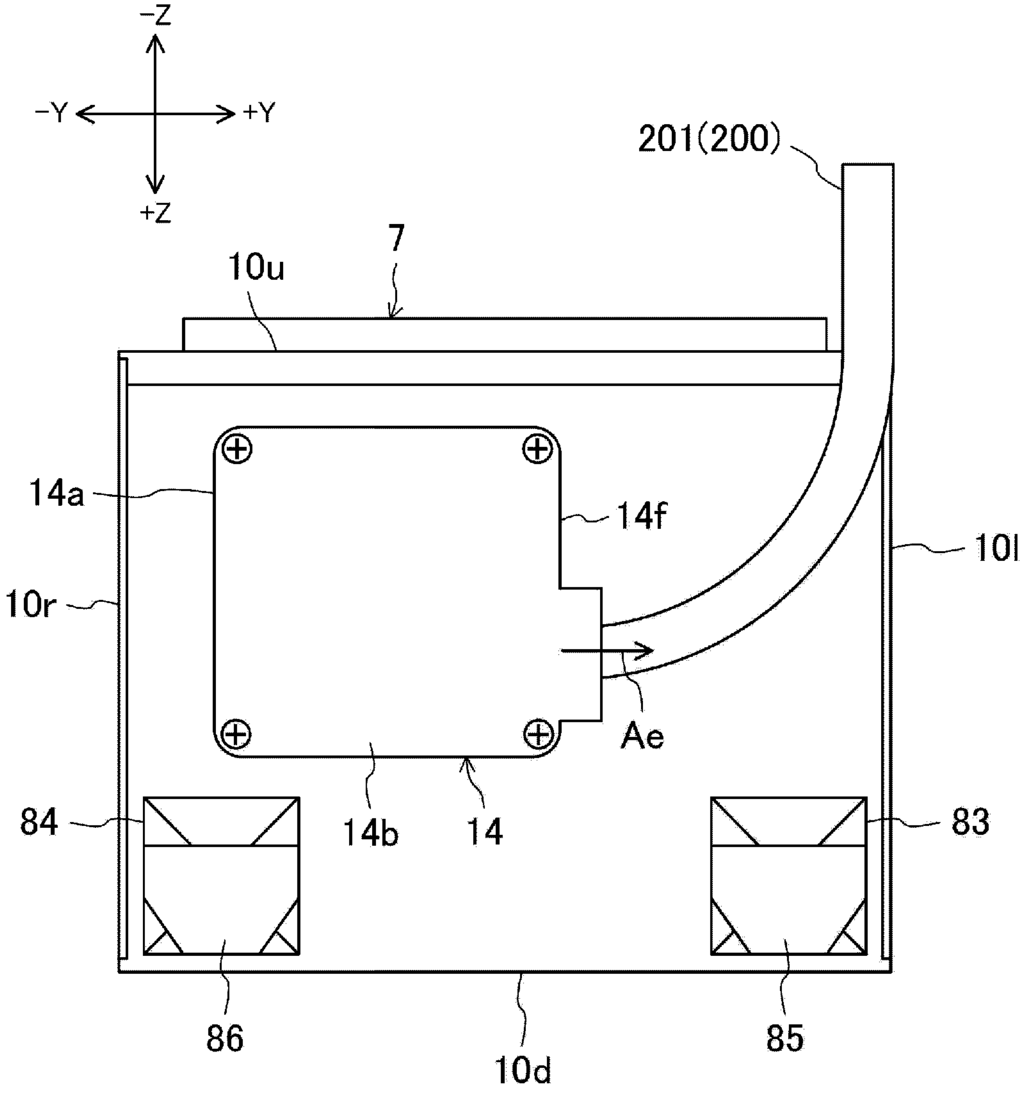
FIG. 6 is a rear view of the marker head.

FIGS. 3A and 3B are perspective views illustrating an appearance of the marker head 1. FIG. 4 is a side view of the marker head 1, FIG. 5 is a perspective view illustrating a state in which a cover member 13 is removed from the marker head 1, and FIG. 6 is a rear view of the marker head 1.

Figure 7:
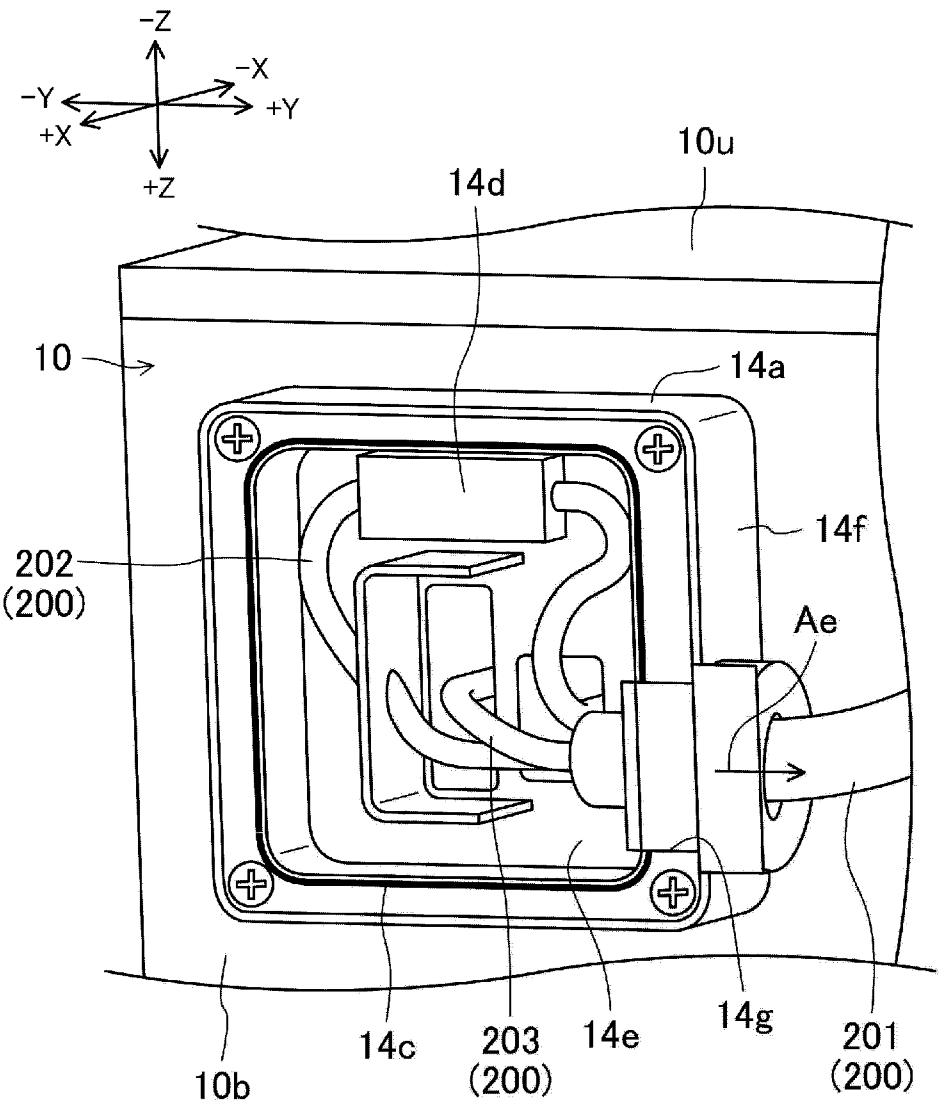
FIG. 7 is a diagram illustrating a connection structure of an electric cable in the marker head.
Figure 8:
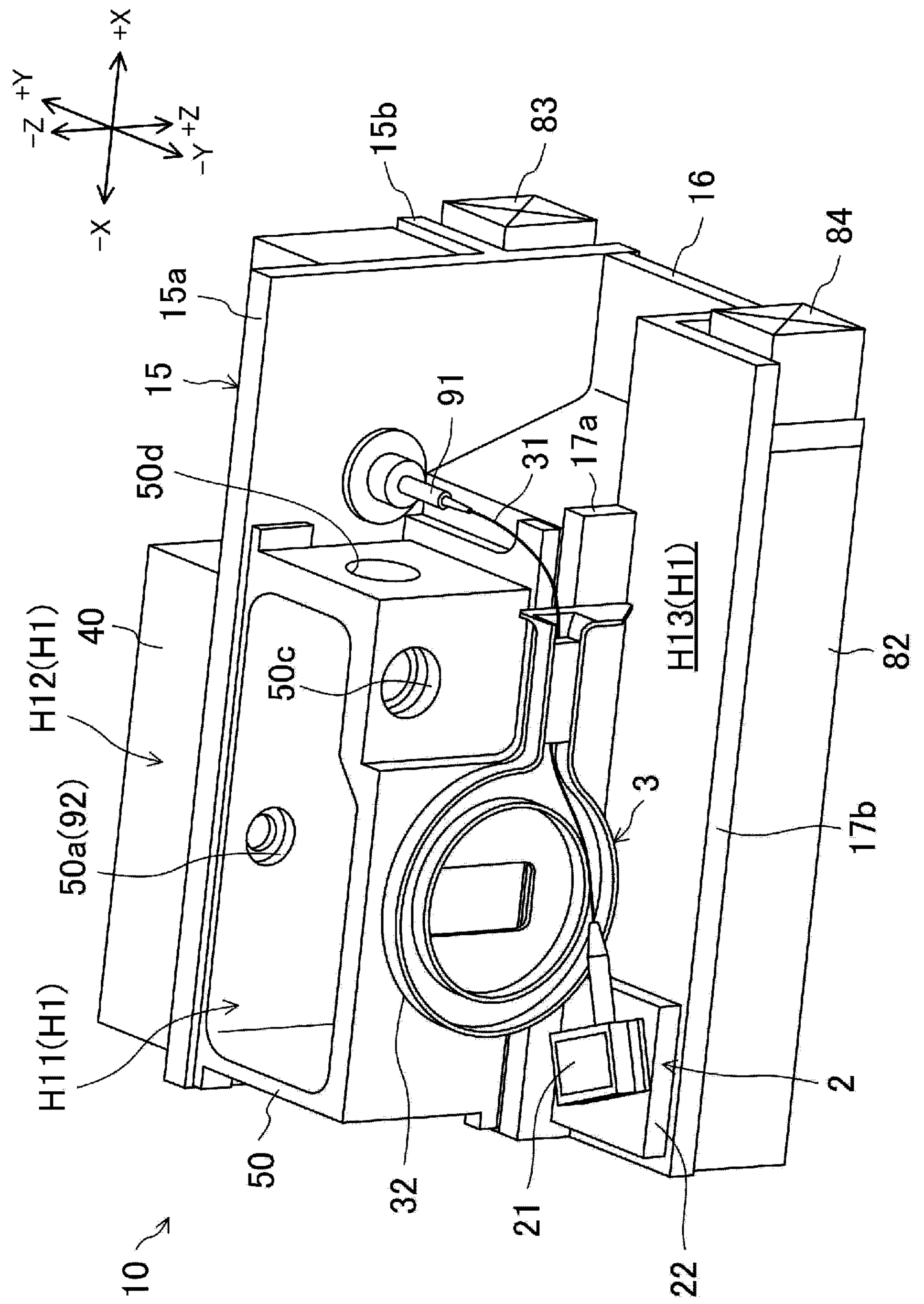
FIG. 8 is a perspective view illustrating an accommodation structure of the marker head.
Figure 9:
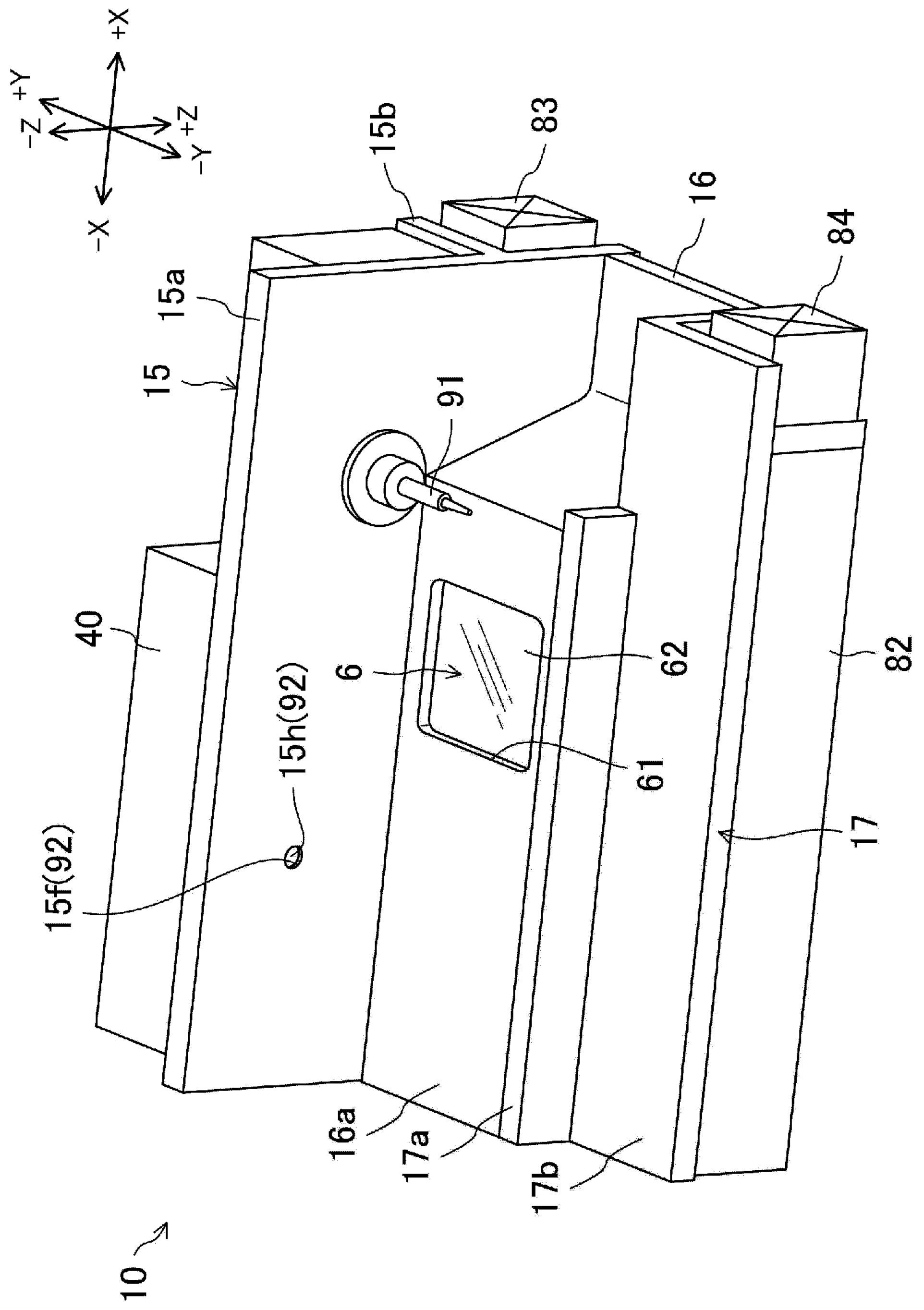
FIG. 9 is a perspective view illustrating the accommodation structure of the marker head.
Figure 10:
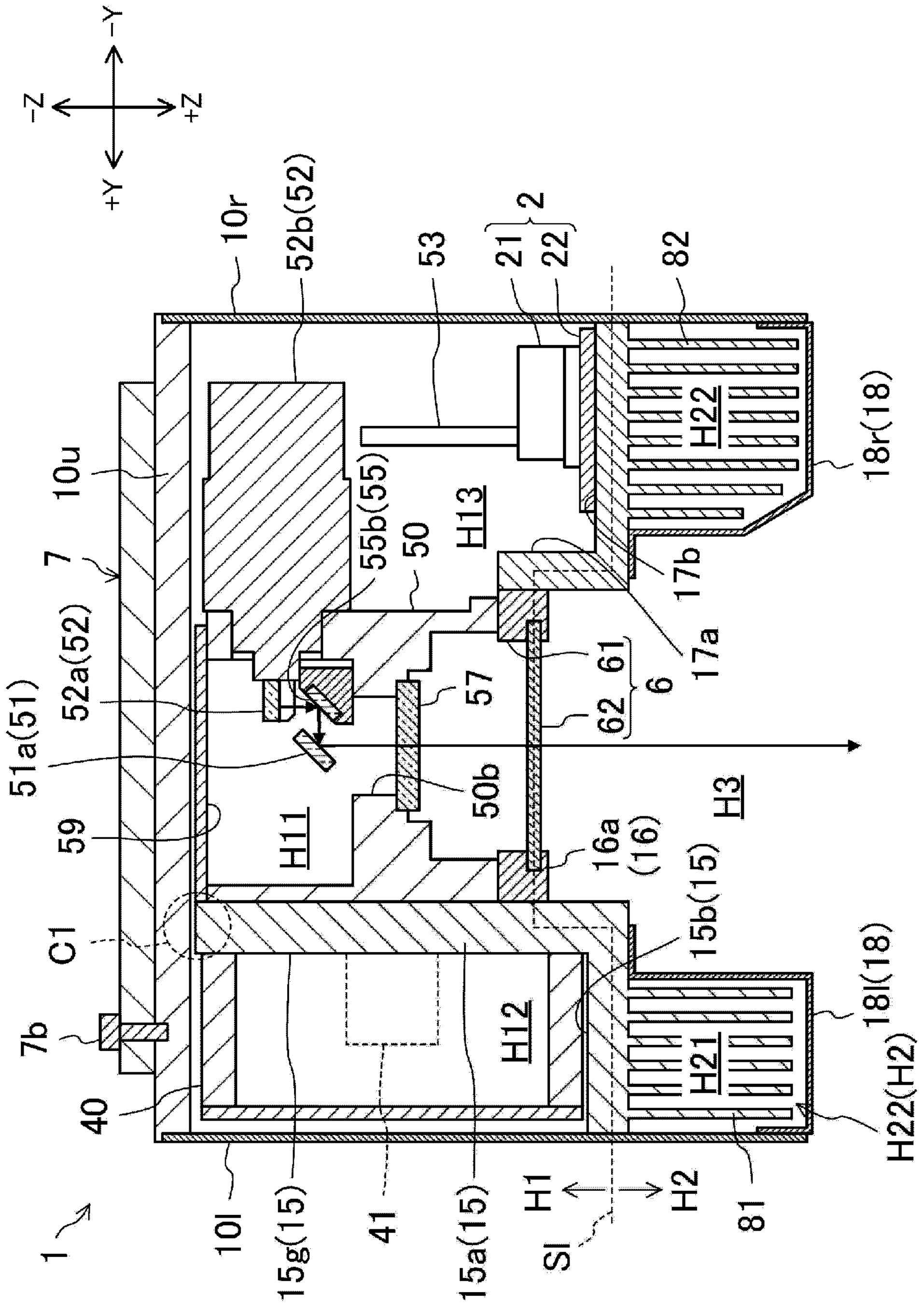
FIG. 10 is a transverse sectional view schematically illustrating an internal structure of the marker head.
Figure 11:
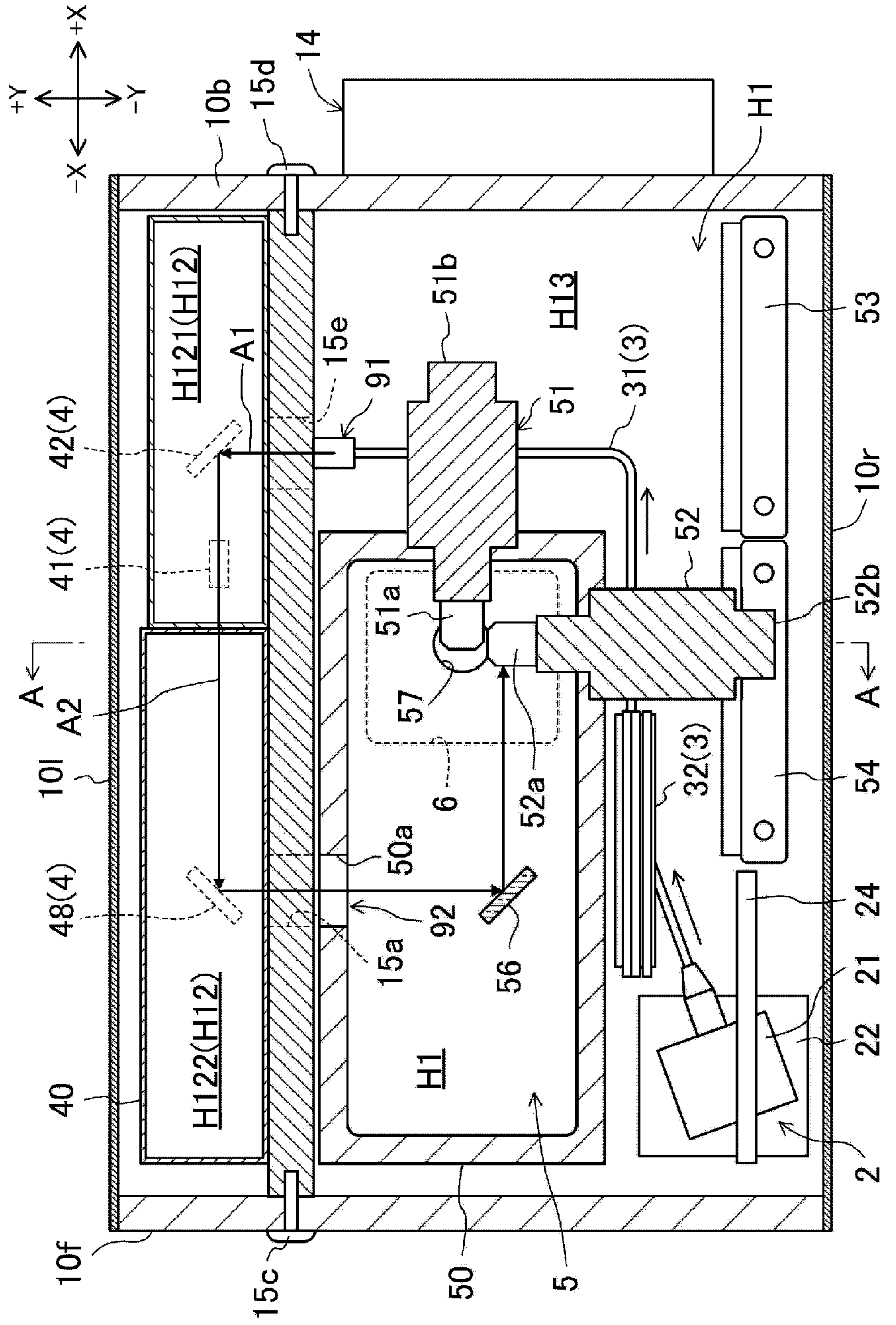
FIG. 11 is a longitudinal sectional view schematically illustrating the internal structure of the marker head.

In addition, FIG. 7 is a diagram illustrating a connection structure of the electric cable 200 in the marker head 1, and FIGS. 8 and 9 are perspective views illustrating an accommodation structure of the marker head 1. In addition, FIG. 10 is a transverse sectional view schematically illustrating an internal structure of the marker head 1, and FIG. 11 is a longitudinal sectional view schematically illustrating the internal structure of the marker head 1. The traverse cross section of FIG. 10 substantially coincides with a cross section taken along line A-A of FIG. 11.

Figure 12:
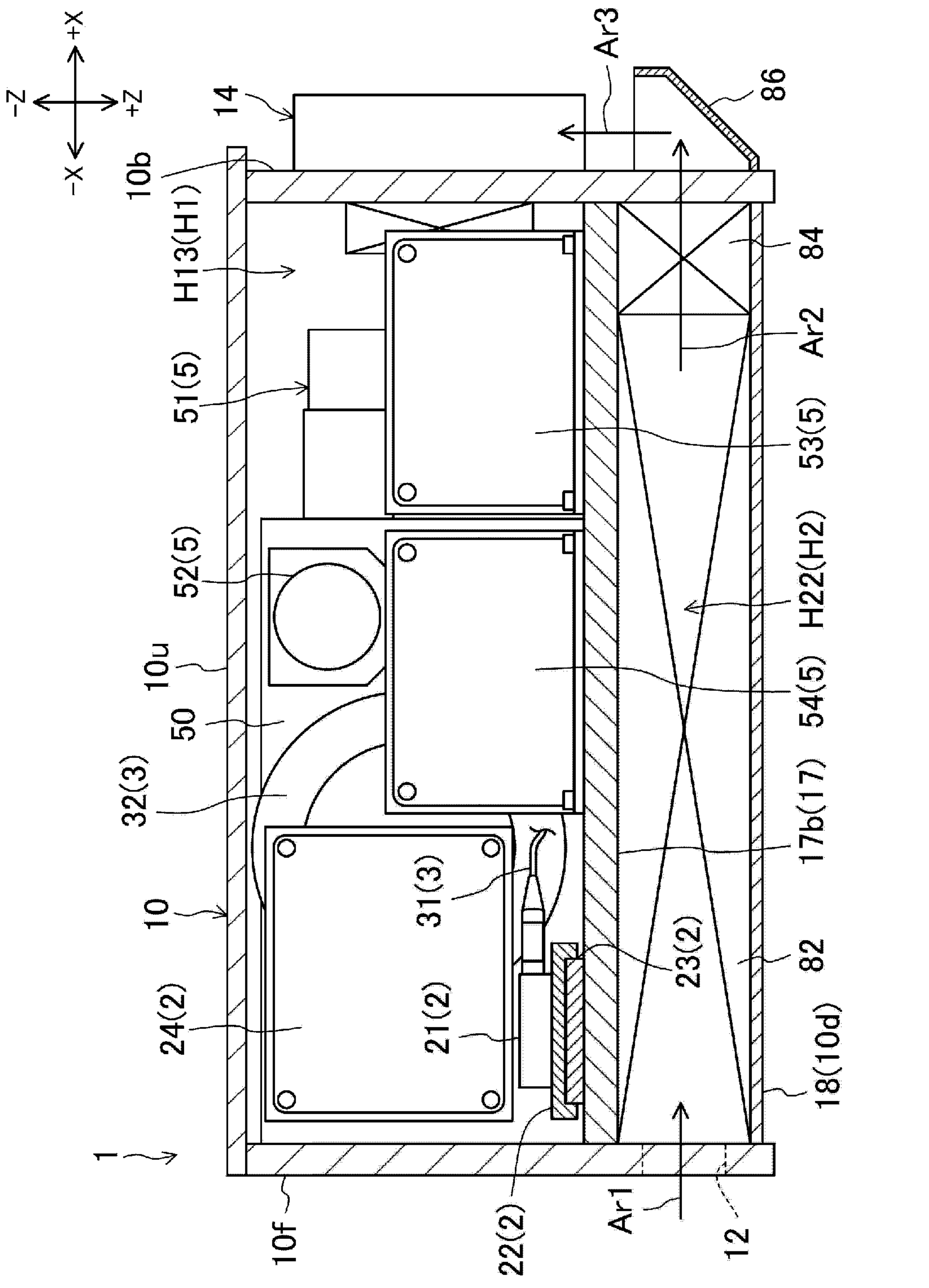
FIG. 12 is a side view schematically illustrating a main part in a board accommodation section.
Figure 13:
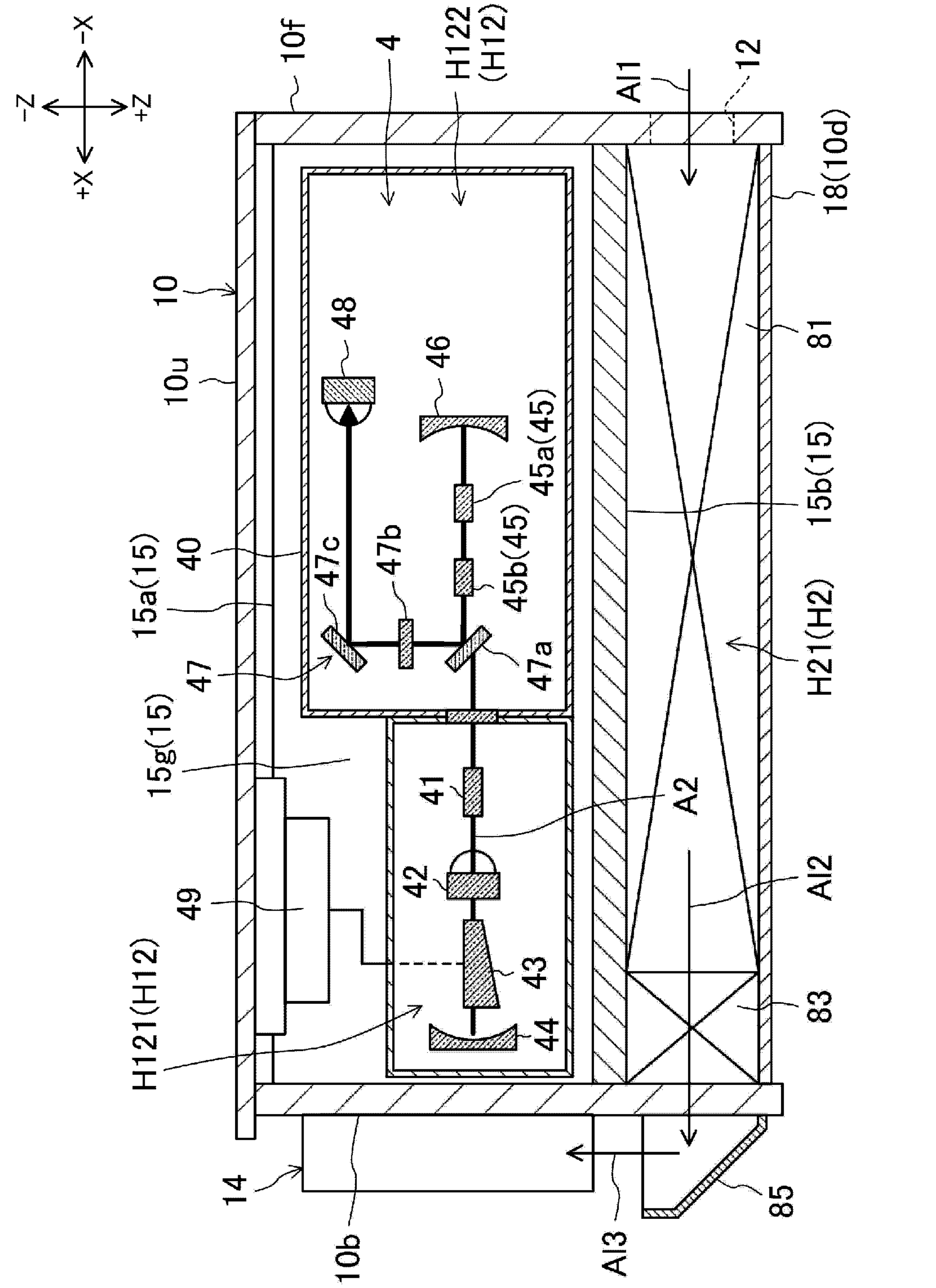
FIG. 13 is a side view schematically illustrating a main part in a crystal accommodation section.

In addition, FIG. 11 is a longitudinal sectional view schematically illustrating the internal structure of the marker head 1, FIG. 12 is a side view schematically illustrating a main part in a board accommodation section H13, and FIG. 13 is a side view schematically illustrating a main part in a crystal accommodation section H12.

Figure 14:
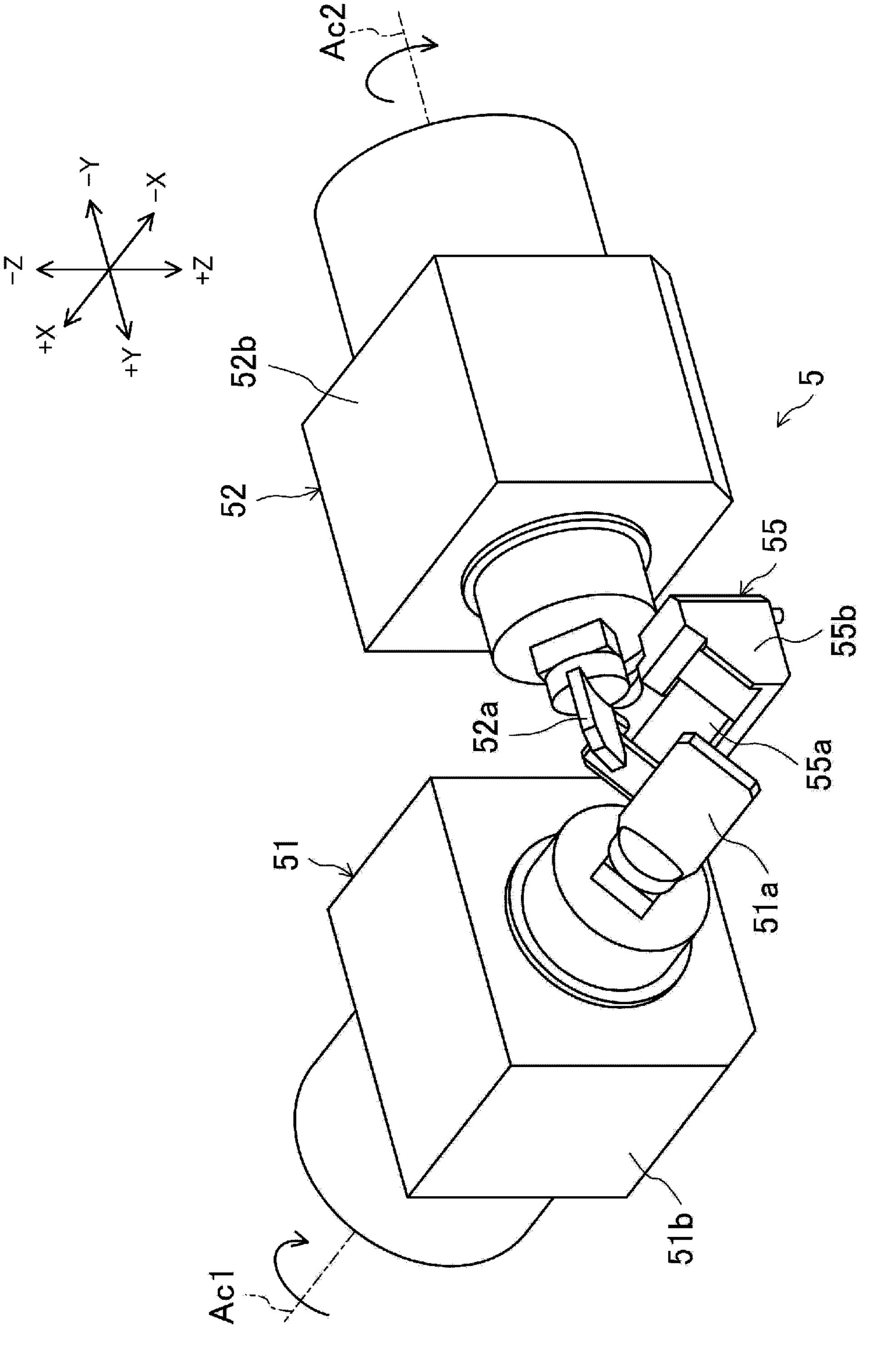
FIG. 14 is a perspective view schematically illustrating a main part in a mirror accommodation section.
Figure 15:
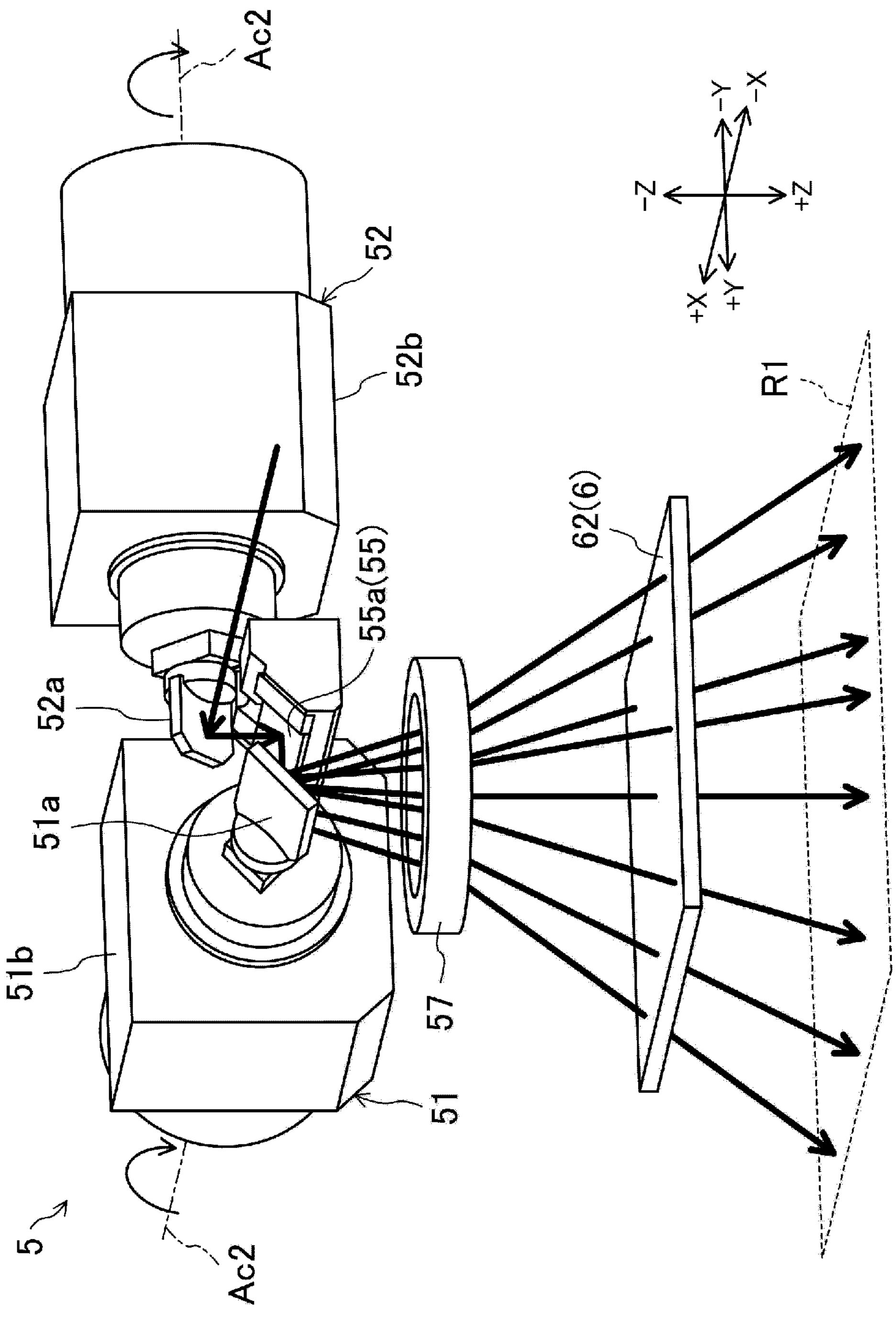
FIG. 15 is a perspective view for describing deflection of laser light by a laser light scanning section.
Figure 16:
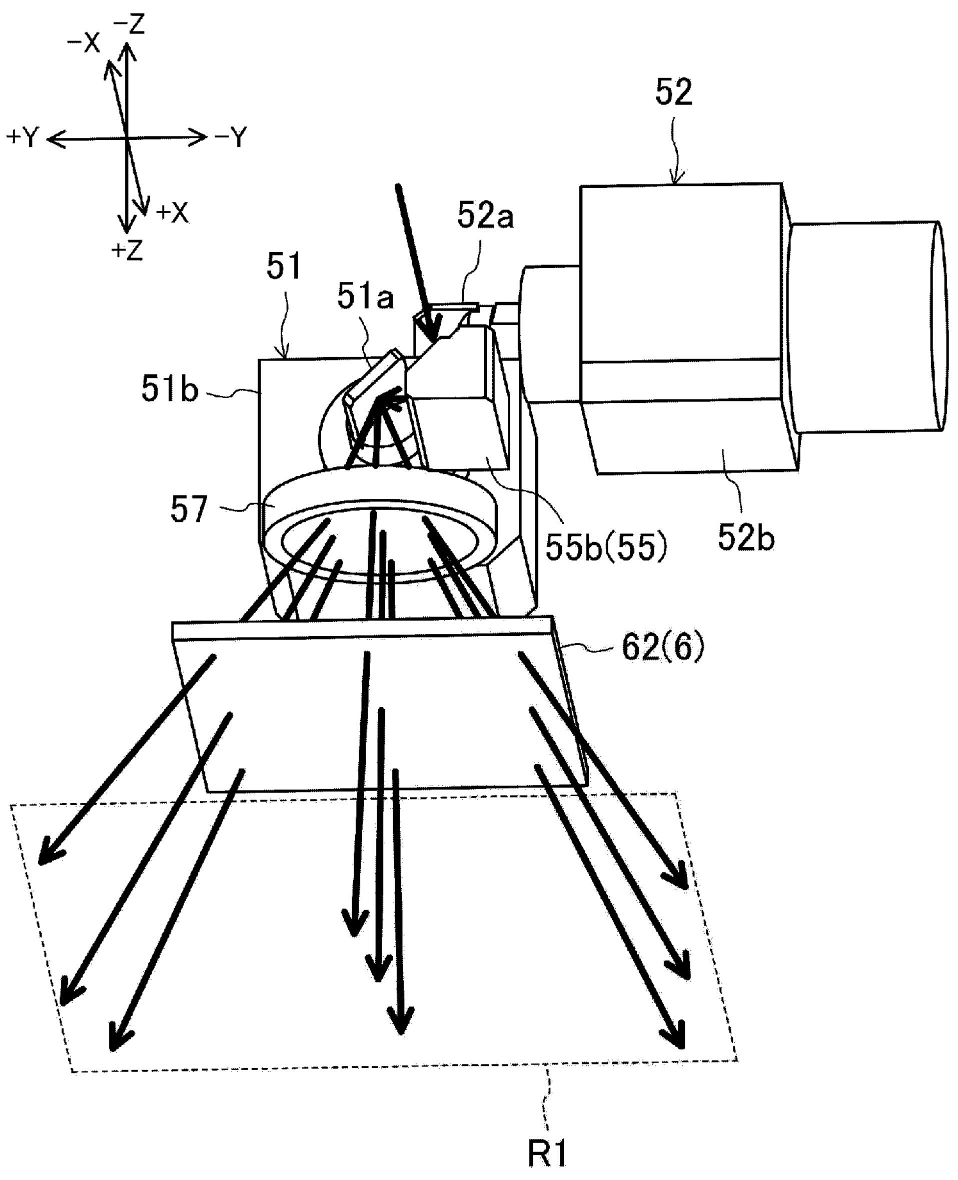
FIG. 16 is a perspective view for describing the deflection of the laser light by the laser light scanning section.

In addition, FIG. 14 is a perspective view schematically illustrating a main part in a mirror accommodation section H11, and FIGS. 15 and 16 are perspective views for describing deflection of laser light by the laser light scanning section.

(Schematic Configuration of Marker Head 1)

As illustrated in FIG. 2, the marker head 1 includes, as main constituent elements, the excitation light generation section 2, an excitation light guide section 3 as a light guide optical system, the laser light output section 4, and the laser light scanning section 5 as a laser light deflection section.

As will be described in detail later, the excitation light generation section 2 generates excitation light for exciting laser light based on the electric power supplied via the electric cable 200. The excitation light guide section 3 guides the excitation light generated by the excitation light generation section 2 and inputs the excitation light to the laser light output section 4. The laser light output section 4 includes a solid-state laser crystal 41 that generates laser light based on the excitation light guided by the excitation light guide section 3.

In addition, the laser light scanning section 5 includes a first scanner 51 that drives a first mirror 51*a* such that the laser light generated by the solid-state laser crystal 41 is emitted toward a desired position in the irradiation area R1, and a first control board 53 that controls the first scanner 51.

More specifically, the laser light scanning section 5 according to this embodiment is configured using a so-called biaxial (X-axis and Y-axis) galvano scanner, and further includes a second scanner 52 as an X scanner, in addition to the first scanner 51 as a Y scanner, and a second control board 54 that controls the second scanner 52.

The laser light scanning section 5 controls the first scanner 51 via the first control board 53 and controls the second scanner 52 via the second control board 54, thereby driving the first mirror 51*a* of the first scanner 51 and the second mirror 52*a* of the second scanner 52.

At that time, the laser light scanning section 5 as the laser light deflection section drives the first mirror 51*a* and the second mirror 52*a* according to a predetermined processing setting (setting related to the processing pattern Pp) to deflect the laser light generated by the laser light output section 4 so as to be emitted toward a desired position in the irradiation area R1.

The marker head 1 also includes the housing 10 that accommodates the above-described constituent elements, that is, the excitation light generation section 2, the excitation light guide section 3, the laser light output section 4, and the laser light scanning section 5. In the housing 10, an exit window 6 that transmits the laser light (that is, the laser light emitted toward the irradiation area R1 via the laser light scanning section 5) deflected by the first mirror 51*a* of the laser light scanning section 5 is formed.

Hereinafter, a configuration regarding the appearance of the marker head 1 (specifically, a configuration of six surfaces of the housing 10) and the internal structure of the marker head 1 will be described in order.

(Outer Surface of Housing 10)

As illustrated in FIG. 3A, the housing 10 of the marker head 1 is configured in a substantially rectangular shape having a longer dimension in the front-rear direction (direction from a right side and a front side to a left side and a depth side in FIG. 3A) as compared with the left-right direction (direction from the left side and the front side when the housing 10 is viewed from the front to the right side and the depth side when the housing 10 is viewed similarly from the front in FIG. 3A). Note that the "left and right" in this specification corresponds to the left and right as viewed from the user facing the housing 10.

Hereinafter, the front-rear direction of the housing 10 is regarded as an X direction, the left-right direction is regarded as a Y direction, and a height direction is regarded as a Z direction. Specifically, the depth side of the plane of the drawing of FIG. 3A in the X direction is regarded as a +X direction, and the front side of the plane of the drawing of FIG. 3A is regarded as a −X direction. Similarly, the front side of the plane of the drawing of FIG. 3A in the Y direction is regarded as a +Y direction, and the depth side of the plane of the drawing of FIG. 3A is regarded as a −Y direction. Similarly, am upper side of the plane of the drawing of FIG. 3A in the Z direction is regarded as a −Z direction, and a lower side of the plane of the drawing of FIG. 3A is regarded as a +Z direction.

The definitions based on an outer shape of the housing 10 have been exemplified here for convenience, but definitions based on an operation direction and a positional relationship of each of the constituent elements accommodated in the housing 10 can also be used instead of the definitions or at the same time with the definitions.

For example, a first direction that is a deflection direction by the first mirror 51*a* may be defined as the Y direction, and a second direction that is a deflection direction by the second mirror 52*a* may be defined as the X direction. Note that the deflection direction by the mirror included in and driven by the laser light scanning section 5 in this embodiment indicates a direction in which an irradiation position is scanned in the irradiation area R1 by driving the mirror. That is, the irradiation position in the irradiation area R1 is scanned in the Y direction as the first mirror 51*a* is driven to rotate. In addition, the irradiation position in the irradiation area R1 is scanned in the X direction as the second mirror 52*a* is driven to rotate. Similarly, a direction from the marker head 1 toward the irradiation area R1, more specifically, an irradiation direction which is a direction from the exit window 6 toward the irradiation area R1 can be regarded as the Z direction. The irradiation direction may be a direction from the first mirror 51*a* toward the irradiation area R1. Note that a "direction from a certain member toward the irradiation area R1" in this embodiment indicates one direction out of an axial direction in which the certain member and the irradiation area R1 face each other. The "direction from the certain member toward the irradiation area R1" is not a traveling direction of light from the certain member toward the irradiation area R1. Therefore, the irradiation position in the irradiation area R1, that is, the traveling direction of the light toward the irradiation area R1 is changed by the rotation of the first mirror 51*a* and the rotation of the second mirror 52*a*, but the irradiation direction in this embodiment does not change with the change in the traveling direction of the light.

In the following description, a description will be given assuming that the definitions based on the outer shape of the housing 10 coincide with the definitions based on the deflection direction and the irradiation direction of the first mirror 51*a* and the second mirror 52*a* match.

As illustrated in FIGS. 3A to 7, the housing 10 has a bottom surface 10*d* on which the exit window 6 is formed, and a top surface 10*u* facing the bottom surface 10*d* and the exit window 6. For example, the bottom surface 10*d* faces the +Z direction, the top surface 10*u* faces the −Z direction, and both are constituted by one or a plurality of plate-shaped members having a thickness in the Z direction. Note that the expression "facing" used herein indicates conceptual facing in a case where the housing 10 is regarded as a conceptual rectangular parallelepiped.

The housing 10 further includes a front surface 10*f*, a back surface 10*b*, a left side surface 101, and a right side surface 10*r* surrounding the excitation light generation section 2, the excitation light guide section 3, the laser light output section 4, and the laser light scanning section 5 together with the bottom surface 10*d* and the top surface 10*u*.

The front surface 10*f*, the back surface 10*b*, the left side surface 101, and the right side surface 10*r* all face a direction orthogonal to the top surface 10*u* and the bottom surface 10*d* (that is, a direction along an XY plane). For example, the front surface 10*f* faces the −X direction, the back surface 10*b* faces the +X direction, and both are constituted by one or a plurality of plate-shaped members having a thickness in the X direction. Similarly, for example, the left side surface 101 faces the +Y direction, the right side surface 10*r* faces the −Y direction, and both are constituted by one or more plate-shaped members having a thickness in the Y direction.

Hereinafter, the six surfaces of the housing 10 will be described in order. Note that the term "surface" in the bottom surface 10*d*, the top surface 10*u*, the front surface 10*f*, the back surface 10*b*, the left side surface 101, and the right side surface 10*r* also includes a plate-shaped member having a predetermined thickness. In addition, these six surfaces are merely classified for convenience, and do not need to be separated from each other. For example, at least one of the left side surface 101 and the right side surface 10*r* and at least a part of the bottom surface 10*d* (particularly, a non-offset portion 18 to be described later) may be integrated.

—Top Surface 10*u*—

As illustrated in FIG. 3A, the top surface 10*u* among the six surfaces constituting the housing 10 is formed in a rectangular plate shape that extends along the X and Y directions and has a longer dimension in the X direction than in the Y direction. The top surface 10*u* according to this embodiment is configured as an attachment surface connected to the support member and attached to the above-described attachment target position. In this case, a plate thickness of the top surface 10*u* is larger than plate thicknesses of the left side surface 101 and the right side surface 10*r*.

Further, the top surface 10*u* as the attachment surface is provided with an attachment 7 that can be attached to the attachment target position. The attachment 7 is configured as a plate-shaped member that extends along directions (the X and Y directions) substantially parallel to the top surface 10*u* and has a thickness in a direction (the Z direction) orthogonal to the top surface 10*u*. The attachment 7 is placed on the top surface 10*u*, and is fastened to the top surface 10*u* by a fastener 7*b* such as a bolt, for example, as illustrated in FIG. 10. As described above, the plate thickness of the top surface 10*u* is larger than the plate thicknesses of the left side surface 101, the right side surface 10*r*, and the like. The larger plate thickness of the top surface 10*u* is advantageous in securing an insertion allowance for the fastener 7*b*.

A fastening hole 7*a* corresponding to the support member 501 arranged at the attachment target position is provided in an upper surface of the attachment 7. The support member 501 can be attached to the attachment 7 by fastening the fastener, such as a bolt, to the fastening hole 7*a* in a state where the support member 501 is placed on the attachment 7. Accordingly, the top surface 10*u* is attached to the attachment target position via the attachment 7, and at the same time, the housing 10 is suspended from the support member 501.

—Bottom Surface 10*d*—

As illustrated in FIG. 4, the bottom surface 10*d* among the six surfaces is arranged on an opposite side of the top surface 10*u* with the laser light scanning section 5 interposed therebetween. As illustrated in FIG. 5, the bottom surface 10*d* is formed in a curved surface shape that extends along the X direction and has a central portion in the Y direction being recessed toward the −Z side.

Specifically, as illustrated in FIGS. 5 and 10, the bottom surface 10*d* according to this embodiment includes an offset portion 16*a* that is located at the central portion in the Y direction and offset toward the −Z side, and the non-offset portion 18 that is located at both ends in the Y direction and protrudes more toward the +Z side as compared with the offset portion 16*a*. Both the offset portion 16*a* and the non-offset portion 18 are formed to extend flat along the X direction.

Specifically, the bottom surface 10*d* according to this embodiment is formed with a groove having a trapezoidal cross section that has the offset portion 16*a* as an upper side and increases in diameter toward the +Z side. The exit window 6 is provided in the offset portion 16*a* as the upper side. The bottom surface 10*d* according to this embodiment is configured as an exit surface on which the exit window 6 is formed. Details of the exit window 6 will be described later.

On the other hand, the non-offset portion 18 forms a portion from sites corresponding to oblique sides of the trapezoidal shape to a +Z-side end in the bottom surface 10*d*. The non-offset portion 18 according to this embodiment includes: a first plate-shaped member 181 located on the +Y side of the offset portion 16*a*; and a second plate-shaped member 18*r* located on the −Y side of the offset portion 16*a*.

The first plate-shaped member 181 is formed in a thin plate shape as illustrated in FIG. 10, and has an inverted L shape as viewed from the −X side. Here, the "inverted L shape" indicates a shape obtained by inverting an L shape with respect to a symmetry axis extending in the Z direction. The first plate-shaped member 181 is arranged on an opposite side of the second plate-shaped member 18*r* with the offset portion 16*a* interposed therebetween. A vertical side portion of the inverted L shape in the first plate-shaped member 181 forms the oblique side on the +Y side in the trapezoidal shape, and a horizontal side portion of the inverted L shape forms the +Z-side end on the +Y side.

The second plate-shaped member 18*r* is formed in a thin plate shape as illustrated in FIG. 10, and has an L shape as viewed from the −X side. The second plate-shaped member 18*r* is arranged on an opposite side of the first plate-shaped member 181 with the offset portion 16*a* interposed therebetween. A vertical side portion of the L shape of the second plate-shaped member 18*r* forms the oblique side on the −Y side of the trapezoidal shape, and a horizontal side portion of the L shape forms the +Z-side end on the −Y side.

In addition, the first plate-shaped member 181 covers the exit window 6 from the +Y side together with the lower half of the left side surface 101 as illustrated in FIG. 10. On the other hand, the second plate-shaped member 18*r* covers the exit window 6 from the −Y side together with the lower half of the right side surface 10*r*. In this manner, the first plate-shaped member 181 and the second plate-shaped member 18*r* form a skirt-shaped cover (skirt portion) together with the lower half of the left side surface 101 and the lower half of the right side surface 10*r*.

—Front Surface 10*f*—

As illustrated in FIGS. 3B and 5, the front surface 10*f* among the six surfaces is formed in a plate shape that extends along the Y and Z directions and is provided with an indicator 11, two vents 12 and 12, and a notch 10*c*.

As illustrated in FIGS. 3B and 5, the indicator 11 is provided on the upper side and near a right end of the front surface 10*f*, and includes three lamps 11*a*, 11*b*, and 11*c* arranged side by side along the Y direction (illustrated only in FIG. 5). Each of the three lamps 11*a*, 11*b*, and 11*c* includes a light emitting diode (LED) electrically connected to the marker controller 100. Hereinafter, the three lamps 11*a*, 11*b*, and 11*c* are referred to as a first lamp 11*a*, a second lamp 11*b*, and a third lamp 11*c* in order from the +Y side.

The first lamp 11*a* is configured using, for example, a blue LED, and lights up in blue in conjunction with a key switch (not illustrated) provided in the laser processing apparatus L. Note that the "key switch" referred to herein is a switch that is switched by a key managed by a safety manager or the like. An "OFF" state corresponding to a power-off state, a "POWER ON" state corresponding to a power-on state and prohibiting emission of laser light, and a "LASER ON" state corresponding to the power-on state and permitting the emission of the laser light are switched by inserting the key into the laser processing apparatus L and turning the key in a predetermined direction.

On the other hand, the second lamp 11*b* is configured to be capable of switching a light emission color to one of green and orange, and the light emission color is switched in accordance with various states in addition to the states of the key switch. In addition, the third lamp 11*c* is configured to be capable of switching the light emission color to any one of green, orange, and red, and the light emission color is switched in accordance with various states in addition to the states of the key switch.

Each of the first lamp 11*a*, the second lamp 11*b*, and the third lamp 11*c* is electrically connected to the marker controller 100, and is configured to light up in response to the control signal input from the control section 103. Details of control of the indicator 11 will be described later.

As illustrated in FIGS. 3B and 5, one of the two vents 12 and 12 is provided on the lower side and near a left end of the front surface 10*f*, and the other of the two vents 12 and 12 is provided on the lower side and near the right end of the front surface 10*f*. The two vents 12 and 12 both penetrate through the front surface 10*f* in a thickness direction, and each communicate with a second accommodation section H2 to be described later.

As illustrated in FIGS. 3B and 5, the notch 10*c* is formed by cutting out a site including a lower end of the front surface 10*f*, and is connected to a front end (end on the −X direction side) of the offset portion 16*a*. The notch 10*c* is arranged between the two vents 12 and 12 in the Y direction.

Specifically, the notch 10*c* is formed in a substantially trapezoidal shape whose diameter increases in a tapered shape toward the +Z direction so as to have a cross section substantially coinciding with the trapezoidal cross section having the offset portion 16*a* as the upper side. The front surface 10*f* according to this embodiment is configured as a user access surface (open surface) that is at least partially opened so as to lead to the exit window 6 via the offset portion 16*a* by providing the notch 10*c* in the lower half.

—Detail 1 of Front Surface 10*f* (Dust Collector and Camera)—

The notch 10*c* according to this embodiment can be used for various uses in addition to a maintenance action of the exit window 6 (for example, a cleaning action performed by inserting a cleaning tool from the notch 10*c*).

In general, when the workpiece W, such as a film, is irradiated by a UV laser, smoke is generated. Therefore, a dust collector separate from the marker head 1 may be connected to the front surface 10*f* to suck the smoke through the notch 10*c*. Note that the dust collector may be built in the marker head 1 instead of attaching the dust collector to the marker head 1, such as the connection to the front surface 10*f*.

In addition, after the workpiece W, such as a film, is irradiated by the UV laser to perform printing processing, a camera may be built in or externally attached to the marker head 1 for the purpose of inspecting a print content thereof. Such a camera may be attached to, for example, the notch 10*c* or attached to the offset portion 16*a*. In the former case, a reflection mirror may be provided in the periphery of the exit window 6 such that an image of the irradiation area R1 can be captured from immediately above (−Z side) as much as possible. In addition, an illumination may be provided in the periphery of the camera or the exit window 6 so as to obtain an image as bright as possible.

—Detail 2 of Front Surface 10*f* (Cover Member 13 and Opening and Closing Sensor)—

Further, the cover member 13 capable of opening and closing the front surface 10*f* is attached to the front surface 10*f* serving as the open surface. The cover member 13 includes: a first cover portion 13*a* fixed to the upper half of the front surface 10*f* a second cover portion 13*b* that is swingable so as to open and close the lower half of the front surface 10*f*, particularly, an open portion by the notch 10*c*; and a hinge mechanism 13*c* that joins the first cover portion 13*a* and the second cover portion 13*b* (see FIGS. 3A and 3B).

The first cover portion 13*a* is formed in a rectangular plate shape covering the upper half of the front surface 10*f*, and has through-holes (whose reference signs are omitted) formed at substantially the same positions as the indicator 11. The first cover portion 13*a* is fixed to the upper half of the front surface 10*f* with the fastener such as a screw.

The second cover portion 13*b* is formed in a rectangular plate shape capable of covering the lower half of the front surface 10*f*, particularly, the notch 10*c*, and has through-holes (whose reference signs are omitted) formed at substantially the same positions as the two vents 12 and 12. The second cover portion 13*b* is supported to the first cover portion 13*a* via the hinge mechanism 13*c*.

The hinge mechanism 13*c* is located at a central portion of the front surface 10*f* in the Z direction, and swingably joins an upper edge portion of the second cover portion 13*b* to a lower edge portion of the first cover portion 13*a*.

The hinge mechanism 13*c* can swing the second cover portion 13*b* about a rotation axis extending in the Y direction in a state where the first cover portion 13*a* is fixed to the front surface 10*f* (see FIGS. 3A and 3B). As the second cover portion 13*b* is swung in an opening direction, the notch 10*c* of the front surface 10*f* can be exposed. As the notch 10*c* is exposed, various types of maintenance, such as cleaning of the exit window 6, can be performed through the offset portion 16*a* connected to the notch 10*c*.

Note that the cover member 13 is not essential. The front surface 10*f* may be exposed without providing the cover member 13.

In addition, an opening and closing sensor that senses opening and closing of the cover member 13 may be provided on at least one of the cover member 13 (particularly, the second cover portion 13*b*) and the front surface 10*f* (particularly, a peripheral portion of the notch 10*c* on the front surface 100 although not illustrated.

As such an opening and closing sensor, for example, a magnetic-type sensor including a magnet provided on one of the second cover portion 13*b* and the front surface 10*f* and a magnetic sensor (for example, a Hall element) provided on the other of the second cover portion 13*b* and the front surface 10*f* can be used. Note that the magnetic-type sensor is merely an example, and an optical-type sensor, a mechanical-type sensor, or the like may be used.

Such a magnet sensor is electrically connected to the marker controller 100 and/or a circuit board in the marker head 1, and can output a sensing signal indicating an open or closed state of the cover member 13, particularly, the second cover portion 13*b*, to the marker controller 100 and/or the circuit board.

Since such an opening and closing sensor is provided, the open or closed state of the cover member 13 can be sensed, and various types of control based on the open or closed state can be performed. As an example, the marker controller 100 according to this embodiment performs an emergency stop of emission of laser light when the cover member 13 is opened during the emission of the laser light. Thereafter, the cover member 13 is closed to perform an emergency stop releasing operation via the operation section 302, so that the emission of the laser light can be restarted.

Note that, in a case where the cover member 13 is regarded as one outer surface of the housing 10, the cover member 13 is visually recognized by the user at the time of attaching the marker head 1 or the like. In this case, for example, a first mark M1 as a mark can be added to the second cover portion 13*b* of the cover member 13 as illustrated in FIG. 3A.

The first mark M1 includes: a first center line M11 indicating a center of the irradiation area R1 (an intersection where diagonal lines of the irradiation area R1 intersect); a +Y edge M12 indicating an edge on the +Y side of the irradiation area R1; and a −Y edge M13 indicating a center on the −Y side of the irradiation area R1.

Note that the cover member 13 is not essential. When the front surface 10*f* is regarded as the outer surface of the housing 10 without providing the cover member 13, the first mark M1 can be added to the front surface 10*f.*

—Back Surface 10*b*—

As illustrated in FIGS. 3B and 5, the back surface 10*b* among the six surfaces is arranged on an opposite side of the front surface 10*f* with the laser light scanning section 5 interposed therebetween, and is formed in a plate shape extending along the Y and Z directions. The back surface 10*b* according to this embodiment can be regarded as one outer surface of the housing 10 (an outer surface different from the cover member 13), and forms a connection surface to which the electric cable 200 supplying electric power into the housing 10 is connected. The back surface 10*b* as the connection surface surrounds the laser light scanning section 5 as the laser light deflection section together with the front surface 10*f* as the open surface, the top surface 10*u* as the attachment surface, and the bottom surface 10*d* as the exit surface.

Further, the back surface 10*b* as the connection surface is provided with a connection cover 14 that covers a connection portion between the back surface 10*b* and the electric cable 200 as illustrated in FIG. 7. The connection cover 14 regulates an extending direction Ae of the electric cable 200 such that the electric cable 200 is drawn out in an in-plane direction (the Y and Z directions) of the back surface 10*b*, more specifically, in a direction (the Y direction) intersecting with the irradiation direction (Z direction) out of the in-plane direction (Y and Z directions).

In other words, the connection cover 14 is configured to draw out the electric cable 200 along the direction (Y direction or Z direction) orthogonal to the X direction which is a direction connecting the front surface 10*f* and the back surface 1*ob*.

Specifically, the connection cover 14 according to this embodiment includes: an enclosure portion 14*a* that encloses a connection terminal of the marker head 1 with respect to the electric cable 200; a lid 14*b* that closes the enclosure portion 14*a*; a seal member 14*c* that liquid-tightly seals a space between the enclosure portion 14*a* and the lid 14*b*; and a wire diameter conversion connector 14*d* that adjusts a wire diameter of the electric cable 200.

Among them, the enclosure portion 14*a* is formed so as to enclose the connector that is open to the back surface 10*b* from the side (the Y and Z directions). Specifically, the enclosure portion 14*a* according to this embodiment is formed in a thin rectangular box shape that is open in the +X direction.

Further, in a case where the enclosure portion 14*a* is regarded as a thin box, two openings (whose reference signs are omitted) communicating with different connection terminals are formed on the bottom surface 14*e*. In addition, among a plurality of side walls constituting the enclosure portion 14*a*, a left side wall portion 14*f* facing the +Y side is provided with a first through-hole 14*g* penetrating through the left side wall portion 14*f* along the Y direction as the extending direction Ae. As the electric cable 200 is inserted through the first through-hole 14*g*, the extending direction Ae thereof is regulated.

The wire diameter conversion connector 14*d* is arranged inside the enclosure portion 14*a*, and is accommodated in an accommodation space defined by the enclosure portion 14*a* and the lid 14*b*. Here, the electric cable 200 according to this embodiment includes: a first cable portion 201 that extends from the marker controller 100 and is connected to the wire diameter conversion connector 14*d*; and a second cable portion 202 that extends from the wire diameter conversion connector 14*d* and is connected to the connection terminal of the marker head 1. A wire diameter of the second cable portion 202 is set to be smaller than a wire diameter of the first cable portion 201 so as to be suitable for the connection terminal of the marker head 1.

That is, the electric cable 200 is connected to the marker head 1 in a state where the wire diameter has been converted by the wire diameter conversion connector 14*d* in this embodiment.

In general, there is a need to change a cable length of the electric cable 200 in accordance with an installation environment of the marker head 1. Here, in a case where an attempt is made to use the electric cable 200 longer than usual, there is a concern about a voltage drop as compared with a relatively shorter electric cable, and thus, it is conceivable to use the electric cable 200 having a larger wire diameter as a countermeasure thereof.

In this manner, the wire diameter of the electric cable 200 can be changed in accordance with the installation environment of the marker head 1, and thus, it is conceivable to use the wire diameter conversion connector 14*d* as described above, but there is a concern that a connection portion between the first cable portion 201 and the wire diameter conversion connector 14*d* and a connection portion between the second cable portion 202 and the wire diameter conversion connector 14*d* may be wet by water only by simply using the wire diameter conversion connector 14*d.*

In this regard, the wire diameter conversion connector 14*d* is accommodated in the connection cover 14 as illustrated in FIG. 7 so that it is possible to suppress each of the above-described connection portions from being wet by water. Accordingly, the marker head 1 can be made conform to a wider installation environment.

—Left Side Surface 101—

As illustrated in FIGS. 3A, 3B, and 10, the left side surface 101 among the six surfaces is arranged on the +Y side with respect to laser light scanning section 5, and is formed in a plate shape extending along the Z and X directions.

Note that, in a case where the left side surface 101 is regarded as one outer surface of the housing 10, the left side surface 101 is visually recognized by the user at the time of attaching the marker head 1 or the like. As illustrated in FIG. 3A, a second mark M2 as a mark can be added to the left side surface 101.

The second mark M2 includes: a second center line M21 indicating the center of the irradiation area R1 (the intersection where the diagonal lines of the irradiation area R1 intersect); a +X edge M22 indicating an edge on the +X side in the irradiation area R1; and a −X edge M23 indicating an edge on the −X side in the irradiation area R1.

—Right Side Surface 10*r*—

As illustrated in FIGS. 4, 5, and 10, the right side surface 10*r* among the six surfaces is arranged on the −Y side with respect to the laser light scanning section 5, and is formed in a plate shape extending along the Z and X directions. The right side surface 10*r* is arranged on an opposite side of the left side surface 101 with the laser light scanning section 5 interposed therebetween.

Note that, in a case where the right side surface 10*r* is regarded as one outer surface of the housing 10, a third mark M3 configured similarly to the second mark M2 can be added to the right side surface 10*r*.

The third mark M3 includes: a third center line M31 indicating the center of the irradiation area R1 (the intersection where the diagonal lines of the irradiation area R1 intersect); a +X edge M32 indicating an edge on the +X side in the irradiation area R1; and a −X edge M33 indicating an edge on the −X side in the irradiation area R1.

Note that a configuration including both the second mark M2 and the third mark M3 is not essential, and one of the second mark M2 and the third mark M3 may be provided.

(Internal Space of Housing 10)

The housing 10 defines an internal space surrounded by the six surfaces of the bottom surface 10*d*, the top surface 10*u*, the front surface 10*f*, the back surface 10*b*, the left side surface 101, and the right side surface 10*r*. The internal space is partitioned into a plurality of accommodation sections by a plate-shaped member arranged in the housing 10.

As such a plate-shaped member, the marker head 1 according to this embodiment includes a first base plate 15, a second base plate 16, and a third base plate 17. In this embodiment, the first base plate 15, the second base plate 16, and the third base plate 17 are separated from each other. In addition, the first base plate 15 is configured as a support plate capable of supporting the solid-state laser crystal 41 among these plate-shaped members.

Hereinafter, configurations of the respective plate-shaped members will be described in order.

—First Base Plate 15—

As illustrated in FIGS. 8, 9, and 10, the first base plate 15 is configured as a metal plate-shaped member extending in the X direction, and is accommodated in the housing 10 (in other words, surrounded by the six surfaces of the housing 10). A plate thickness of the first base plate 15 is set to be larger than at least the plate thicknesses of the left side surface 101 and the right side surface 10*r* among the six surfaces of the housing 10.

In particular, the first base plate 15 according to this embodiment has an inverted L shape as viewed from the −X side. Here, the "inverted L shape" indicates a shape obtained by inverting an L shape with respect to a symmetry axis extending in the Z direction. Hereinafter, there is a case where a site corresponding to a vertical side of the inverted L shape in the first base plate 15 is referred to as a vertical side portion 15*a*, and a site corresponding to a horizontal side of the inverted L shape is referred to as a horizontal side portion 15*b*.

The first base plate 15 is arranged between the left side surface 101 and the right side surface 10*r* in the Y direction, and is arranged on the +Y side of the second base plate 16. The first base plate 15 is arranged on the +Y side of the third base plate 17 with the second base plate 16 interposed therebetween.

Here, a seal member (not illustrated) that liquid-tightly seals a gap between the first base plate 15 and the left side surface 101 is provided between a left end (end on the +Y side) of the horizontal side portion 15*b* and the left side surface 101 of the housing 10.

The first base plate 15 is arranged below the top surface 10*u* in the Z direction.

Here, as illustrated in an enclosing portion C1 of FIG. 10, an upper end (end on the −Z side) of the vertical side portion 15*a* faces the top surface 10*u* with a predetermined gap. Accordingly, the first base plate 15 is in a state of not being integrated with the top surface 10*u* of the housing 10 (a state of allowing a relative displacement of the first base plate 15 with respect to the top surface 10*u*).

Note that, in a case where an outer surface other than the top surface 10*u* among the six surfaces of the housing 10 is the attachment surface, a gap may be provided between the outer surface serving as the attachment surface and the first base plate 15 instead of providing the gap between the top surface 10*u* and the vertical side portion 15*a*. For example, in a case where the left side surface 101 of the housing 10 is the attachment surface, a gap can be provided between the left end of the horizontal side portion 15*b* and the left side surface 101.

The first base plate 15 is arranged between the front surface 10*f* and the back surface 10*b* in the X direction. As illustrated in FIG. 11, the first base plate 15 is fixed to the front surface 10*f* by a front-surface-side fastener 15*c*, and is fixed to the back surface 10*b* by a back-surface-side fastener 15*d*.

That is, the first base plate 15 as the support plate is attached to the housing 10 through the front surface 10*f* and the back surface 10*b* in the state of not being integrated with the top surface 10*u* as the attachment surface.

Next, when describing the vertical side portion 15*a* in detail, the vertical side portion 15*a* according to this embodiment is formed in a thick plate shape that expands along the Z direction as the irradiation direction and the X direction. As illustrated in FIG. 11, at least two through-holes 15*e* and 15*f* are formed in the vertical side portion 15*a*.

Out of the two through-holes 15*e* and 15*f*, the second through-hole 15*e* located on the +X side is used to optically couple the excitation light guide section 3 and the laser light output section 4. The second through-hole 15*e* forms a first entrance window 91 that allows excitation light to enter the laser light output section 4 from the excitation light guide section 3.

Out of the two through-holes 15*e* and 15*f*, the third through-hole 15*f* located on the −X side is used to optically couple the laser light output section 4 and the laser light scanning section 5. An optical member 15*h*, such as glass, that transmits laser light is fitted in the third through-hole 15*f*. The third through-hole 15*f* and the optical member 15*h* form a second entrance window 92, which allows the laser light to enter the laser light scanning section 5 from the laser light output section 4, together with a fifth through-hole 50*b* to be described later.

In addition, out of left and right side surfaces of the vertical side portion 15*a*, the left side surface facing the +Y side forms a partition surface 15*g* that defines the crystal accommodation section H12 to be described later. Various optical components including the solid-state laser crystal 41 are fastened to the partition surface 15*g*.

In addition, out of the left and right side surfaces of the vertical side portion 15*a*, the right side surface facing the −Y side supports a first casing 50 that defines the mirror accommodation section H11 to be described later from the left. The right side surface may define a part of the mirror accommodation section H11, instead of supporting the first casing 50 by the right side surface of the vertical side portion 15*a*.

Next, when describing the horizontal side portion 15*b* in detail, the horizontal side portion 15*b* according to this embodiment is formed in a thick plate shape that expands along the X direction and the Y direction. As illustrated in FIG. 10, a first heat sink 81, which is a heat sink according to this embodiment, is provided on a lower surface of the horizontal side portion 15*b*.

The first heat sink 81 includes a plurality of fins protruding in the +Z direction. These fins are arranged side by side in the Y direction. Each of the fins is formed to extend in the X direction. The first heat sink 81 is thermally coupled to a constituent component (for example, the solid-state laser crystal 41) of the laser light output section 4 via the first base plate 15.

Note that the horizontal side portion 15*b* and the first heat sink 81 are integrated in the example illustrated in FIG. 10, but the horizontal side portion 15*b* and the first heat sink 81 may be separated without being limited thereto.

—Second Base Plate 16—

As illustrated in FIGS. 8, 9, and 10, the second base plate 16 is configured as a metal plate-shaped member extending in the X direction, and defines a part of the six surfaces of the housing 10, particularly, the offset portion 16*a* of the bottom surface 10*d*.

In particular, the second base plate 16 according to this embodiment is formed in a Z shape as viewed from the −Y side. An upper side when the second base plate 16 is regarded as the Z shape corresponds to the offset portion 16*a* in this embodiment. In the X direction, a length of the offset portion 16*a* as the upper side is set to be longer than a length of a bottom side when the second base plate 16 is regarded as the Z shape.

The second base plate 16 is arranged between the left side surface 101 and the right side surface 10*r* in the Y direction, more specifically, between the first base plate 15 and the third base plate 17. The second base plate 16 is supported by the first base plate 15 and the third base plate 17 via fasteners (not illustrated) such as screws.

The second base plate 16 is arranged below the top surface 10*u* in the Z direction. The second base plate 16 is arranged on the −Z side of the horizontal side portion 15*b* of the first base plate 15. Specifically, the offset portion 16*a* as the upper side of the Z shape is arranged in the second base plate 16 at substantially the same Z position as a +Z-side portion (lower portion) when the vertical side portion 15*a* of the first base plate 15 is divided into two portions in the Z direction. In addition, a portion of the second base plate 16 corresponding to the bottom side of the Z shape is arranged at substantially the same Z position as +Z-side ends (lower ends) of the left side surface 101 and the right side surface 10*r*.

Here, a seal member (not illustrated) that liquid-tightly seals a gap between the offset portion 16*a* and the right side surface is provided between a +Y-side end (left end) of the offset portion 16*a* in the second base plate 16 and the right side surface of the vertical side portion 15*a* in the first base plate 15.

Similarly, a seal member (not illustrated) that liquid-tightly seals a gap between the offset portion 16*a* and the left side surface of the vertical side portion 17*a* of the third base plate 17 is provided between a −Y-side end (right end) of the offset portion 16*a* and the left side surface.

The second base plate 16 is arranged between the front surface 10*f* and the back surface 10*b* in the X direction. The second base plate 16 is fixed to the front surface 10*f* and the back surface 10*b* via the first base plate 15 and the third base plate 17. The second base plate 16 may be directly fastened to the front surface 10*f* and the back surface 10*b*.

Next, when describing the offset portion 16*a* in detail, the offset portion 16*a* according to this embodiment is formed in a thick plate shape that expands along the X direction and the Y direction. Further, the exit window 6 according to this embodiment is formed in a +X-side portion (rear portion in the front-rear direction) when the offset portion 16*a* is divided into two portions in the X direction.

The exit window 6 includes: an exit hole 61 penetrating through the +X-side portion of the offset portion 16*a*; a cover glass 62 fitted in the exit hole 61; and a seal member (not illustrated) that liquid-tightly seals a gap between the exit hole 61 and the cover glass 62 (see FIG. 10). The cover glass 62 is configured as an optical member that transmits laser light deflected by the laser light scanning section 5 and travels toward the irradiation area R1. The cover glass 62 can be formed in a rectangular shape corresponding to the shape of the irradiation area R1, for example, a rectangular shape that is substantially similar to the irradiation area R1 and has a smaller size than the irradiation area R1.

In addition, an upper surface facing the −Z side between both the upper and lower surfaces of the offset portion 16*a* supports the first casing 50 from below as illustrated in FIGS. 8, 9, and 10. More specifically, the first casing 50 can be fastened to the upper surface of the offset portion 16*a*, and the first casing 50 can be fixed with respect to the second base plate 16 by this fastening. The upper surface may define a part of the mirror accommodation section H11, instead of supporting the first casing 50 by the upper surface of the offset portion 16*a*.

—Third Base Plate 17—

As illustrated in FIGS. 8, 9, and 10, the third base plate 17 is configured as a metal plate-shaped member extending in the X direction, and is accommodated in the housing 10 (in other words, surrounded by the six surfaces of the housing 10). A plate thickness of the third base plate 17 is set to be larger than at least the plate thicknesses of the left side surface 101 and the right side surface 10*r* among the six surfaces of the housing 10.

In particular, the third base plate 17 according to this embodiment has an L shape as viewed from the −X side. Hereinafter, there is a case where a site corresponding to a vertical side of the L shape in the third base plate 17 is referred to as a vertical side portion 17*a*, and a portion corresponding to a horizontal side of the L shape is referred to as a horizontal side portion 17*b*.

The third base plate 17 is arranged between the left side surface 101 and the right side surface 10*r* in the Y direction, and is arranged on the −Y side of the second base plate 16. The third base plate 17 is arranged on the −Y side of the first base plate 15 with the second base plate 16 interposed therebetween.

Here, a seal member (not illustrated) that liquid-tightly seals a gap between the third base plate 17 and a right side surface 10*r* of the housing 10 is provided between a right end (end on the +Y side) of the horizontal side portion 17*b* of the third base plate 17 and the right side surface 10*r*.

The third base plate 17 is arranged below the top surface 10*u* in the Z direction.

The third base plate 17 is arranged between the front surface 10*f* and the back surface 10*b* in the X direction. The third base plate 17 is fixed to the front surface 10*f* and the back surface 10*b* by fasteners (not illustrated).

Next, when describing the vertical side portion 17*a* of the third base plate 17 in detail, the vertical side portion 17*a* according to this embodiment is formed in a thick plate shape that expands along the −Z direction as the irradiation direction and the X direction. In the Z direction, a dimension of the vertical side portion 17*a* of the third base plate 17 is shorter than a dimension of the vertical side portion 15*a* of the first base plate 15. The vertical side portion 17*a* supports the second base plate 16 from the −Y side.

Next, when describing the horizontal side portion 17*b* of the third base plate 17 in detail, the horizontal side portion 17*b* according to this embodiment is formed in a thick plate shape that expands along the X direction and the Y direction. Various components can be attached to the horizontal side portion 17*b*. The components attached to the horizontal side portion 17*b* include the first control board 53 of the laser light scanning section 5. In addition, a second heat sink 82 serving as a heat sink according to this embodiment is provided on a lower surface of the horizontal side portion 15*b* facing the −Z side as illustrated in FIG. 10.

The second heat sink 82 includes a plurality of fins protruding in the +Z direction. These fins are arranged side by side in the Y direction. Each of the fins is formed to extend in the X direction. The second heat sink 82 is thermally coupled to a constituent component (for example, the excitation light source 21) of the excitation light generation section 2 via the third base plate 17.

That is, the first heat sink 81 for cooling the laser light output section 4 is configured separately from the second heat sink 82 for cooling the excitation light generation section 2 in this embodiment.

Note that the horizontal side portion 17*b* and the second heat sink 82 are integrated in the example illustrated in FIG. 10, but the horizontal side portion 17*b* and the second heat sink 82 may be separated without being limited thereto.

In addition, when the first base plate 15 and the third base plate 17 are separated as in this embodiment, the first heat sink 81 provided on the first base plate 15 and the second heat sink 82 provided on the third base plate 17 are separated from each other. However, the disclosure is not limited to such a configuration, and the first heat sink 81 and the second heat sink 82 can be integrated.

(Outline of First Accommodation Section H1 and Second Accommodation Section H2)

As described above, the internal space of the housing 10 is partitioned into the plurality of accommodation sections by the first base plate 15, the second base plate 16, and the third base plate 17.

As such accommodation sections, a first accommodation section H1 provided with the cover glass 62 as the optical member and the second accommodation section H2, obtained by forming at least a part of the periphery of the cover glass 62 to protrude toward the irradiation area R1 from the cover glass 62, are formed in the housing 10 according to this embodiment (see a broken line S1 in FIG. 10).

The first accommodation section H1 and the second accommodation section H2 are arranged side by side along the irradiation direction (−Z direction), the first accommodation section H1 is arranged on one side (−Z side) in the irradiation direction, and the second accommodation section H2 is arranged on the other side (+Z side) in the irradiation direction. A boundary between the first accommodation section H1 and the second accommodation section H2 is defined by the first base plate 15, the second base plate 16, and the third base plate 17.

The first accommodation section H1 accommodates optical components related to the generation of excitation light, the generation of laser light, and the deflection of laser light. Specifically, the first accommodation section H1 according to this embodiment accommodates the excitation light generation section 2, the excitation light guide section 3, the laser light output section 4, and the laser light scanning section 5.

In the example illustrated in FIG. 10, the first accommodation section H1 is configured as a space surrounded by the top surface 10*u*, an upper portion of the front surface 10*f*, a lower portion of the back surface 10*b*, an upper portion of the left side surface 101, an upper portion of the right side surface 10*r*, a portion of the bottom surface 10*d* configured by the second base plate 16, the first base plate 15, and the third base plate 17.

On the other hand, the second accommodation section H2 accommodates cooling components related to cooling of optical components accommodated in the first accommodation section H1. Specifically, the second accommodation section H2 according to this embodiment accommodates the first heat sink 81 and the second heat sink 82 thermally coupled to the optical components accommodated in the first accommodation section H1, a first blower fan 83 as a blower that blows air to the first heat sink 81, and a second blower fan 84 as a blower that similarly blows air to the second heat sink 82.

In the example illustrated in FIG. 10, the second accommodation section H2 is configured as a space surrounded by a lower portion of the front surface 10*f*, the lower portion of the back surface 10*b*, a lower portion of the left side surface 101, a lower portion of the right side surface 10*r*, a portion of the bottom surface 10*d* configured using the non-offset portion 18 excluding the offset portion 16*a*, the first base plate 15, and the third base plate 17.

In addition, out of the first accommodation section H1 and the second accommodation section H2, at least the first accommodation section H1 is configured to satisfy the IP standard defined by the International Electrotechnical Commission (IEC). Accordingly, the marker head 1 can be washed with water without wetting the optical components, such as the solid-state laser crystal 41 and the first mirror 51*a*, by water. This contributes to improvement of ease of cleaning of the marker head 1.

In addition, the housing 10 forming the first accommodation section H1 and the second accommodation section H2 can also have an appearance shape in which water is less likely to be accumulated at the time of washing with water. Such an appearance shape can be achieved by, for example, inclining the top surface 10*u* with respect to the XY plane. Such an appearance shape contributes to improvement of sanitary properties of the marker head 1.

At that time, the front surface 10*f* is configured to be opened and closed by the cover member 13 as described above, wiping (particularly, wiping the periphery of the exit window 6) after washing with water becomes easy. This contributes to improvement of maintainability of the marker head 1.

(Details of First Accommodation Section H1)

Here, out of the first accommodation section H1 and the second accommodation section H2 described above, the first accommodation section H1 is further partitioned into three accommodation sections arranged side by side in a direction (X or Y direction) orthogonal to the irradiation direction, for example, the Y direction. Specifically, the housing 10 according to this embodiment includes the mirror accommodation section H11, the crystal accommodation section H12, and the board accommodation section H13.

The mirror accommodation section H11 accommodates the first mirror 51*a* and the second mirror 52*a* in the laser light scanning section 5. The mirror accommodation section H11 according to this embodiment is defined by the first casing 50 capable of airtightly sealing the first mirror 51*a* and the second mirror 52*a*. The first casing 50 may be defined using the offset portion 16*a* as described above. In a case where the first casing 50 is defined using the offset portion 16*a*, a cushioning material is preferably provided between the offset portion 16*a* and the first casing 50. The offset portion 16*a* is a part of the bottom surface 10*d*, and thus, is easily affected by distortion, vibration, and the like, and the cushioning material can suppress the first casing and members accommodated in the first casing by the cushioning material from being affected by such an external influence. Alternatively, the mirror accommodation section H11 may be defined using the first base plate 15 similarly to the crystal accommodation section H12 to be described later.

Here, the first casing 50 is formed in a bottomed box shape that is open toward the −Z side. The first casing 50 is held by the first base plate 15.

A dimension of the first casing 50 in the X direction substantially coincides with a dimension of the offset portion 16*a* in the X direction. Similarly, a dimension of the first casing 50 in the Y direction substantially coincides with a dimension of the offset portion 16*a* in the Y direction.

A −Z-side opening of the first casing 50 can be closed by, for example, the lid 59 illustrated in FIG. 10. For example, the opening of the first casing 50 may be sealed by the top surface 10*u*, instead of sealing the opening by the lid 59. When the opening of the first casing 50 is sealed by the top surface 10*u*, the cushioning material is preferably provided between the top surface 10*u* and the first casing 50. Accordingly, it is possible to suppress the influence of distortion, vibration, and the like generated on the top surface 10*u* from reaching the first casing 50 and the members accommodated in the first casing.

In addition, at least four through-holes 50*a*, 50*b*, 50*c*, and 50*d* are formed in the first casing 50. Among the four through-holes 50*a*, 50*b*, 50*c*, and 50*d*, the fourth through-hole 50*a* formed in a left side wall portion of the first casing 50 communicates with the third through-hole 15*f* of the first base plate 15 by assembly of the marker head 1, and constitutes the second entrance window 92 together with the third through-hole 15*f* and the optical member 15*h* fitted in the third through-hole 15*f*.

On the other hand, among the four through-holes 50*a*, 50*b*, 50*c*, and 50*d*, the fifth through-hole 50*b* formed at a bottom of the first casing 50 is arranged on the +X side when the first casing 50 including the offset portion 16*a* is divided into two portions in the X direction. A defocus lens 57 as an optical element is provided in the fifth through-hole 50*b*. The defocus lens 57 will be described later.

In addition, among the four through-holes 50*a*, 50*b*, 50*c*, and 50*d*, the sixth through-hole 50*c* formed in a right side wall portion (wall portion located on the −Y side) of the first casing 50 is arranged on the +X side when the first casing 50 including the offset portion 16*a* is divided into two portions in the X direction. A second motor 52*b* constituting the second scanner 52 can be inserted and fixed to the sixth through-hole 50*c*.

In addition, among the four through-holes 50*a*, 50*b*, 50*c*, and 50*d*, the seventh through-hole 50*d* formed in a rear wall portion (wall portion located on the +X side) of the first casing 50 is arranged on the +X side when the first casing 50 including the offset portion 16*a* is divided into two portions in the X direction. In the Z direction, the seventh through-hole 50*d* is arranged on the +Z side of the sixth through-hole 50*c*. In addition, in the Y direction, a center of the seventh through-hole 50*d* (a center of a circle when the seventh through-hole 50*d* is regarded as having a circular cross section) is arranged at substantially the same position as an optical axis of the cover glass 62. A first motor 51*b* constituting the first scanner 51 can be inserted and fixed to the seventh through-hole 50*d*.

The crystal accommodation section H12 is defined by the support plate (the first base plate 15) having the partition surface 15*g* extending along the irradiation direction, and is arranged on an opposite side (in the illustrated example, the +Y side) of the mirror accommodation section H11 with respect to the partition surface 15*g* to accommodate the solid-state laser crystal 41. The crystal accommodation section H12 accommodates optical components constituting the laser light output section 4, such as the solid-state laser crystal 41. The crystal accommodation section H12 is defined by the second casing 40 capable of airtightly sealing such optical components. The crystal accommodation section H12 according to this embodiment can accommodate a non-linear optical crystal 45 in a sealed state.

Here, the second casing 40 is formed in a bottomed box shape that is open toward the −Y side. The second casing 40 is attached to the vertical side portion 15*a* of the first base plate 15, and is supported from the −Y side by the partition surface 15*g* of the vertical side portion 15*a*. A −Y-side opening of the second casing 40 can be closed by the partition surface 15*g*.

In addition, an internal space of the crystal accommodation section H12 can be divided into both a Q-switch accommodation section H121 and a wavelength conversion section H122 arranged side by side in the X direction. The Q-switch accommodation section H121 is a space that accommodates a Q switch 43. The wavelength conversion section H122 is a space that accommodates a non-linear optical crystal 35.

Here, the Q-switch accommodation section H121 and the wavelength conversion section H122 are arranged side by side along the X direction, and both are configured as spaces surrounded by the second casing 40 and the partition surface 15*g*. More specifically, the second casing 40 is constituted by a box-shaped body corresponding to the Q-switch accommodation section H121 and a box-shaped body corresponding to the wavelength conversion section H122, and each of the Q-switch accommodation section H121 and the wavelength conversion section H122 is a space surrounded by each of the box-shaped bodies and the partition surface 15*g*. The Q-switch accommodation section H121 and the wavelength conversion section H122 are optically coupled by an optical member (not illustrated). Since the Q-switch accommodation section H121 and the wavelength conversion section H122 are configured as separate spaces in this manner, the possibility of a decrease in output of laser light due to adhesion of impurities, generated in the Q switch 43 to be described later, to the wavelength conversion element 45 to be described later is reduced.

The board accommodation section H13 is arranged on an opposite side of the crystal accommodation section H11 with respect to the mirror accommodation section H12, and accommodates the first control board 53. The board accommodation section H13 according to this embodiment is defined as a space excluding the mirror accommodation section H11 and the crystal accommodation section H12 out of the internal space of the first accommodation section H1.

That is, in this embodiment, the expression that "a predetermined member is accommodated in the mirror accommodation section H11" indicates that the member is surrounded by the first casing 50 on six sides, and the expression that "a predetermined member is accommodated in the crystal accommodation section H12" indicates that the member is surrounded by the second casing 40 and the partition surface 15*g* on six sides.

On the other hand, the expression that "a predetermined member is accommodated in the board accommodation section H13" merely indicates that the member is arranged in a space other than the mirror accommodation section H11 and the crystal accommodation section H12 in the housing 10. Of course, the invention is not limited to such a configuration, and a casing (so-called third casing) dedicated to the board accommodation section H13 may be provided similarly to the first casing 50 and the second casing 40.

(Details of Second Accommodation Section H2)

Meanwhile, the second accommodation section H2 is defined as a +Z-side portion in the housing 10 by the first plate-shaped member 181 and the second plate-shaped member 18*r* as plate-shaped members. The second accommodation section H2 has two spaces arranged at an interval in a direction orthogonal to the irradiation direction, for example, the direction (Y direction) in which the mirror accommodation section H11, the crystal accommodation section H12, and the board accommodation section H13 are arranged.

As such two spaces, the second accommodation section H2 according to this embodiment includes a crystal-side accommodation section H21 and a light-source-side accommodation section H22. Here, since the crystal-side accommodation section H21 and the light-source-side accommodation section H22 are arranged apart from each other in the Y direction, a space that does not belong to the second accommodation section H2 is defined between the crystal-side accommodation section H21 and the light-source-side accommodation section H22.

The first plate-shaped member 181 and the second plate-shaped member 18*r* according to this embodiment are configured to define a space including an optical path (optical path on the +Z side) closer to the irradiation area R1 among optical paths of laser light connecting the first mirror 51*a* as a scanner mirror and the irradiation area R1, in addition to the second accommodation section H2 as the space for accommodating the members. Hereinafter, this space is referred to as an "optical path defining section", and this space is denoted by reference sign H3. The optical path defining section H3 according to this embodiment is configured as a space surrounded on three sides of the +Y side, the −Y side, and the −Z side by the first plate-shaped member 181, the second plate-shaped member 18*r*, and the cover glass 62.

Note that the optical path defining section H3 is configured as a space whose lower end on the +Z side is open in the illustrated example, but is not limited to such a configuration. The +Z-side end of the optical path defining section H3 may be covered with an optical member such as glass. The optical member covering the +Z-side end of the optical path defining section H3 may be provided alternatively to the cover glass 62 or may be used in combination with the cover glass 62.

In addition, out of the two spaces constituting the second accommodation section H2, the crystal-side accommodation section H21 accommodates the first heat sink 81 and the first blower fan 83. The first heat sink 81 and the first blower fan 83 are arranged side by side in the X direction.

Although overlapping with the above description, the first heat sink 81 according to this embodiment is thermally coupled to at least an optical component attached to the first base plate 15 among the optical components constituting the laser light output section 4.

On the other hand, the first blower fan 83 is arranged on the +X side of the first heat sink 81 as illustrated in FIG. 13. The first blower fan 83 is configured using a so-called axial fan, and generates airflow passing through the first heat sink 81 in accordance with a control signal received from the marker controller 100. The first blower fan 83 may be arranged on the −X side of the first heat sink 81. Since electric power and a signal for driving the first blower fan are supplied via the electric cable 200 whose connection portion is covered by the connection cover 14 provided on the +X side in this embodiment, a space required for wiring is reduced if the first blower fan 83 is provided on the +X side of the first heat sink 81, which is advantageous for downsizing the marker head 1.

The airflow generated by the first blower fan 83 flows into the crystal-side accommodation section H21 from the vent 12 provided in the front surface 10*f* of the housing 10 as indicated by an arrow Al1 in FIG. 13. The airflow that has flowed in then flows from the −X side toward the +X side along the X direction, thereby passing through the first heat sink 81 and the first blower fan 83. The airflow that has passed through the first blower fan 83 flows out from an air outlet provided in the back surface 10*b* of the housing 10 as indicated by an arrow Al2 in FIG. 13.

Here, a first rectifying plate 85 that adjusts a flow direction of the airflow is attached to the back surface 10*b* of the housing 10 (see also FIG. 6). The first rectifying plate 85 guides the flow direction of the airflow flowing out from the back surface 10*b* to an opposite side (the −Z side) of a direction from the housing 10 toward the workpiece W as indicated by an arrow Al3 in FIG. 13. Accordingly, it is advantageous in terms of suppressing a collision between discharged air and the workpiece W and stabilizing a posture of the workpiece W.

The light-source-side accommodation section H22 accommodates the second heat sink 82 and the second blower fan 84. The second heat sink 82 and the second blower fan 84 are arranged side by side in the X direction.

The second heat sink 82 according to this embodiment is thermally coupled to at least the excitation light source 21 attached to the third base plate 17 among the optical components accommodated in the board accommodation section H13.

On the other hand, the second blower fan 84 is arranged on the +X side of the second heat sink 82 as illustrated in FIG. 12. The second blower fan 84 is configured using an axial fan similarly to the first blower fan 83, and generates airflow passing through the second heat sink 82 in accordance with a control signal received from the marker controller 100. The second blower fan 84 may be arranged on the −X side of the second heat sink 82. Since electric power and a signal for driving the first blower fan are supplied via the electric cable 200 whose connection portion is covered by the connection cover 14 provided on the +X side in this embodiment, a space required for wiring is reduced if the first blower fan 83 is provided on the +X side of the second heat sink 82, which is advantageous for downsizing the marker head 1.

The airflow generated by the second blower fan 84 flows into the light-source-side accommodation section H22 from the vent 12 provided in the front surface 10*f* of the housing 10 as indicated by an arrow Ar1 in FIG. 12. The airflow that has flowed in then flows from the −X side toward the +X side along the X direction, thereby passing through the second heat sink 82 and the second blower fan 84. The airflow that has passed through the second blower fan 84 flows out from an air outlet provided in the back surface 10*b* of the housing 10 as indicated by an arrow Ar2 in FIG. 12.

Here, a second rectifying plate 86 that adjusts a flow direction of the airflow is attached to the back surface 10*b* of the housing 10 (see also FIG. 6). The second rectifying plate 86 changes a flow direction of the airflow flowing out from the back surface 10*b* to the opposite side (−Z side) of the direction from the housing 10 toward the workpiece W as indicated by an arrow Ar3 in FIG. 12. Accordingly, it is advantageous in terms of suppressing a collision between discharged air and the workpiece W and stabilizing a posture of the workpiece W.

Hereinafter, configurations of the excitation light generation section 2, the excitation light guide section 3, the laser light output section 4, the laser light scanning section 5, and the like provided in the first accommodation section H1 of the first accommodation section H1 and the second accommodation section H2 will be described in detail with reference to relative positional relationships in the housing 10.

(Excitation Light Generation Section 2)

The excitation light generation section 2 includes: the excitation light source 21 that generates laser excitation light (excitation light) based on electric power (a drive current) supplied from the power supply section 104; a metal plate 22 that supports the excitation light source 21; a temperature control section 23 that adjusts a temperature of the excitation light source 21; and a light source control board 24 that supports the excitation light source 21 based on a control signal input from the marker controller 100.

The excitation light source 21, the metal plate 22, the temperature control section 23, and the light source control board 24 constituting the excitation light generation section 2 are all accommodated in the board accommodation section H13. Accordingly, the excitation light generation section 2, particularly the excitation light source 21, is arranged on an opposite side of the laser light output section 4 with the mirror accommodation section H11 interposed therebetween. Accordingly, the excitation light generation section 2 and the laser light output section 4 can be separated as much as possible.

—Metal Plate 22—

The metal plate 22 is configured as a thin plate-shaped member made of metal. As illustrated in FIGS. 11 and 12, the metal plate 22 is placed on a −X-side portion when the third base plate 17 is divided into three portions, that is, a +X-side portion, a central portion, and the −X-side portion, in the X direction. The metal plate 22 is fastened to an upper surface of the third base plate 17 (more specifically, an upper surface of the horizontal side portion 17*b* of the third base plate 17), and is thermally coupled to the second heat sink 82 via the third base plate 17.

In addition, the excitation light source 21 is placed on an upper surface of the metal plate 22, and the temperature control section 23 having a plate shape is sandwiched between a lower surface of the metal plate 22 and the third base plate 17.

—Excitation Light Source 21—

The excitation light source 21 is configured to receive electric power supplied from power supply section 104 through the electric cable 200, and generate excitation light corresponding to the electric power. An output of the excitation light generated by the excitation light source 21 increases as a drive current increases.

The excitation light source 21 according to this embodiment is configure using a laser diode (LD). Laser light oscillated from the excitation light source 21 is collected by a focusing lens (not illustrated) or the like and is output as laser excitation light (excitation light). The excitation light source 21 is optically coupled to a fiber cable 31 forming the excitation light guide section 3. The laser excitation light output from the excitation light source 21 is guided to the excitation light guide section 3 via the fiber cable 31.

In addition, the excitation light source 21 is formed in a rectangular thin plate shape, and is fixed to the upper surface of the metal plate 22 in a posture with its thickness direction along the Z direction as illustrated in FIGS. 11 and 12. The excitation light source 21 is arranged at the −X-side portion when the third base plate 17 is divided into the three portions in the X direction, which is similar to the metal plate 22. With this arrangement, the excitation light source 21 according to this embodiment is arranged close to an upstream end (an −X-side end separated from the second blower fan 84) of the airflow generated by the second blower fan 84 other than a downstream end (an +X-side end adjacent to the second blower fan 84) of the airflow.

In addition, one side surface of the excitation light source 21 obliquely faces the +X side and the +Y side, and an upstream end of the fiber cable 31 is connected to this obliquely facing side surface.

—Temperature Control Section 23—

The temperature control section 23 is configured to adjust the temperature of excitation light source 21 to fall within a predetermined temperature range. Here, the temperature range (predetermined temperature range) achieved by the temperature control section 23 is set based on a guarantee environment of the marker head 1, preferably set to be higher than the guarantee environment of the marker head 1, and more preferably set to 40° C. or higher and 60° C. or lower.

Specifically, the temperature control section 23 according to this embodiment is configured using a substantially thin plate-shaped Peltier element, and is sandwiched between the upper surface (more specifically, the upper surface of the horizontal side portion 17*b*) of the third base plate 17 and the lower surface of the metal plate 22. The temperature control section 23 discharges heat of the metal plate 22. A harness (not illustrated) for supplying a current to the temperature control section 23 is connected to a side portion of the temperature control section 23. The temperature control section 23 absorbs heat at the surface on the metal plate 22 side by the current supplied via the harness, and generates heat at the surface on the third base plate 17 side.

—Light Source Control Board 24—

The light source control board 24 is electrically connected to the marker controller 100, and controls electric power supplied from the power supply section 104 to the excitation light source 21.

The light source control board 24 according to this embodiment is configured using a circuit board having a substantially rectangular thin plate shape. The light source control board 24 is arranged in a posture with both front and back surfaces extending along the Z and X directions, and is fastened to, for example, the vertical side portion 17*a* of the third base plate 17 from the −Y side (whose fastening structure is not illustrated).

The light source control board 24 is also arranged on the −Z side of the excitation light source 21 in the Z direction as illustrated in FIG. 12, and is electrically connected to the excitation light source 21 by wiring (not illustrated).

(Excitation Light Guide Section 3)

The excitation light guide section 3 as a light guide optical system includes the fiber cable 31 optically coupling the excitation light source 21 and the solid-state laser crystal 41 in the laser light output section 4, and a fiber guide 32 configured to wind the fiber cable 31 with a predetermined bending radius. The fiber cable 31 and the fiber guide 32 are both accommodated in the board accommodation section H13 in the housing 10.

—Fiber Cable 31—

The fiber cable 31 is configured using a so-called optical fiber, and has one end (one end as viewed in a light propagation direction) being connected to the excitation light source 21 and the other end (end located on an opposite side of the one end in the light propagation direction) being connected to the first entrance window 91.

The other end of the fiber cable 31 is optically coupled to the solid-state laser crystal 41 via the first entrance window 91 and a first deflection mirror 42 to be described later. In addition, at least a part of a middle site connecting the one end and the other end of the fiber cable 31 is wound around the fiber guide 32.

The fiber cable 31 can guide the excitation light generated in the excitation light source 21 to the solid-state laser crystal 41.

—Fiber Guide 32—

The fiber guide 32 is configured to wind the fiber cable 31 with the predetermined bending radius. The bending radius of the fiber guide 32 is set to be equal to or larger than a minimum bending radius of the fiber cable 31.

Specifically, the fiber guide 32 according to this embodiment is formed in a substantially cylindrical reel shape capable of winding the fiber cable 31 several times. The fiber guide 32 is arranged in a posture with a central axis of the cylindrical shape along the Y direction, and is attached to the vertical side portion 17*a* of the third base plate 17 from the −Y side.

In addition, the fiber guide 32 is arranged in a range from a front end of the light source control board 24 to a rear end of the second control board 54 in the X direction as illustrated in FIG. 12. As illustrated in FIG. 11, the fiber guide 32 is arranged on the +Y side of the light source control board 24 and the second control board 54 and on the −Y side of the right side wall portion of the first casing 50 in the Y direction.

(Laser Light Output Section 4)

The laser light output section 4 includes: the first deflection mirror 42 that bends an optical path of excitation light; the solid-state laser crystal 41 that generates a fundamental wave based on the excitation light; the Q switch 43 that performs pulsed oscillation of the fundamental wave based on a control signal input from the marker controller 100; and a first reflection mirror 44 that reflects the fundamental wave. These optical components are airtightly accommodated in the Q-switch accommodation section H12 obtained by dividing the crystal accommodation section H121 into two portions. Note that at least the solid-state laser crystal 41 among these optical components can also be accommodated in the wavelength conversion section H122.

The laser light output section 4 also includes: the non-linear optical crystal 45 that receives the laser light (fundamental wave) generated by the solid-state laser crystal 41 and converts a wavelength of the laser light to a shorter wavelength side; the second reflection mirror 46 that forms a resonant optical path together with the first reflection mirror 44; a laser light separation section 47 for separating the laser light whose wavelength has been converted to the short wavelength side from the resonant optical path; and a second deflection mirror 48 that bends an optical path of the laser light separated by the laser light separation section 47. These optical components are airtightly accommodated in the wavelength conversion section H12 obtained by dividing the crystal accommodation section H122 into two portions.

In particular, the laser light output section 4 according to this embodiment is configured as a so-called intra-cavity laser oscillator. That is, the Q switch 43, the first deflection mirror 42, the solid-state laser crystal 41, a first separator 47*a* constituting the laser light separation section 47, a second wavelength conversion element 45*b* as the non-linear optical crystal 45, and a first wavelength conversion element 45*a* as the non-linear optical crystal 45 are arranged in this order on the way from the first reflection mirror 44 to the second reflection mirror 46. In other words, the first reflection mirror 44, the second reflection mirror 46, and the respective members between the first reflection mirror 44 and the second reflection mirror 46 constitute a resonance unit, and the first wavelength conversion element 45*a* and the second wavelength conversion element 45*b* are arranged inside the resonance unit. The laser light output section 4 is configured as the intra-cavity laser oscillator in this embodiment, but may be an extra-cavity laser oscillator in which the non-linear optical crystal 45 is not located between the first reflection mirror 44 and the second reflection mirror 46.

Here, the first deflection mirror 42 is arranged so as to merge the optical axis (optical axis extending along the Y direction as indicated by reference sign A1 in FIG. 11) of the excitation light guided by the excitation light guide section 3 and passing through the first entrance window 91 and the optical axis (optical axis extending along the X direction) of the resonant optical path as indicated by reference sign A2 in FIGS. 11 and 12.

In addition, for example, the first separator 47*a* is arranged so as to separate laser light including a third harmonic wave from the resonant optical path connecting the first reflection mirror 44 and the second reflection mirror 46. That is, the laser light output section 4 converts a wavelength of the laser light containing photons stimulated and emitted from the solid-state laser crystal 41 to the shorter wavelength side while amplifying the laser light by multiple reflection between the first reflection mirror 44 and the second reflection mirror 46. The laser light thus amplified is separated by the laser light separation section 47 and output from the laser light output section 4.

In addition, the laser light output section 4 includes a Q-switch driver 49 that drives the Q switch 43 as a component arranged outside the crystal accommodation section H12. As illustrated in FIG. 13, the Q-switch driver 49 is attached to a +X-side portion obtained by dividing the top surface 10*u* into two portions in the X direction. The Q-switch driver 49 is also arranged on the +Y side of the vertical side portion 15*a* of the first base plate 15.

Note that the Q-switch driver 49 may be attached to the left side surface 101, the back surface 10*b*, or the like of the housing 10. The Q-switch driver 49 can be attached to a plate-shaped member constituting the outer surface of the housing 10.

—First Reflection Mirror 44—

The first reflection mirror 44 is accommodated in the Q-switch accommodation section H121 and is configured to reflect at least the fundamental wave. The first reflection mirror 44 constitutes a resonator together with the second reflection mirror 46. Note that the first reflection mirror 44 according to this embodiment is configured as a total reflection mirror that reflects the fundamental wave.

In addition, the first reflection mirror 44 according to this embodiment is attached to the partition surface 15*g* that defines the crystal accommodation section H12, and is thermally coupled to the first heat sink 81 via the first base plate 15.

—Second Reflection Mirror 46—

The second reflection mirror 46 is accommodated in the wavelength conversion section H122, and is configured to reflect at least the fundamental wave. The second reflection mirror 46 constitutes the resonator together with the first reflection mirror 44. Note that the second reflection mirror 46 according to this embodiment is configured as a total reflection mirror that reflects a second harmonic wave having a higher wavelength than the fundamental wave and a third harmonic wave having a higher wavelength than the second harmonic wave in addition to the fundamental wave.

In addition, the second reflection mirror 46 according to this embodiment is attached to the partition surface 15*g* similarly to the first reflection mirror 44, and is thermally coupled to the first heat sink 81 via the first base plate 15. In this manner, the first reflection mirror 44 and the second reflection mirror 46, which are both ends of the resonant optical path, are preferably positioned by the same first base plate 15 in order to form the resonant optical path with high accuracy as described above.

—Q Switch 43—

The Q switch 43 is accommodated in the Q-switch accommodation section H121, and is configured to perform pulsed oscillation of the fundamental wave generated by the solid-state laser crystal 41. Specifically, the Q switch 43 is arranged to be located on the optical axis of the resonant optical path (optical path of the resonator), and is interposed between the solid-state laser crystal 41 and the first reflection mirror 44.

The Q switch 43 according to this embodiment is a so-called active Q switch that operates based on an RF signal applied from the Q-switch driver 49. That is, if the Q switch 43 is temporarily turned into an on-state, the laser light incident on the Q switch 43 is deflected and separated from the resonant optical path. In this case, the multiple reflection of the laser light is restricted, and as a result, generation of an inverted distribution in the solid-state laser crystal 41 is promoted.

Further, if the Q switch 43 is switched from the on-state to an off-state for a predetermined period, the laser light is subjected to multiple reflection without being separated by the Q switch 43, and is amplified by the multiple reflection. In this case, the high-output laser light is pulse-oscillated.

In addition, the Q switch 43 according to this embodiment is attached to the partition surface 15*g* similarly to the first reflection mirror 44 or the like, and is thermally coupled to the first heat sink 81 via the first base plate 15.

—Q-Switch Driver 49—

The Q-switch driver 49 is accommodated inside the housing 10 and outside the crystal accommodation section H12, and generates the RF signal to be applied to the Q switch 43 based on a control signal input from the marker controller 100.

The Q-switch driver 49 is attached to the top surface 10*u* via a metal support plate, and is thermally coupled to the housing 10 via the support plate and the top surface 10*u*.

—First Deflection Mirror 42—

The first deflection mirror 42 is accommodated in the Q-switch accommodation section H121 and is arranged between the Q switch 43 and the solid-state laser crystal 41 in the X direction. The first deflection mirror 42 according to this embodiment is configured using a so-called beam splitter. The first deflection mirror 42 totally reflects the excitation light incident from the first entrance window 91 toward the +Y side to propagate along the X direction. On the other hand, the first deflection mirror 42 transmits the fundamental wave propagating along the X direction without reflecting the fundamental wave. The fundamental wave transmitted through the first deflection mirror 42 reaches the first reflection mirror 44 via the Q switch 43.

In addition, the first deflection mirror 42 according to this embodiment is attached to the partition surface 15*g* similarly to the first reflection mirror 44 or the like, and is thermally coupled to the first heat sink 81 via the first base plate 15.

—Solid-State Laser Crystal 41—

The solid-state laser crystal 41 is accommodated in the Q-switch accommodation section H121 and is made of a laser medium capable of forming an inverted distribution. The solid-state laser crystal 41 is configured to perform stimulated emission corresponding to incident laser excitation light when the laser excitation light is incident on an end surface thereof. A wavelength (so-called fundamental wavelength) of photons emitted by the stimulated emission increases or decreases depending on a specific configuration of the solid-state laser crystal 41, and is in an infrared range of about 1 μm in this embodiment.

In this embodiment, rod-shaped $Nd:YVO_4$ (yttrium vanadate) is used as laser media constituting the solid-state laser crystal 41. Laser excitation light is incident from one end surface of the rod-shaped solid-state laser crystal 41, and laser light having a fundamental wavelength (so-called fundamental wave) is emitted from the other end surface (so-called unidirectional excitation scheme by end pumping). In this example, the fundamental wavelength is set to 1064 nm. On the other hand, a wavelength of the laser excitation light is set to the vicinity of a center wavelength of an absorption spectrum of $Nd:YVO_4$ in order to promote stimulated emission. However, rare earth-doped YAG, YLF, $GdVO_4$, and the like, for example, can be used as other laser media without being limited to this example. Various solid-state laser media can be used in accordance with an application of the laser processing apparatus L.

In addition, the solid-state laser crystal 41 according to this embodiment is attached to the partition surface 15*g* similarly to the first reflection mirror 44 or the like, and is thermally coupled to the first heat sink 81 via the first base plate 15.

—Non-Linear Optical Crystal 45—

The non-linear optical crystal 45 is configured by combining the first wavelength conversion element 45*a* that receives the fundamental wave generated by the solid-state laser crystal 41 and generates the second harmonic wave having a wavelength higher than the wavelength of the fundamental wave and the second wavelength conversion element 45*b* that generates the third harmonic wave having a higher wavelength than the second harmonic wave. The first wavelength conversion element 45*a* and the second wavelength conversion element 45*b* are both accommodated in the wavelength conversion section H122.

The first wavelength conversion element 45*a* is a non-linear optical crystal capable of generating the second harmonic wave, and is configured to double a frequency of the fundamental wave and emit the fundamental wave as the second harmonic wave (Second Harmonic Generation: SHG) when the fundamental wave is incident. That is, a wavelength of laser light generated when the fundamental wave is incident on the first wavelength conversion element 45*a* is in a visible light region of around 500 nm. In particular, the wavelength of the second harmonic wave is set to 532 nm in the present embodiment.

In general, the conversion efficiency by the first wavelength conversion element 45*a* is lower than 100%. Therefore, when the fundamental wave is incident on the first wavelength conversion element 45*a*, laser light in which the fundamental wave and the second harmonic wave are mixed is emitted.

Note that LBO ($LiB_3O_3$) is used as the first wavelength conversion element 45*a* in this embodiment. However, various organic non-linear optical materials, inorganic non-linear optical materials, and the like can be used as the first wavelength conversion element 45*a* without being limited to this example.

The second wavelength conversion element 45*b* is a non-linear optical crystal capable of generating the third harmonic wave, and is configured to convert the fundamental wave and the second harmonic wave into the third harmonic wave having a frequency three times the frequency of the fundamental wave and emit the third harmonic wave (Third Harmonic Generation: THG) when the fundamental wave and the second harmonic wave are incident (particularly, when propagation directions of the fundamental wave and the second harmonic wave are equal to each other). That is, a wavelength of laser light generated when the fundamental wave and the second harmonic wave are incident on the second wavelength conversion element 45*b* is in an ultraviolet region (specifically, in the vicinity of a boundary between the visible light region and the ultraviolet region) of around 350 nm. In particular, the wavelength of the third harmonic wave is set to 355 nm in the present embodiment.

In general, the conversion efficiency by the second wavelength conversion element 45*b* is lower than 100%. Therefore, when the fundamental wave and the second harmonic wave are incident on the first wavelength conversion element 45*a*, laser light in which the fundamental wave, the second harmonic wave, and the third harmonic wave are mixed is emitted.

Note that LBO ($LiB_3O_3$) is used as the second wavelength conversion element 45*b* in this embodiment. However, various organic non-linear optical materials, inorganic non-linear optical materials, and the like can be used as the second wavelength conversion element 45*b* without being limited to this example.

In addition, the non-linear optical crystal 45 according to this embodiment is attached to the partition surface 15*g* similarly to the first reflection mirror 44 or the like, and is thermally coupled to the first heat sink 81 via the first base plate 15.

—Laser Light Separation Section 47—

The laser light separation section 47 is accommodated in the wavelength conversion section H122, and is configured to separate the third harmonic wave from the resonant optical path of laser light to generate UV laser light for laser processing.

The laser light separation section 47 includes a plurality of optical components. Specifically, the laser light separation section 47 according to this embodiment includes: the first separator 47*a* for extracting the second harmonic wave and the third harmonic wave from the laser light; a concave lens 47*b* for adjusting a beam diameter of the laser light including the second harmonic wave and the third harmonic wave; and a second separator 47*c* for extracting the third harmonic wave from the laser light.

The first separator 47*a* is a so-called beam splitter, and is configured to transmit the fundamental wave and reflect the second harmonic wave and the third harmonic wave. The first separator 47*a* is arranged to cross the optical axis of the resonant optical path connecting the first reflection mirror 44 and the second reflection mirror 46, and is in a posture inclined by approximately 45 degrees with respect to the optical axis. The laser light reflected by the first separator 47*a* propagates toward the −Z side.

The concave lens 47*b* is configured to transmit the laser light reflected by the first separator 47*a*, that is, the laser light separated from the resonant optical path, thereby expanding the beam diameter of the transmitted laser light. In this embodiment, the concave lens 47*b* is interposed between the first separator 47*a* and the second separator 47*c*, but is not limited to such an arrangement.

The second separator 47*c* is a beam splitter similar to the first separator 47*a*, and is configured to transmit the second harmonic wave and reflect the third harmonic wave. The second separator 47*c* is arranged to cross an optical axis of the laser light having passed through the concave lens 47*b*, and is in a posture inclined by approximately 45 degrees with respect to the optical axis. The laser light reflected by the second separator 47*c* propagates toward the −X side.

In addition, the optical components constituting the laser light separation section 47 are attached to the partition surface 15*g* similarly to the first reflection mirror 44 or the like, and are thermally coupled to the first heat sink 81 via the first base plate 15 (see also FIG. 10).

In this manner, all the first reflection mirror 44, the second reflection mirror 46, the Q switch 43, the first deflection mirror 42, the solid-state laser crystal 41, the non-linear optical crystal 45, and the laser light separation section 47 are preferably positioned by the same first base plate 15 in order to generate the laser light in the optical path with high accuracy.

—Second Deflection Mirror 48—

The second deflection mirror 48 is accommodated in the wavelength conversion section H122, and is arranged on the −X side of the other optical members accommodated in the crystal accommodation section H12. The second deflection mirror 48 according to this embodiment is configured using a so-called beam splitter. The second deflection mirror 48 reflects the laser light passing through the second separator 47*c* and propagating toward the −X side. The laser light reflected by the second deflection mirror 48 is deflected to propagate toward the −Y side.

In addition, the second deflection mirror 48 according to this embodiment is attached to the partition surface 15*g* similarly to the first reflection mirror 44 or the like, and is thermally coupled to the first heat sink 81 via the first base plate 15. In this manner, the second deflection mirror 48 that emits the laser light from the laser light output section 4 to the outside is preferably positioned by the first base plate 15 similarly to the first reflection mirror 44 or the like in order to improve the accuracy of a position where the generated laser light is output.

Finally, the laser light deflected by the second deflection mirror 48 passes through the second entrance window 92 and enters the first casing 50 from the laser light output section 4. As illustrated in FIG. 11, the laser light entering the first casing 50 propagates toward the −Y side and reaches the third deflection mirror 56 of the laser light scanning section 5.

(Laser Light Scanning Section 5)

The laser light scanning section 5 includes an intermediate deflection section 55, a third deflection mirror 56, the defocus lens 57 as the optical element, and the first casing 50 that accommodates at least the first mirror 51*a* of the first scanner 51 and the second mirror 52*a* of the second scanner 52, in addition to the first scanner 51 and the second scanner 52, the first control board 53 and the second control board 54 described above.

Hereinafter, these constituent elements will be described in order of arrival of laser light during laser oscillation.

—Third Deflection Mirror 56—

As illustrated in FIG. 11, the third deflection mirror 56 is accommodated in the first casing 50, is arranged to be arranged side by side with the second deflection mirror 48 and the second entrance window 92 along the Y direction, and is located on the −Y side of these members. The third deflection mirror 56 is arranged between the second entrance window 92 and the light source control board 24 in the Y direction (in other words, on the −Y side of the second entrance window 92 and on the +Y side of the light source control board 24).

The third deflection mirror 56 is configured using, for example, a total reflection mirror, receives the laser light entering the first casing 50 and propagating toward the −Y side, and reflects the laser light toward the +X side. The laser light reflected by the third deflection mirror 56 reaches the second mirror 52*a* of the second scanner 52. Note that the third deflection mirror 56 may be configured using a mirror that partially transmits the laser light, instead of the total reflection mirror. In this case, the output of the laser light entering the first casing 50 from the laser light output section 4 may be detected using the partially transmitted laser light.

—Second Scanner 52—

As illustrated in FIGS. 14, 15, and 16, the second scanner 52 includes the second mirror 52*a* that scans laser light in a predetermined second direction, and the second motor 52*b* that rotatably supports the second mirror 52*a*. Among them, the second mirror 52*a* is accommodated in the mirror accommodation section H11, and most of the second motor 52*b* is accommodated in the board accommodation section H13.

The second mirror 52*a* is configured as a so-called galvanometer mirror. The second mirror 52*a* receives the laser light generated by the solid-state laser crystal 41 via the third deflection mirror 56 and the like illustrated in FIG. 11. The second mirror 52*a* reflects the received laser light toward the +Z side to deflect the laser light. As the second mirror 52*a* rotates, an irradiation position of the laser light in the irradiation area R1 is scanned in the second direction.

Here, the second direction that is the deflection direction by the second mirror 52*a* is a direction orthogonal to both the first direction that is the deflection direction by the first mirror 51*a* of the first scanner 51 and the −Z direction as the irradiation direction, and is set to coincide with the X direction in this embodiment.

Specifically, the second mirror 52*a* is a total reflection mirror having a substantially rectangular plate shape, and is accommodated in the mirror accommodation section H11 in a state of being supported by a distal end of a rotation axis of the second motor 52*b*. The second mirror 52*a* rotates integrally with a shaft of the second motor 52*b*, and is configured to be rotated about a predetermined second rotation axis Ac2 by the second motor 52*b*. The amount of deflection by the second mirror 52*a* and an irradiation position of laser light in the second direction are determined based on a rotation angle of the second mirror 52*a* about the second rotation axis Ac2.

Here, the second rotation axis Ac2, which is a rotation center of the second mirror 52*a*, extends to be orthogonal to both a first rotation axis Ac1, which is a rotation center of the first mirror 51*a*, and the Z direction as the irradiation direction as illustrated in FIGS. 14 and 15, and is set to extend along the Y direction in this embodiment.

The second mirror 52*a* is also arranged to be arranged side by side with the third deflection mirror 56 along the X direction, and is located on the +X side of the third deflection mirror 56. The second mirror 52*a* is further located on the −Y side of the first mirror 51*a* and the defocus lens 57 in the Y direction, and is located on the −Z side of the first mirror 51*a* and the defocus lens 57 in the Z direction.

The second motor 52*b* is a galvano motor configured using a DC motor or the like, and is formed in a substantially cylindrical shape with the second rotation axis Ac2 as a central axis. The distal end (+Y-side end) of the second motor 52*b* in a direction of the second rotation axis Ac2 (Y direction) is inserted into the sixth through-hole 50*c* of the first casing 50. On the other hand, the other end (−Y-side end of the second motor 52*b*) located on an opposite side of the distal end in the direction of the second rotation axis Ac2 protrudes from the sixth through-hole 50*c* and is exposed inside the board accommodation section H13.

The second scanner 52 reflects laser light through the second mirror 52*a*. The laser light reflected by the second mirror 52*a* is emitted from the exit window 6 via the intermediate deflection section 55, the first mirror 51*a*, and the defocus lens 57. At this time, the second scanner 52 can scan the irradiation area R1 with the laser light in the second direction (X direction) by adjusting a reflection angle of the laser light by the second motor 52*b*.

—Intermediate Deflection Section 55—

As illustrated in FIGS. 14, 15, and 16, the intermediate deflection section 55 includes an intermediate mirror 55*a* that relays laser light between the second mirror 52*a* and the first mirror 51*a*, and a pedestal 55*b* that supports the intermediate mirror 55*a*. Both the intermediate mirror 55*a* and the pedestal 55*b* are accommodated in the mirror accommodation section H11.

The intermediate mirror 55*a* is configured using, for example, a total reflection mirror. The intermediate mirror 55*a* allows laser light reflected by the second mirror 52*a* to enter and reflects the laser light toward the first mirror 51*a*.

The intermediate mirror 55*a* is also arranged to be arranged side by side with the second mirror 52*a* along the Z direction, and is located on the +Z side of the second mirror 52*a*. The intermediate mirror 55*a* is further arranged to be arranged side by side with the first mirror 51*a* along the Y direction, and is located on the −Y side of the first mirror 51*a*.

The intermediate mirror 55*a* receives laser light reflected by the second mirror 52*a* and propagating toward the +Z side, and reflects the laser light toward the +Y side. The laser light reflected by the intermediate mirror 55*a* reaches the first mirror 51*a* of the first scanner 51.

The pedestal 55*b* is arranged at the bottom of the first casing 50 and supports the intermediate mirror 55*a* from the +Z side. The pedestal 55*b* according to this embodiment supports the intermediate mirror 55*a* so as to direct a mirror surface toward the +Y side and the −Z side.

—First Scanner 51—

As illustrated in FIGS. 14, 15, and 16, the first scanner 51 includes the first mirror 51*a* that scans laser light in the predetermined first direction, and the first motor 51*b* that rotatably supports the first mirror 51*a*. Among them, the first mirror 51*a* is accommodated in the mirror accommodation section H11, and most of the first motor 51*b* is accommodated in the board accommodation section H13.

The first mirror 51*a* is configured as a so-called galvanometer mirror. The first mirror 51*a* receives laser light reflected by the intermediate mirror 55*a*. The first mirror 51*a* reflects the received laser light toward the +Z side to deflect the laser light. As the first mirror 51*a* rotates, an irradiation position of the laser light in the irradiation area R1 is scanned in the first direction.

Here, the first direction that is the deflection direction by the first mirror 51*a* is a direction orthogonal to both the above-described second direction and the Z direction as the irradiation direction as illustrated in FIGS. 14 and 15, and is set to coincide with the Y direction in this embodiment.

Note that the first direction and the second direction are not limited to the settings of this embodiment. The first direction may coincide with the X direction and the second direction may coincide with the Y direction, or the first direction and the second direction may be inclined with respect to the X direction and the Y direction, respectively.

Specifically, the first mirror 51*a* is a total reflection mirror having a substantially rectangular plate shape, and is accommodated in the mirror accommodation section H11 in a state of being supported by a distal end of a rotation axis of the first motor 51*b*. The first mirror 51*a* rotates integrally with a shaft of the first motor 51*b*, and is configured to be rotated about the predetermined first rotation axis Ac1 by the first motor 51*b*. The amount of deflection by the first mirror 51*a* and an irradiation position of laser light in the first direction are determined based on a rotation angle of the first mirror 51*a* about the second rotation axis Ac2.

Here, the first rotation axis Ac1, which is a rotation center of the first mirror 51*a*, extends to be orthogonal to both the second rotation axis Ac2, which is a rotation center of the second mirror 52*a*, and the −Z direction as the irradiation direction, and is set to extend along the X direction in this embodiment.

With this setting, both the first rotation axis Ac and the second rotation axis Ac2 extend in a direction different from the irradiation direction, for example, the direction (X or Y direction) orthogonal to the irradiation direction. Note that a configuration in which the first rotation axis Ac and the second rotation axis Ac2 are orthogonal to the irradiation direction is not essential, and an inclination angle within, for example, 20 degrees with respect to the X or Y direction may be provided.

In addition, the first rotation axis Ac is offset to the +Z side with respect to the second rotation axis Ac2 in this embodiment, but the first rotation axis Ac and the second rotation axis Ac2 can be arranged on the same plane depending on the configuration of the intermediate mirror 55*a*.

The first mirror 51*a* is also arranged side by side with the intermediate mirror 55*a* along the Y direction, and is located on the +Y side of the intermediate mirror 55*a*. The first mirror 51*a* is further arranged side by side with the cover glass 62 and the defocus lens 57 along the Z direction, and is located on the −Z side of the defocus lens 57. As a result of such a configuration, the first mirror 51*a* according to this embodiment is arranged to face the workpiece W and the irradiation area R1 with the exit window 6 interposed therebetween. The first mirror 51*a* is located immediately above the exit window 6, and another reflection mirror is not interposed between the first mirror 51*a* and the exit window 6. Although the first mirror 51*a* is defined on the assumption that no reflection mirror is interposed between the first mirror 51*a* and the exit window 6 in this embodiment for convenience of the description, it is not excluded that a certain reflection mirror is interposed between the first mirror and the exit window 6. In a case where the reflection mirror is interposed between the first mirror 51*a* and the exit window 6, a mirror that scans an irradiation position in the irradiation area R1 immediately before reaching the irradiation area R1 is regarded as the first mirror 51*a*. Note that an area through which laser light passes spreads between the first mirror 51*a* and the exit window 6 due to the rotation of the second mirror 52*a* and the rotation of the first mirror 51*a*, and thus, the interposed reflection mirror has a size enough to cover the area through which the laser light passes. Therefore, it is preferable that the reflection mirror not be interposed between the first mirror 51*a* and the exit window 6 in order to downsize the marker head 1.

The first motor 51*b* is a galvano motor configured using a DC motor or the like, and is formed in a substantially cylindrical shape with the first rotation axis Ac as a central axis. The distal end (−X-side end) of the first motor 51*b* in a direction of the first rotation axis Ac (X direction) is inserted into the seventh through-hole 50*d* of the first casing 50. On the other hand, the other end (+Y-side end of the first motor 51*b*) located on an opposite side of the distal end in the direction of the first rotation axis Ac protrudes from the seventh through-hole 50*d* and is exposed inside the board accommodation section H13.

The first scanner 51 reflects laser light through the first mirror 51*a*. The laser light reflected by the first mirror 51*a* passes through the defocus lens 57 and is emitted from the exit window 6. At this time, the first scanner 51 can scan the irradiation area R1 with the laser light in the first direction (Y direction) by adjusting a reflection angle of the laser light by the first motor 51*b*.

—Defocus Lens 57—

The defocus lens 57 is configured to transmit laser light deflected by the first mirror 51*a* and diffuse the laser light in an outward direction orthogonal to the irradiation direction. When the Z direction is the irradiation direction as in this embodiment, the outward direction as a diffusion direction is a direction along the XY plane.

Specifically, the defocus lens 57 can include, for example, one biconcave lens. In this case, the defocus lens 57 is fitted in the fifth through-hole 50*b* with its central axis along the Z direction.

The defocus lens 57 is also arranged in a straight line connecting the first mirror 51*a* and a central portion of the cover glass 62 in the exit window 6. The defocus lens 57 is arranged between the first mirror 51*a* and the cover glass 62 (in other words, on the +Z side of the first mirror 51*a* and on the −Z side of the cover glass 62) in the Z direction.

The defocus lens 57 is further arranged such that an optical axis of the defocus lens 57 is coaxial with the optical axis of the cover glass 62. Hereinafter, the optical axes of the defocus lens 57 and the cover glass 62 are collectively referred to as a "laser emission axis", which is denoted by reference sign A1 (see also FIG. 4). The laser emission axis A1 is configured to extend along the Z direction and is offset toward the +Y side with respect to the second mirror 52*a* and the intermediate mirror 55*a*, and to cross a mirror surface of the first mirror 51*a*.

Note that the configuration of the defocus lens 57 as the optical element is not limited to what uses one biconcave lens. The optical element may be configured using a plurality of lenses, or the optical element may be configured using a lens other than the biconcave lens. In addition, in the first place, the laser light scanning section 5 may be configured without using the defocus lens 57.

—Second Control Board 54—

The second control board 54 is electrically connected to the marker controller 100 and the second scanner 52, and is configured to control the second scanner 52. More specifically, the second control board 54 can control a rotation angle of the second mirror 52*a* by driving the second motor 52*b* in accordance with a control signal input from the marker controller 100.

The second control board 54 according to this embodiment is configured using a circuit board having a substantially rectangular thin plate shape. The second control board 54 is accommodated in the board accommodation section H13 in a posture with both front and back surfaces extending along the Z direction and the X direction, and is fastened to, for example, the vertical side portion 17*a* of the third base plate 17 from the −Y side.

As illustrated in FIG. 12, the second control board 54 is arranged on the +X side of the light source control board 24 in the X direction, and is arranged on the −Y side of the first casing 50 and the light source control board 24 in the Y direction. The second control board 54 is also electrically connected to the second motor 52*b* by wiring (not illustrated).

—First Control Board 53—

The first control board 53 is electrically connected to the marker controller 100 and the first scanner 51, and is configured to control the first scanner 51. More specifically, the first control board 53 can control a rotation angle of the first mirror 51*a* by driving the first motor 51*b* in accordance with a control signal input from the marker controller 100.

The first control board 53 according to this embodiment is configured using a circuit board having a substantially rectangular thin plate shape. The first control board 53 is accommodated in the board accommodation section H13 in a posture with both front and back surfaces extending along the Z direction and the X direction, and is fastened to, for example, the vertical side portion 17*a* of the third base plate 17 from the −Y side.

As illustrated in FIG. 12, the first control board 53 is also arranged side by side with the second control board 54 along the X direction, and is located on the +X side of the light source control board 24 and the second control board 54. The first control board 53 is also electrically connected to the first motor 51*b* by wiring (not illustrated).

<Main Operation and Main Processing of Laser Processing Apparatus L>

Figure 19:
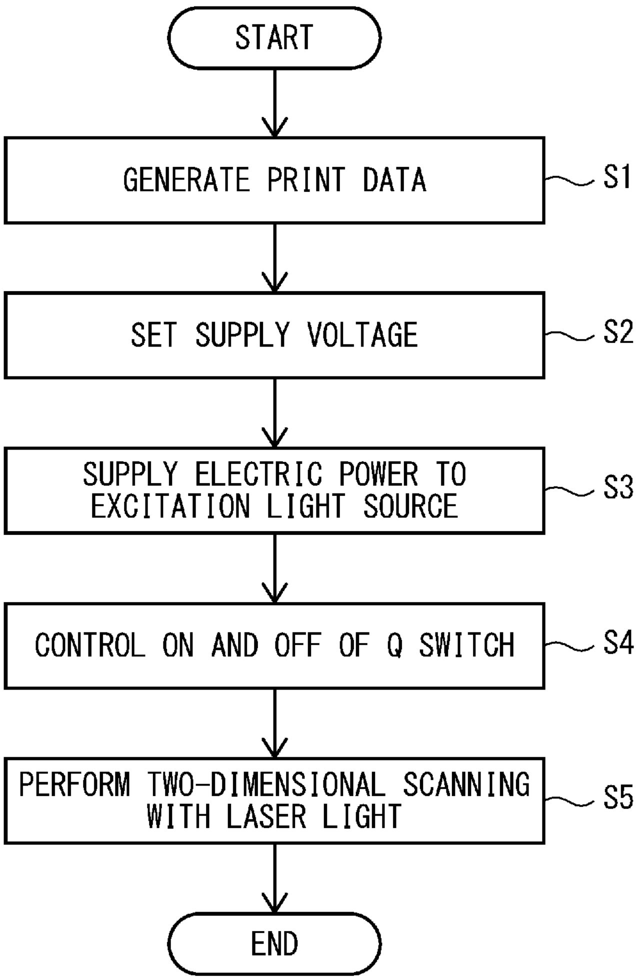
FIG. 19 is a flowchart illustrating a basic control process of the laser processing apparatus.

FIG. 19 is a flowchart illustrating a basic control process of the laser processing apparatus L. Hereinafter, the main operation and main processing of the laser processing apparatus L will be described with reference to FIG. 19.

First, an input of the processing pattern Pp that needs to be printed on a setting plane R2 displayed on the display section 301 is received in step S1 of FIG. 19. This input is received by the reception section 101 and read by the control section 103. The control section 103 generates print data based on the input processing pattern Pp. The print data includes a trajectory (so-called scanning line) of laser light on the workpiece W set in accordance with the processing pattern Pp.

In the subsequent step S2, the control section 103 sets a voltage (supply voltage) that needs to be supplied to the excitation light source 21. Details of this setting will be described later with reference to FIGS. 20 and 21.

In the subsequent step S3, the control section 103 inputs a control signal to the light source control board 24 and the like, so that electric power is supplied to the excitation light source 21. Accordingly, excitation light is generated in the excitation light generation section 2, and the excitation light is input to the laser light output section 4.

In the subsequent step S4, when the control section 103 inputs a control signal to the Q-switch driver 49 and the like, the Q switch 43 is controlled to be turned on and off, so that UV laser light is pulsed. The laser light is output from the laser light output section 4 and input to the laser light scanning section 5.

In the subsequent step S5, the control section 103 inputs a control signal to the first control board and 53, the second control board 54, and the like, so that two-dimensional scanning with the UV laser light is performed. The two-dimensional scanning referred to herein means that an irradiation position of laser light is moved in a two-dimensional direction, that is, the direction along the XY plane in this embodiment. Note that a shape of the workpiece W irradiated with laser light is not limited to a two-dimensional shape along the XY plane, and may be a three-dimensional shape having different positions in the Z direction (shape whose height in the Z direction changes).

At this time, the UV laser light deflected by the second mirror 52*a* is reflected by the intermediate mirror 55*a*, and then, deflected again by the first mirror 51*a* in the laser light scanning section 5. As illustrated in FIGS. 10 and 18, the UV laser light deflected by the first mirror 51*a* sequentially passes through the defocus lens 57 and the cover glass 62, and then, passes through the above-described optical path defining section H3, thereby being emitted to the outside of the housing 10. The UV laser light emitted to the outside of the housing 10 is emitted to the irradiation area R1 set on the workpiece W. The UV laser light emitted onto the workpiece W is two-dimensionally scanned in the irradiation area R1 so as to trace the scanning line according to the printing data.

<Countermeasure against Heat Generation in Excitation Light Source 21>

Figure 21:
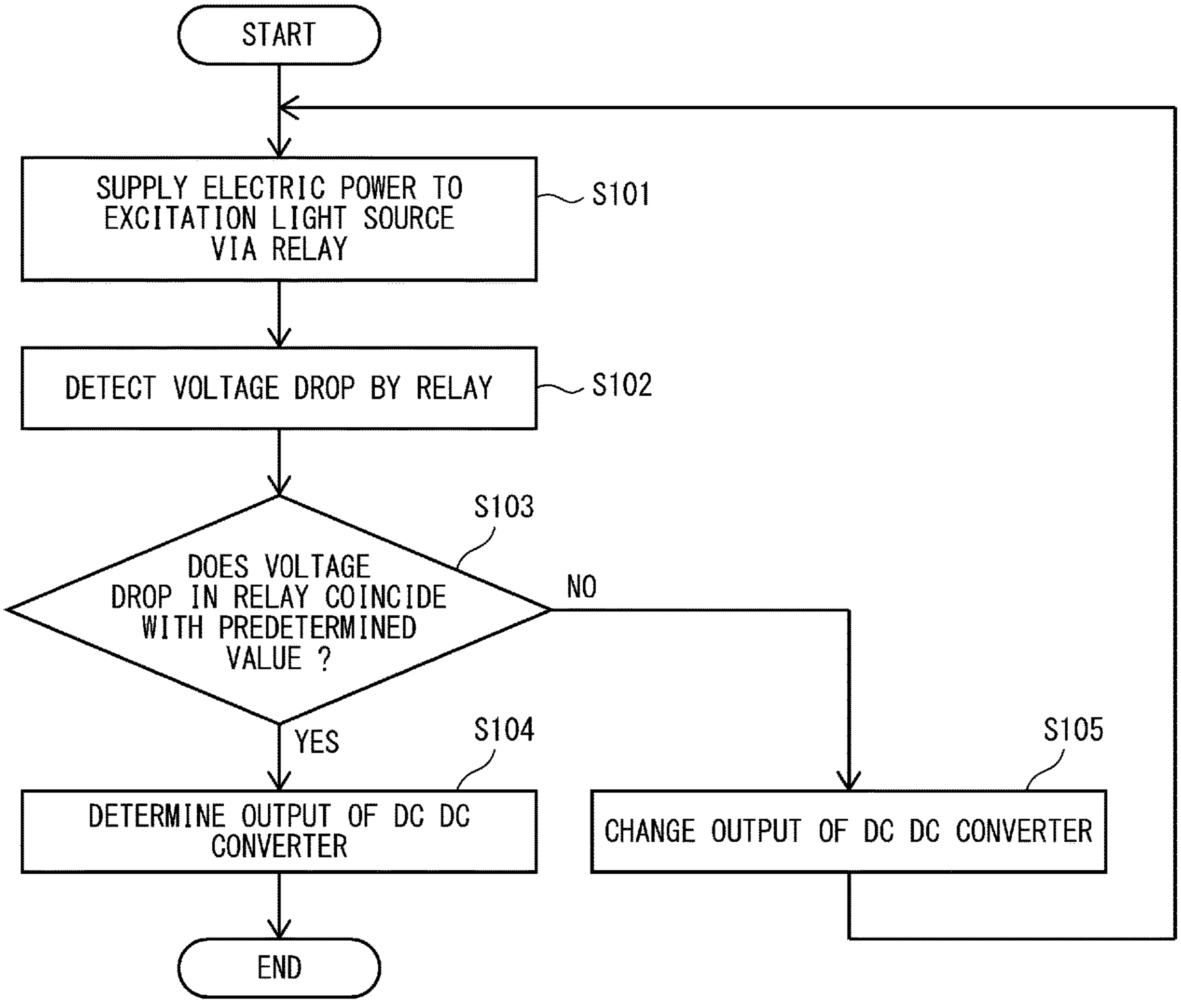
FIG. 21 is a flowchart illustrating a specific example of a control process related to the power supply section.

FIG. 20 is a block diagram for describing a circuit structure according to the power supply section 104, and FIG. 21 is a flowchart illustrating a control process according to the power supply section 104. As described so far, the excitation light source 21 is configured to be supplied with electric power from the power supply section 104 as the power supplier.

Specifically, the power supply section 104 according to this embodiment includes: a DC power supply 104*a* that converts AC power supplied from the outside into DC power and outputs the DC power; and a DC/DC converter 104*b* that performs DC/DC conversion on the power output from the DC power supply 104*a* as illustrated in FIG. 20. The power (particularly, DC power) converted by the DC/DC converter 104*b* is input to the excitation light source 21 configured using an LD.

Here, a relay 25 is interposed between the DC/DC converter 104*b* and the excitation light source 21. The relay 25 opens and closes an electrical contact between the DC/DC converter 104*b* and the excitation light source 21.

The relay 25 can be configured using, for example, a field effect transistor (FET). The relay 25 according to this embodiment includes the FET, and opens and closes the electrical contact based on a control signal input from a PLC 902, the control section 103, or the like via the light source control board 24.

Conventionally, an output voltage input from the DC/DC converter 104*b* to the excitation light source 21 by relaying has a fixed value. Further, a variation in a forward voltage (so-called Vf) of the excitation light source 21 causes heat generation in the relay 25. Note that a cause of the variation in Vf is, for example, a variation in quality of the excitation light source 21 itself, and Vf required for the output of certain laser light is different. Therefore, in order to secure the minimum output of the laser light even in the worst case, it is necessary to provide a margin to the output of the DC/DC converter 104*b* (in other words, to set the output voltage of the DC/DC converter 104*b* to be large).

However, in a case of using such a conventional configuration, the amount of heat generation in the relay 25 tends to increase. This leads to an increase in size of a heat generating structure, such as a heat sink, and thus, is likely to cause trouble when the excitation light source 21 is built in the marker head 1.

Therefore, the control section 103 according to this embodiment controls the output voltage output from the power supply section 104 as the power supplier and input to the excitation light source 21. Therefore, the control section 103 and the DC/DC converter 104*b* are electrically connected in this embodiment as illustrated in FIG. 20, and the output (the output voltage) from the DC/DC converter 104*b* is adjusted based on a control signal output from the control section 103.

Furthermore, the control section 103 according to this embodiment detects a voltage drop occurring in the relay 25 and controls the output voltage based on the detected voltage drop. Specifically, the control section 103 controls the output voltage such that the detected voltage drop becomes a predetermined value. Therefore, a first monitor circuit 26 that monitors a voltage on the upstream side of the relay 25 and a second monitor circuit 27 that monitors a voltage on the downstream side of the relay 25 are provided in this embodiment as illustrated in FIG. 20. The control section 103 can estimate the voltage drop generated in the relay 25 by calculating a difference between the voltage monitored by the first monitor circuit 26 and the voltage monitored by the second monitor circuit 27.

In addition, the "predetermined value" as a criterion for determination of the voltage drop can be set to, for example, 2.5 V in a state where 1 ampere has flowed through the excitation light source 21. Note that the setting of the predetermined value is stored in advance in the storage section 102, and is configured to be read by the control section 103 if necessary.

As described above, when the predetermined value is set to 2.5 V, the control section 103 adjusts the output voltage of the DC/DC converter 104*b* such that the voltage drop generated in the relay 25 becomes 2.5 V. With this configuration, there is no need to provide the margin to the output voltage of the DC/DC converter 104*b*, and thus, the output voltage can be suppressed, and the heat generation occurring in the relay 25 can be suppressed.

FIG. 21 is a flowchart illustrating a control process related to the power supply section 104. This control process may be executed, for example, in step S2 during the control process of FIG. 19.

First, the control section 103 inputs a control signal to the relay 25 via the light source control board 24 to electrically connect the DC/DC converter 104*b* and the excitation light source 21 in step S101 in FIG. 21. Further, the control section 103 inputs a control signal to the power supply section 104, and supplies an output voltage of the DC/DC converter 104*b* to the excitation light source 21 via the relay 25.

In the subsequent step S102, the control section 103 detects a voltage drop generated in the relay 25 based on detection signals of the first monitor circuit 26 and the second monitor circuit 27.

In the subsequent step S103, the control section 103 determines whether or not the voltage drop detected in step S102 coincides with the predetermined value set as described above. When the determination is NO, the control section 103 advances the control process to step S105, adjusts the output voltage from the DC/DC converter 104, and returns to step S101. That is, the control section 103 is configured to repeat the processing according to steps S101 to S103 and step S105 until the voltage drop coincides with the predetermined value. Note that the control section 103 determines whether or not the voltage drop generated in the relay 25 coincides with the predetermined value (step S103 in FIG. 21) in this embodiment, but the disclosure is not limited thereto. For example, whether or not the voltage drop falls within a certain range above and below the predetermined value may be determined. In short, the control section 103 may control the output voltage based on the detected voltage drop.

On the other hand, when the determination in step S103 is YES, the control section 103 advances the control process to step S104 and ends the adjustment of the output of the DC/DC converter 104 (output determination). In this case, the control section 103 ends the process illustrated in FIG. 21 and advances the control process from step S2 to step S3 in FIG. 19. The same subsequent processing as described above is performed.

<Lighting Control of Indicator 11>

As described above, the first lamp 11*a*, the second lamp 11*b*, and the third lamp 11*c* constituting the indicator 11 light up in accordance with control signals input from the marker controller 100. For example, the first lamp 11*a* emits light when the marker head 1 is powered on. On the other hand, the second lamp 11*b* lights up in accordance with a standard requirement of UV laser light, and the third lamp 11*c* lights up in accordance with a state of the laser processing apparatus L, such as an irradiation state of the UV laser light and the presence or absence of occurrence of an error in the marker head 1. Details of a lighting state are as illustrated in Table 1.

Specifically, when the key switch is in the "OFF" state (KSW: OFF), the marker controller 100 turns off all of the first lamp 11*a*, the second lamp 11*b*, and the third lamp 11*c*.

When the key switch is in the "POWER ON" state (KSW: POWER ON), the marker controller 100 causes only the first lamp 11*a* to emit blue light and turns off both the second lamp 11*b* and the third lamp 11*c*.

When the key switch is in the "LASER ON" state (LASER ON (KSW)), the marker controller 100 causes the first lamp 11*a* to emit blue light and causes the second lamp 11*b* to emit green light, and maintains a turn-off state of the third lamp 11*c*.

When the marker head 1 is ready to emit UV laser light (ready state), the marker controller 100 causes the first lamp 11*a* to emit blue light and causes both the second lamp 11*b* and the third lamp 11*c* to emit green light.

While the UV laser light is being emitted from the marker head 1 (during laser irradiation), the marker controller 100 causes the first lamp 11*a* to emit blue light, causes the second lamp 11*b* to emit yellow light, and causes the third lamp 11*c* to emit green light.

When a warning of which the user needs to be notified occurs in the laser processing apparatus L (occurrence of a warning error), the marker controller 100 causes the first lamp 11*a* to emit blue light, causes the second lamp 11*b* to emit green light, and causes the third lamp 11*c* to emit orange light.

When any abnormality occurs in the laser processing apparatus L (occurrence of an abnormality error), the marker controller 100 causes the first lamp 11*a* to emit blue light, causes the second lamp 11*b* to emit green light, and causes the third lamp 11*c* to emit red light.

When the laser processing apparatus L is in an interlock state (for example, when a safety terminal block is in an off state), the marker controller 100 causes the first lamp 11*a* to emit blue light, turns off the second lamp 11*b*, and causes the third lamp 11*c* to emit red light.

In this manner, the user can intuitively and visually recognize a state of the laser processing apparatus L by controlling a lighting state of the indicator 11 provided on the front surface 10*f* of the housing 10.

TABLE 1

| | Indicator | | |
|---|---|---|---|
| State | First lamp | Second lamp | Third lamp |
| KSW: OFF | Off | Off | Off |
| KSW: POWER ON | Blue | Off | Off |
| KSW: LASER ON | Blue | Green | Off |
| Ready state | Blue | Green | Green |
| During laser irradiation | Blue | Orange | Green |
| Occurrence of warning error | Blue | Green | Orange |
| Occurrence of abnormality error | Blue | Green | Red |
| Interlock state | Blue | Off | Red |

<Settings of Processing Equipment 500 and Marker Head 1>

FIG. 18 is a diagram for describing various dimensions of the marker head 1 and the support member 501. As illustrated in FIGS. 17A and 17B, the marker head 1 is attached to the support member 501 of the processing equipment 500 by being replaced with the printing apparatus 1001 such as a TTO. The marker head 1 attached to the support member 501 irradiates the workpiece W made of a sheet-like film with UV laser light to cause a chemical reaction in a UV-reactive layer contained in the workpiece W, thereby executing printing on the workpiece W.

The processing equipment 500 and the marker head 1 according to this embodiment are set to be suitable for such a use mode. Hereinafter, settings related to the processing equipment 500 and the marker head 1, and a relative positional relationship between the processing equipment 500 and the marker head 1 will be described in order.

First, the processing equipment 500 according to this embodiment includes the first driven roller 504*l* which is arranged on the +Y side of the conveyance roller 502 and around which the workpiece W is placed from the +Z side, and the second driven roller 504*r* which is arranged on the −Y side of the conveyance roller 502 and around which the workpiece W is placed from the −Z side, in addition to the conveyance roller 502 driven to convey the workpiece W.

The conveyance roller 504 as a driving roller conveys the workpiece W at a speed of 1500 mm/s or more and 2000 mm/s or less along the Y direction as a conveyance direction At. The workpiece W conveyed by the conveyance roller 504 moves along a movement path defined by the conveyance roller 502, the first driven roller 504*l*, and the second driven roller 504*r*.

Here, a path corresponding to the irradiation area R1 out of the movement path of the workpiece W includes a site having a different distance from the exit window 6. That is, the movement path of the workpiece W is configured to have a different height within a range of the irradiation area R1 as illustrated in FIG. 18.

In addition, the first driven roller 504*l* as a roller, which is immediately above the conveyance roller 502 and is the closest to the conveyance roller 502 among rollers in contact with the workpiece W on the upstream side of the conveyance roller in the movement path of the workpiece W, and the second driven roller 504*r* as a roller, which is immediately below the conveyance roller 502 and is the closest to the conveyance roller 502 among the rollers in contact with the workpiece W at the downstream side of the conveyance roller, are all driven rollers that rotate as the workpiece W is conveyed. The roller immediately above the conveyance roller 502 and the roller immediately below the conveyance roller are not limited to the driven rollers, but are preferably rollers in which the amount of sliding of the workpiece W with respect to the conveyance roller 502 is large even when being driven by a separately provided drive source. For example, if a material has a large frictional force with respect to the workpiece W, the amount of sliding is small. In addition, in a case where the surfaces of the respective rollers are made of the same material, the amount of slip is smaller as the amount of contact with the workpiece W is larger. In a case where the immediately upper roller and the immediately lower roller are configured using driven rollers or rollers having a large amount of slip with respect to the conveyance roller 502, an error hardly occurs in the amount of movement of the workpiece W with respect to the rotation of the conveyance roller 502. Therefore, the print quality can be improved by performing print control based on the rotation of the conveyance roller 502. In particular, the marker head 1 of this embodiment performs printing on the workpiece W in a non-contact manner as compared with the TTO, and thus, a printing position is likely to deviate when the slip occurs in the conveyance roller 502. Therefore, the marker head 1 is preferably arranged in the irradiation area R1 such that the conveyance roller having a small amount of slip with respect to rollers immediately before and immediately after the irradiation area R1 is located.

Here, an area irradiated with UV laser light corresponding to the irradiation area R1 out of the movement path of the workpiece W is arranged to be separated farther from the cover glass 62 as the optical member than an end of the second accommodation section H2 in a protruding direction, in the protruding direction of the second accommodation section H2.

Here, the protruding direction of the second accommodation section H2 coincides with the irradiation direction (that is, the +Z direction) of the UV laser light in this embodiment. In addition, the end of the second accommodation section H2 in the protruding direction corresponds to a +Z-side end of the housing 10 in this embodiment.

That is, the area irradiated with the UV laser light in the movement path of the workpiece W is arranged on the +Z side of the +Z-side end of the housing 10. In other words, the area irradiated with the UV laser light in the movement path of the workpiece W does not enter the optical path defining section H3 (is arranged on the +Z side of the optical path defining section H3). According to this configuration, the workpiece W can be easily inserted into the movement path from the front side of the movement path of the workpiece W. Therefore, it is easy to set the workpiece W to the movement path.

In addition, an apex 502*a* of the conveyance roller 502 on the cover glass 62 side (−Z side) is offset to the upstream side (+Y side) or the downstream side (−Y side) in the conveyance direction At substantially coinciding with the Y direction with respect to a center line (the laser emission axis A1) penetrating the central portion of the cover glass 62 (offset to +Y side in the illustrated example) as illustrated in FIG. 18.

That is, a center line Ar passing through the rotation axis of the conveyance roller 502 and extending in the Z direction is offset to the upstream side or the downstream side with respect to the laser emission axis A1. In other words, the laser emission axis A1 extending in the Z direction and the rotation axis of the conveyance roller 502 extending in the X direction are laid out so as not to cross each other.

In addition, in other words, the laser emission axis A1 is offset to the upstream side (+Y side) or the downstream side (−Y side) in the conveyance direction At with respect to the apex 502*a* (offset to the −Y side in the illustrated example). Specifically, out of the workpiece W on the upstream side and the workpiece W on the downstream side with respect to the apex 502*a* as illustrated in FIG. 18, the latter workpiece W has a smaller inclination with respect to a plane (the XY plane) orthogonal to the laser emission axis A1. That is, the workpiece W on the downstream side with respect to the apex 502*a* is inclined more gently than the workpiece W on the upstream side. The laser emission axis A1 according to this embodiment is offset to a side where the inclination of the workpiece W with respect to the plane orthogonal to the laser emission axis A1 is smaller, such as the workpiece W on the downstream side, out of the upstream side and the downstream side in the conveyance direction At.

Note that a size of the irradiation area R1 is set to be larger than a printable area (print area) in the printing apparatus 1001 before the replacement configured as the TTO. The TTO brings the printing section 1006 extending in the lateral direction of the workpiece W into contact with the workpiece W to perform printing on the workpiece W. Therefore, even if a printing area on the workpiece W is an area having a certain length in the longitudinal direction of the workpiece W, printing can be performed on the entire printing area on the workpiece W by causing the workpiece W to pass through the printing section 1006 if there is a positional relationship in which the printable range of the printing section 1006 includes the printing area on the workpiece W in the lateral direction of the workpiece W. On the other hand, a portion irradiated with laser light at a certain moment in the marker head 1 has a certain area but has a point shape. Therefore, when the printing area on the workpiece W is the area having a certain length in the longitudinal direction of the workpiece W, the irradiation area R1 irradiated with the laser light preferably has a certain length (dimension) in a direction corresponding to the longitudinal direction of the workpiece W. Specifically, a dimension (see reference sign L5 in FIG. 17A) of the irradiation area R1 in the conveyance direction At is set to be 120 $mm^2$ or more when the workpiece W is parallel to the XY plane. Note that the irradiation area R1 in this embodiment indicates an area that can be irradiated with the laser light by the first scanner 51 and the second scanner 52 on the surface of the workpiece W.

In addition, a size of the irradiation area R1 when the workpiece W is parallel to the XY plane is set such that the irradiation area R1 is covered with the bottom surface 10*d* of the housing 10 in the XY plane. That is, the entire irradiation area R1 overlaps the bottom surface 10*d* as viewed in the Z direction orthogonal to the XY plane, the dimension L5 of the irradiation area R1 in the Y direction is smaller than a dimension of the bottom surface 10*d* of the housing 10 in the Y direction, and a dimension L6 of the irradiation area R1 in the X direction is smaller than a dimension of the housing 10 in the X direction. According to this configuration, the laser light with which the workpiece W is irradiated is less likely to leak to the surroundings. In particular, when a distance from the +Z-side end of the housing 10 to the workpiece W (see a distance L2 in FIG. 18) is set to 0 mm or more and 20 mm or less, the leakage of the laser light is reduced. Further, when the workpiece W is a sheet-like workpiece W placed around a plurality of conveyance rollers and conveyed, the user can easily set the workpiece W on the movement path of the workpiece W by inserting the workpiece W from the front side of the conveyance rollers. Therefore, the work of setting the workpiece W in the movement path becomes easy when the front side of the movement path of the workpiece W is opened. Therefore, the leakage of the laser light can be reduced while maintaining the workability of setting the workpiece W by opening the front side of the movement path according to the configuration in which the entire length of the irradiation area R1 is accommodated in the bottom surface 10*d* in the X direction. Note that, in a case of adopting the configuration in which the leakage of the laser light is reduced using a member covering the front side of the workpiece W, there is a possibility that the workpiece W comes into contact with the member so that the workpiece W is contaminated when the workpiece W is moved obliquely, and thus, the possibility of contamination of the workpiece W is reduced according to the configuration in which the front side of the workpiece W is opened.

Note that these settings are particularly effective when eight characters are printed on the workpiece W by irradiating the workpiece W with UV laser light for 10 ms per character in a square of 3 mm×2 mm. Here, a parameter related to the UV laser light is suitable for a case where a line width (corresponding to target line width of 100 to 150 μm for one scanning line) of 0.2 to 0.35 mm is achieved by boldface printing with three scanning lines.

When the irradiation area R1 is set to be larger than the printable area in the TTO, printing can be performed in the irradiation area R1 while causing an irradiation position of the UV laser light to follow the conveyance of the workpiece W. Accordingly, the printable area similar to that in the TTO can be secured.

On the other hand, an output of the laser light generated by the marker head 1 and passing through the exit window 6 is set to 1 W or more and 2 W or less. This setting is determined to achieve the downsizing of the marker head 1. Color development in printing when laser light is emitted for a certain period of time varies depending on a power density of the emitted laser light. When the output of the laser light is 1 W or more and 2 W or less, a spot diameter of the laser light is preferably 160 μm or less such that sufficient color development can be obtained.

More preferably, a spot diameter of the laser light in the irradiation area R1 is set to 60 μm or more and 80 μm or less. This spot diameter can be set such that a depth of focus of the laser light corresponds to a portion having the longest optical path length of the laser light in the irradiation area R1 (an end of the irradiation area R1) and a portion having the shortest optical path length in the irradiation area R1 (a central portion of the irradiation area R1).

For example, a lower limit value of the spot diameter is a setting that corresponds to the number of scanning lines and the line width described above. In this setting, in a case where the dimension of the irradiation area R1 is set to 120 $mm^2$ or more when the distance from the +Z-side end of the housing 10 to the workpiece W (see the distance L2 in FIG. 18) is set to 0 mm or more and 20 mm or less, it is advantageous in terms of suppressing an influence of an optical path length difference between the central portion and the end of the irradiation area R1 without adjusting the focus along the Z direction.

On the other hand, an upper limit value of the spot diameter is advantageous when boldface printing is performed with a thickness of 200 μm (0.2 mm) or more, such as the above-described line width of 0.2 to 0.35 mm. In this case, there is a concern that a processing time required for boldface processing becomes relatively long, but the irradiation area R1 of the UV laser light can be made large by setting the upper limit value of the spot diameter as described above, and time for which the irradiation is possible can be made long.

Note that the upper limit value (=80 μm) of the spot diameter is an optimum value in a case where the UV laser light is emitted in parallel with the irradiation direction and the distance L2 is set to 10 mm. When the distance L2 is changed within the range of 0 mm or more and 20 mm or less, the upper limit value of the spot diameter is 120 μm.

Note that, when there is a concern about the optical path length difference in the irradiation area R1, the depth of focus can be made deeper by providing the defocus lens 57 described above. To make the depth of focus deeper is advantageous in terms of suppressing the influence of the optical path length difference.

In addition, among relative positions of the workpiece W with respect to the housing 10, particularly, a relative position where printing can be performed with respect to the workpiece W is set such that a distance (particularly, distance as viewed along the irradiation direction, and corresponds to the sum of the distance L2 and a distance L3 in FIG. 19) from the first mirror 51*a* to the surface of the workpiece W is 150 mm or less.

Note that the distance from the top surface 10*u* of the housing 10 to the workpiece W is set to be 195 mm or less in this embodiment, in addition to the above. The TTO as the printing apparatus 1001 before replacement is often used in an environment where the distance from the top surface to the workpiece W is around 200 mm, and can be used in an environment similar to that of the printing apparatus 1001 before replacement. Specifically, a distance L1 from the top surface 10*u* of the housing 10 to the +Z-side end of the bottom surface 10*d* is set to 165 mm in this embodiment. Further, the distance L2 from the +Z-side end of the bottom surface 10*d* to the workpiece W is preferably set to 30 mm or less, and more preferably 20 mm or less.

Here, when the distance L2 is set to 30 mm or less, regular reflection light by the workpiece W of laser light with which the irradiation area R1 is irradiated can be guided to an area between the first plate-shaped member 18*l* and the second plate-shaped member 18*r*, that is, to the optical path defining section H3. This is advantageous in terms of suppressing leakage of the regular reflection light to the outside of the housing 10.

In addition, the distance L3 from the first mirror 51*a* to the +Z-side end of the bottom surface 10*d* is set to 123 mm in this embodiment. Further, a distance L4 from a lower surface of the defocus lens 57 to the +Z-side end of the bottom surface 10*d* is set to 100 mm. Here, considering that a thickness of the defocus lens 57 is 2 mm, a distance (not illustrated) from an upper surface of the defocus lens 57 to the +Z-side end of the bottom surface 10*d* is set to 102 mm.

Here, a distance (=L1−L3) from the top surface 10*u* to the first mirror 51*a* is 42 mm, and a distance (=L1−L4) from the top surface 10*u* to the defocus lens 57 is 65 mm. On the other hand, the central portion of the housing 10 in the Z direction corresponds to a site of about 82 mm (=L1/2) as viewed from the top surface 10*u*. Therefore, both the first mirror 51*a* and the defocus lens 57 according to this embodiment are located on the −Z side of the central portion of the housing 10 in the Z direction.

<Positional Relationship among Housing 10, Support Member 501, and Workpiece W>

As described above, the attachment surface of the housing 10 is formed on an opposite side of the exit window 6 according to this embodiment (see the lower diagram of FIG. 17A). In the housing 10, not the bottom surface 10*d* on which the exit window 6 is formed, but the top surface 10*u* facing the opposite side thereof is configured to be attached to an attachment target position as the attachment surface, so that the housing 10 can be supported to be suspended from the attachment target position. This eliminates the need for interposing the support member 501 between the housing 10 and the workpiece W, and thus, the housing 10 and the workpiece W can be brought close to each other.

At this time, the support member 501 for supporting the housing 10 is located on the opposite side of the exit window 6 similarly to the attachment target position, and thus, can be sufficiently separated from the workpiece W. This makes it possible to suppress the interference between the support member 501 and the workpiece W while bringing the housing 10 and the workpiece W close to each other.

In addition, a gap is provided between the first base plate 15 and the top surface 10*u* as the attachment surface as illustrated in FIGS. 10, 13, and the like, so that it is possible to suppress the solid-state laser crystal 41 from being affected by the influence of distortion, vibration, and the like generated on the attachment surface at the attachment target position. As a result, the laser light can be favorably generated even in a case where the housing 10 is configured to be supported at the attachment target position.

In addition, the support member 501 and the attachment surface are configured to be connected via the attachment 7 instead of being directly connected as illustrated in FIG. 17A and the like, so that the housing 10 can be attached to the support member 501 that can take various forms without devising a structure of the housing 10 itself. This is advantageous in terms of facilitating replacement of various processing apparatuses with the laser processing apparatus L according to the disclosure.

In addition, the front surface 10*f* as the open surface is configured to be openable and closable as illustrated in FIGS. 3A and 3B and the like, instead of the exit surface (that is, the bottom surface 10*d*) facing the workpiece W and the attachment surface (that is, the top surface 10*u*) attached to the attachment target position, so that the exit window 6 can be accessed without causing interference with the workpiece W, the support member 501, and the like. As a result, maintainability of the laser processing apparatus L can be improved.

In addition, since the front surface 10*f* as the open surface on which the cover member 13 is provided and the back surface 10*b* as the connection surface to which the electric cable 200 is connected are located on the opposite sides as illustrated in FIG. 4 and the like, the interference between the cover member 13 and the electric cable 200 is suppressed at the time of opening, closing, attaching, or detaching the cover member 13. As a result, maintainability of the laser processing apparatus L can be improved.

Other Embodiments

Although the second accommodation section H2 is formed in the housing 10 in the above embodiment, the second accommodation section H2 is not essential. For example, the first heat sink 81 and the second heat sink 82 may be accommodated in the first accommodation section H1. In addition, the optical path defining section H3 can also be omitted as appropriate.

In addition, the excitation light source 21 is accommodated in the housing 10 of the marker head 1 in the above embodiment, but the disclosure is not limited to such a configuration. For example, the excitation light source 21 may be provided in the marker controller 100.

In addition, the crystal accommodation section H12, the mirror accommodation section H11, and the board accommodation section H13, obtained by dividing the first accommodation section H1 in the housing 10 into three portions, are arranged side by side in this order along the Y direction orthogonal to the irradiation direction in the above embodiment, but the disclosure is not limited to such a configuration. For example, the arrangement order of the crystal accommodation section H12, the mirror accommodation section H11, and the board accommodation section H13 may be changed, or any two of the crystal accommodation section H12, the mirror accommodation section H11, and the board accommodation section H13 may be arranged side by side along the irradiation direction.

In addition, the top surface 10*u* facing the bottom surface 10*d* on which the exit window 6 is formed among the six surfaces of the housing 10 is set as the attachment surface in the above embodiment, but the disclosure is not limited to such a setting. Any one surface among the six surfaces excluding the bottom surface 10*d* on which the exit window 6 is formed can be regarded as the attachment surface. For example, in a case where the right side surface 10*r* is the attachment surface, the support member 501 supports the housing 10 to be supported from the left side.

In addition, among the six surfaces of the housing 10, two or more surfaces excluding the bottom surface 10*d* can be regarded as the attachment surfaces. For example, in a case where the left side surface 101 and the top surface 10*u* are the attachment surfaces, the attachment 7 may be attached to one of the left side surface 101 and the top surface 10*u*, or may be attached to both the left side surface 101 and the top surface 10*u* as in a marker head 1' illustrated in FIG. 22.

Figure 22:
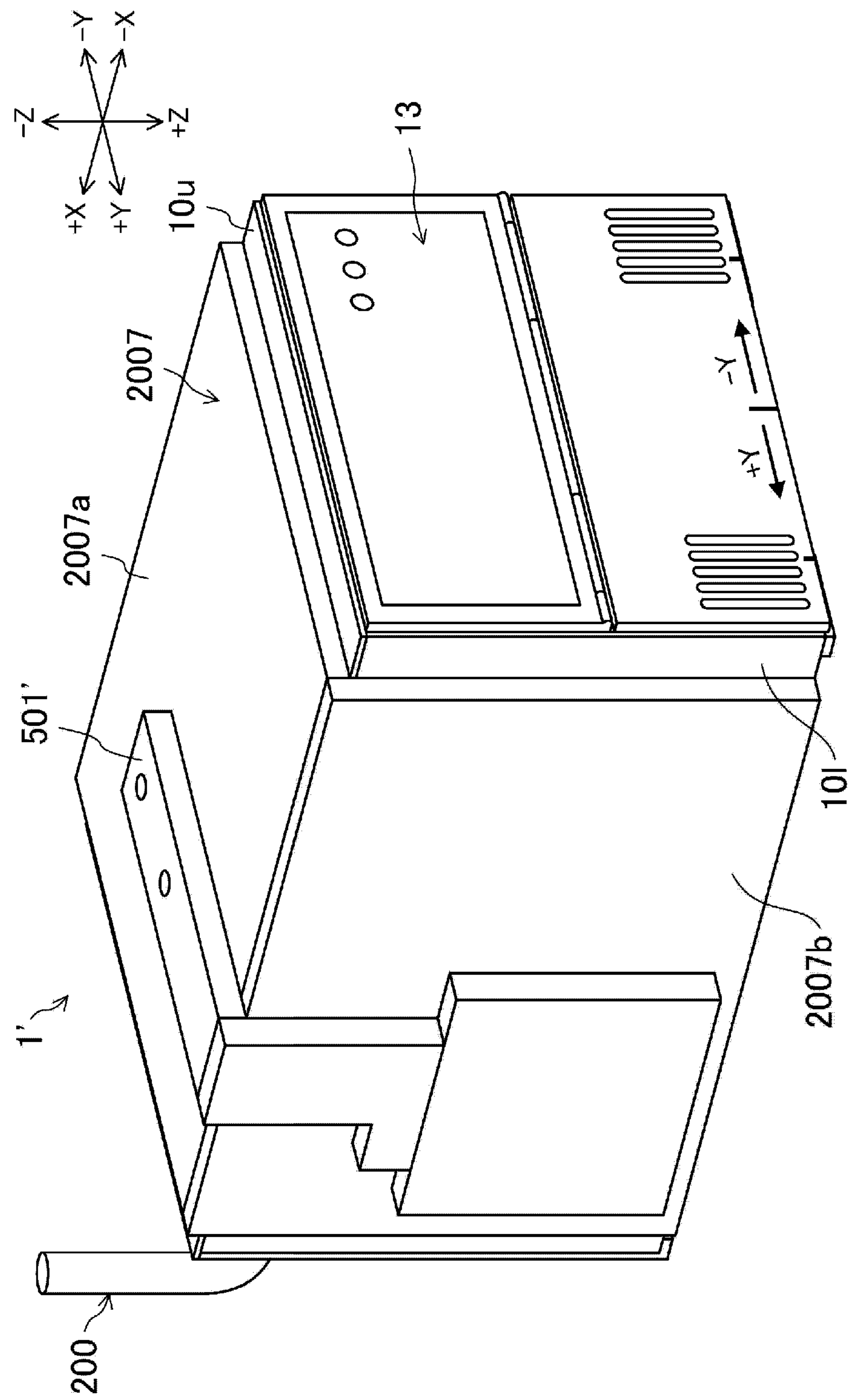
FIG. 22 is a perspective view illustrating a modification of an attachment surface and an attachment.

For example, an attachment 2007 illustrated in FIG. 22 has a first portion 2007*a* attached to the top surface 10*u* and a second portion 2007*b* attached to the left side surface 101, and a support member 501' also has a shape conforming to the attachment 2007. In this manner, the attachment surface can be set in accordance with a form of the support member 501', and the attachment 2007 corresponding to this setting can be used.

Figure 23:
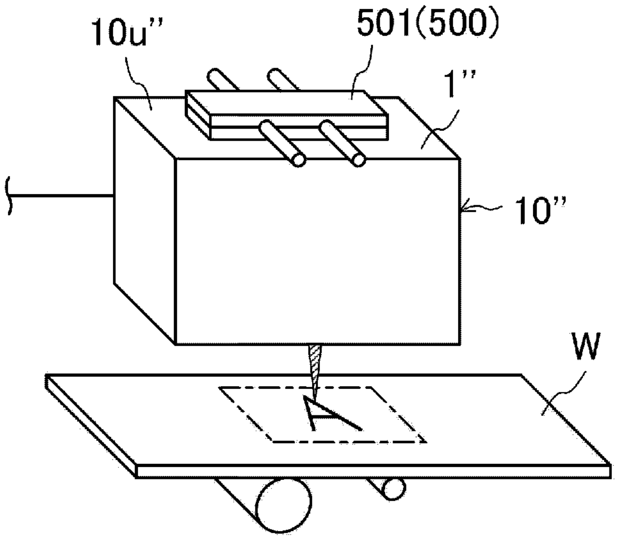
FIG. 23 is a schematic view illustrating another modification of the attachment surface.

In addition, the attachment 7 is not essential in the first place. As in a housing 10" of a marker head 1" illustrated in FIG. 23, the support member 501 can also be directly attached to an attachment surface (a top surface 10*u*" in the illustrated example) without the intervention of the attachment 7. In this case, a partial area of the attachment surface may be regarded as an attachment. In addition, a part of the attachment surface may protrude in a direction opposite to the exit window 6, and such a protrusion may be used as the attachment.

What is claimed is:

1. A laser processing apparatus for performing a printing process on a workpiece including a UV reaction layer by irradiating an irradiation area on the workpiece with UV laser light to cause a chemical reaction in the UV reaction layer, the laser processing apparatus comprising:
- a controller configured to store processing conditions including a character string to be printed on the workpiece, and to output a control signal based on the processing conditions; and
- a marker head configured to be attached to an attachment target position, connected to the controller via an electric cable, and to irradiate the workpiece with the UV laser light based on the control signal, the marker head comprising:
- an excitation light generation section configured to generate excitation light;
- a laser light output section configured to generate and output the UV laser light based on the excitation light;
- a laser light deflection section including a galvanometer mirror, the laser light deflection section being configured to deflect the UV laser light from the laser light output section based on the control signal; and
- a housing that accommodates the excitation light generation section, the laser light output section, and the laser light deflection section, wherein the housing comprises:
- a bottom surface and a top surface opposite to the bottom surface;
- an exit window configured to transmit the UV laser light irradiated toward the irradiation area; and
- an attachment surface configured to be attached to the attachment target position, wherein the attachment surface is configured to replace a thermal transfer industrial printer at the attachment target position.

2. The laser processing apparatus according to claim 1, wherein
- the laser light output section includes a solid-state laser crystal that generates the UV laser light based on the excitation light, and
- the housing further accommodates:
  - a support plate extending along a direction from the attachment surface toward the exit window and supporting the solid-state laser crystal, and
- the support plate is attached to the housing in a state of not being integrated with the attachment surface.

3. The laser processing apparatus according to claim 1, wherein the attachment surface is provided with an attachment capable of attaching the attachment surface to the attachment target position.

4. The laser processing apparatus according to claim 1, wherein
- the housing includes:
  - an exit surface on which the exit window is formed; and
  - an open surface which surrounds the laser light deflection section together with the attachment surface and the exit surface and is at least partially open to communicate with the exit window, and
- the open surface is provided with a cover member capable of opening and closing the open surface.

5. The laser processing apparatus according to claim 4, wherein
- the housing includes a connection surface which faces an opposite side of the open surface and surrounds the laser light deflection section together with the open surface, the attachment surface, and the exit surface, and
- the electric cable supplies electric power into the housing and is connected to the connection surface.

6. The laser processing apparatus according to claim 1, wherein the workpiece is conveyed in a predetermined conveyance direction, the irradiation area has a constant dimension in the conveyance direction, and a spot diameter of the UV laser light on the workpiece is set such that a depth of focus of the UV laser light corresponds to a portion of the irradiation area where an optical path length of the UV laser light is longest and a portion of the irradiation area where the optical path length is shortest.

7. The laser processing apparatus according to claim 6, wherein a path corresponding to the irradiation area out of a movement path of the workpiece includes a site having a different distance from the exit window.

8. The laser processing apparatus according to claim 1, wherein the workpiece is conveyed in a predetermined conveyance direction, a dimension of the irradiation area in the conveyance direction is 120 $mm^2$ or more, the laser light deflection section includes a first mirror which deflects the UV laser light to irradiate the irradiation area, the first mirror is arranged to face the workpiece across the exit window, a relative position of the workpiece with respect to the housing is set such that a distance from the first mirror to the workpiece is 150 mm or less, and a spot diameter of the UV laser light on the workpiece at the relative position is 60 μm or more.

9. The laser processing apparatus according to claim 1, wherein the excitation light generation section includes a laser diode configured to emit the excitation light.

10. The laser processing apparatus according to claim 1, wherein the marker head further comprises an excitation light guide section configured to guide the excitation light generated by the excitation light generation section to the laser light output section.

11. The laser processing apparatus according to claim 1, wherein the laser light output section includes a solid-state laser crystal, a Q-switch, and a, the wavelength conversion crystal being configured to convert laser light generated by the solid-state laser crystal into the UV laser light.

12. The laser processing apparatus according to claim 11, wherein the solid-state laser crystal is an Nd:$YVO_4$ crystal, and the UV laser light has a wavelength of about 355 nm.

13. The laser processing apparatus according to claim 1, wherein the exit window is formed on the bottom surface of the housing, and the attachment surface is the top surface of the housing.

14. The laser processing apparatus according to claim 1, wherein the controller includes:

a storage section configured to store the processing conditions; and a control section configured to generate the control signal based on the processing conditions stored in the storage section and to output the control signal to the marker head via the electric cable.

15. The laser processing apparatus according to claim 1, wherein the marker head further comprises a first control board configured to drive the galvanometer mirror of the laser light deflection section based on the control signal received from the controller via the electric cable.

16. The laser processing apparatus according to claim 1, wherein the workpiece is continuously conveyed through the irradiation area in a conveyance direction, and the laser processing apparatus is configured to perform the printing process on the workpiece while the workpiece is being conveyed.

17. The laser processing apparatus according to claim 1, wherein the housing further includes a connection surface on which an electric cable connector for connecting the electric cable to the marker head is provided, the connection surface being a surface of the housing other than the attachment surface and the bottom surface.

* * * * *